US010455626B2

(12) United States Patent
Kawasaki et al.

(10) Patent No.: US 10,455,626 B2
(45) Date of Patent: Oct. 22, 2019

(54) TERMINAL DEVICE AND PCRF

(71) Applicant: SHARP KABUSHIKI KAISHA, Sakai, Osaka (JP)

(72) Inventors: Yudai Kawasaki, Sakai (JP); Masafumi Aramoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/576,769

(22) PCT Filed: May 25, 2016

(86) PCT No.: PCT/JP2016/065506
§ 371 (c)(1),
(2) Date: Nov. 24, 2017

(87) PCT Pub. No.: WO2016/190369
PCT Pub. Date: Dec. 1, 2016

(65) Prior Publication Data
US 2018/0302935 A1 Oct. 18, 2018

(30) Foreign Application Priority Data

May 25, 2015 (JP) ................. 2015-105443

(51) Int. Cl.
| | | |
|---|---|---|
| *H04W 76/10* | (2018.01) | |
| *H04W 4/00* | (2018.01) | |
| *H04W 48/18* | (2009.01) | |
| *H04W 88/16* | (2009.01) | |
| *H04W 4/24* | (2018.01) | |
| *H04W 80/00* | (2009.01) | |
| *H04W 40/02* | (2009.01) | |
| *H04W 28/02* | (2009.01) | |
| *H04W 76/15* | (2018.01) | |

(52) U.S. Cl.
CPC ............ *H04W 76/10* (2018.02); *H04W 4/00* (2013.01); *H04W 4/24* (2013.01); *H04W 48/18* (2013.01); *H04W 80/00* (2013.01); *H04W 88/16* (2013.01); *H04W 28/0263* (2013.01); *H04W 40/02* (2013.01); *H04W 76/15* (2018.02)

(58) Field of Classification Search
CPC ....... H04W 40/02; H04W 48/18; H04W 4/00; H04W 4/24; H04W 76/10; H04W 88/16
See application file for complete search history.

(56) References Cited

PUBLICATIONS

3GPP TR 23.861 V13.0.0, "3rd Generation Partnership Project; Technical Specification Group Services and System Aspects: Network based IP flow mobility (Release 13)", Jun. 2015, pp. 1-153.

(Continued)

*Primary Examiner* — Kan Yuen
(74) *Attorney, Agent, or Firm* — Birch, Stewart, Kolasch & Birch, LLP

(57) ABSTRACT

A method of communication control and the like accompanied with a multi-access PDN connectivity establishment request from a terminal device. Communication control for establishing a multi-access PDN connection is performed based on a response to a PDN connectivity establishment request from the terminal device. Communication control is performed for transmitting and/or receiving user data by using one or more default bearers for a multi-access PDN connection.

9 Claims, 16 Drawing Sheets

(56) References Cited

PUBLICATIONS

Alcatel-Lucent, Alcatel-Lucent Shanghai Bell, Broadcom Corporation, ZTE, Huawei, HiSilicon, "Text for TS section 5", SA WG2 Meeting #109 (S2-151520), May 25, 2015-May 29, 2015, pp. 1-10.
Apple Inc., Huawei, Hisilicon, "Removing alternatives from S2a call flows", SA WG2 Meeting #108 (S2-151393), Apr. 13, 2015-Apr. 17, 2015, pp. 1-18.
ZTE, "Resolving the Default access negotiation and determination", SA WG2 Meeting #108 (S2-150861), Apr. 13, 2015-Apr. 17, 2015, pp. 1-4.

FIG. 4A

| TWAG ID | NBIFOM capability |
|---|---|

FIG. 4B

| PGW ID 1 | NBIFOM capability |
|---|---|
| PGW ID 2 | NBIFOM capability |

FIG. 4C

| UE NBIFOM capability |
|---|
| NBIFOM allowed |

FIG. 4D

| PDN connection ID |
|---|
| Network allowed mode |
| Operation mode |
| User Plane Connection ID |
| TWAG MAC address |
| NBIFOM permission |

FIG. 4E

| TRANSFER PATH IDENTIFICATION INFORMATION |
|---|
| Routing rule |

FIG. 4F

| MME ID | NBIFOM capability |
|---|---|

FIG. 4G

| SGW ID | NBIFOM capability |
|---|---|

| IMSI |
| MSISDN |
| IMEI / IMEISV |
| Access Restriction |
| UE NBIFOM capability |

| Context ID |
| PDN Address |
| PDN Type |
| Access Point Name (APN) |
| WLAN offload ability |
| PDN GW ID |
| NBIFOM permission |

FIG. 8A

| |
|---|
| IMSI |
| EMM State |
| GUTI |
| ME Identity |
| UE NBIFOM capability |

FIG. 8B

| |
|---|
| PDN connection id |
| APN in Use |
| IP Address |
| Default Bearer |
| WLAN offload ability |
| UE allowed mode |
| Operation mode |

FIG. 8C

| |
|---|
| TRANSFER PATH IDENTIFICATION INFORMATION |
| routing rule |

FIG. 8D

| TWAG ID | NBIFOM capability |
|---|---|

FIG. 8E

| PGW ID 1 | NBIFOM capability |
|---|---|
| PGW ID 2 | NBIFOM capability |

FIG. 8F

| MME ID | NBIFOM capability |
|---|---|

FIG. 8G

| SGW ID | NBIFOM capability |
|---|---|

FIG. 10A

| IMSI |
|---|
| ME Identity |
| MSISDN |
| UE NBIFOM capability |

FIG. 10B

| IP Address |
|---|
| PDN type |
| APN |
| Network allowed mode |
| Operation mode |

FIG. 10C

| TRANSFER PATH IDENTIFICATION INFORMATION |
|---|
| routing rule |

FIG. 10D

| TWAG ID | NBIFOM capability |
|---|---|

FIG. 10E

| PGW ID 1 | NBIFOM capability |
|---|---|
| PGW ID 2 | NBIFOM capability |

FIG. 10F

| MME ID | NBIFOM capability |
|---|---|

FIG. 10G

| SGW ID | NBIFOM capability |
|---|---|

FIG. 12A

| Subscriber ID |
|---|
| UE NBIFOM capability |

FIG. 12B

| APN |
|---|
| Operation mode |
| Network Policy |
| Charging rule |
| PCC rule |
| QoS rule |

FIG. 12C

| routing rule |
|---|

FIG. 12D

| TWAG ID | NBIFOM capability |
|---|---|

FIG. 12E

| PGW ID 1 | NBIFOM capability |
|---|---|
| PGW ID 2 | NBIFOM capability |

FIG. 12F

| MME ID | NBIFOM capability |
|---|---|

FIG. 12G

| SGW ID | NBIFOM capability |
|---|---|

TERMINAL DEVICE AND PCRF

TECHNICAL FIELD

The present invention relates to a terminal device and a PCRF.

BACKGROUND ART

The 3rd Generation Partnership Project (3GPP), which undertakes activities for standardizing recent mobile communication systems, is in the process of creating specifications for the Evolved Packet System (EPS), for achieving an all-IP architecture, as described in NPL 1. The EPS is a mobile communication system through which mobile operators and the like provide mobile telephone services, and is structured including a core network called Evolved Packet Core (EPC), an access network based on the radio communication standard called Long Term Evolution (LTE), and the like.

Furthermore, in the process by the 3GPP of creating EPS specifications, the Network-based IP flow Mobility (NBIFOM) is discussed (see NPL 1). The NBIFOM is a technical item that aims to allow one device to simultaneously utilize a 3GPP interface and a non-3GPP interface (for example, WLAN).

In the related art, one PDN connection accommodates a communication path, a bearer, or a transfer path through either a 3GPP access network (for example, LTE access network) or a non-3GPP access network (for example, a WLAN access network).

The NBIFOM maintains a state in which a single PDN connection simultaneously accommodates a bearer, a communication path, or a transfer path through a 3GPP access network, and a bearer, a communication path, or a transfer path through a non-3GPP access network. Such a single PDN connection is defined as a multi-access PDN connection.

It is also discussed for the NBIFOM to stipulate an operation mode indicating an endpoint node with an initiating function of switching a communication path. Specifically, it is discussed for the NBIFOM to classify such an operation mode into a UE-Initiated mode and a Network-Initiated mode.

Terminal devices and devices included in a core network and an access network are capable of transmitting and/or receiving data on a communication path through an appropriate access network for every application by using an NBIFOM function.

Furthermore, an endpoint node configured to initiate switching a flow of the multi-access PDN connection established by using the NBIFOM function is configured based on the operation mode.

CITATION LIST

Non Patent Literature

NPL 1: 3GPP TR 23.861 Technical Specification Group Services and System Aspects, Network based IP flow mobility (Release 13)

SUMMARY OF INVENTION

Technical Problem

In the NBIFOM, a detailed procedure for establishing a multi-access PDN connection is not stipulated.

More specifically, details of accept means from a network for accepting a request for establishing the multi-access PDN connection, in which a terminal device supports an NBIFOM function, are not clarified.

In light of the foregoing, an object of the present invention is to provide a suitable way of implementing a communication control procedure in response to a PDN connectivity establishment request from a terminal device and communication control using a multi-access PDN connection.

Solution to Problem

In one embodiment of the present invention, a terminal device for establishing a Packet Data Network (PDN) connection over a 3GPP access, the terminal device includes: a WLAN interface unit configured to: transmit a PDN connectivity request message to a Trusted WLAN Access Gateway (TWAG) in a case of adding a WLAN access to the PDN connection, and receive a PDN connectivity accept message from the TWAG; and a control unit, wherein in a case where a Network-based IP flow mobility (NBIFOM) mode of the PDN connection is a UE-initiated NBIFOM mode, the PDN connectivity request message includes first information indicating a default access selected by the terminal device, the PDN connectivity accept message includes second information indicating a default access determined by a Policy and Charging Rule Function (PCRF), based on the first information, and the control unit is further configured to: detect the default access indicated by the second information based on reception of the PDN connectivity accept message, and route a packet not matching any routing filter to the default access indicated by the second information.

In another embodiment of the present invention, a Policy and Charging Rule Function (PCRF) includes: an IP mobile communication network interface unit configured to receive from a terminal device first information indicating a default access selected by the terminal device via a Packet Data Network (PDN) Gateway (PGW), in a case where a Network-based IP flow mobility (NBIFOM) mode of the PDN connection established by a terminal device over a 3GPP access is a UE-initiated NBIFOM mode and a WLAN access is to be added to the PDN connection; and a control unit configured to determine the default access, based on the first information, wherein the IP mobile communication network interface unit is further configured to transmit second information indicating the default access determined by the control unit to the terminal device via the PGW.

Advantageous Effects of Invention

The present invention enables a communication control procedure accompanied with a multi-access PDN connectivity establishment request from a terminal device.

Specifically, according to the present invention, a multi-access PDN connection is established, and communication using the multi-access PDN connection is enabled.

BRIEF DESCRIPTION OF DRAWINGS

FIGS. 2A and 2B are diagrams illustrating a configuration of an IP mobile communication network, and the like.

FIGS. 4A to 4G are diagrams illustrating a configuration of a storage of the TWAG.

FIGS. 8A to 8G are diagrams illustrating a configuration of a storage of the UE.

FIGS. 10A to 10G are diagrams illustrating a configuration of a storage of the PGW.

FIGS. 12A to 12G are diagrams illustrating a configuration of a storage of the PCRF.

DESCRIPTION OF EMBODIMENTS

1. First Embodiment

Hereinafter, a radio communication technology according to an embodiment of the present invention will be described in detail with reference to the drawings.

1.1. System Overview

Figure 1:
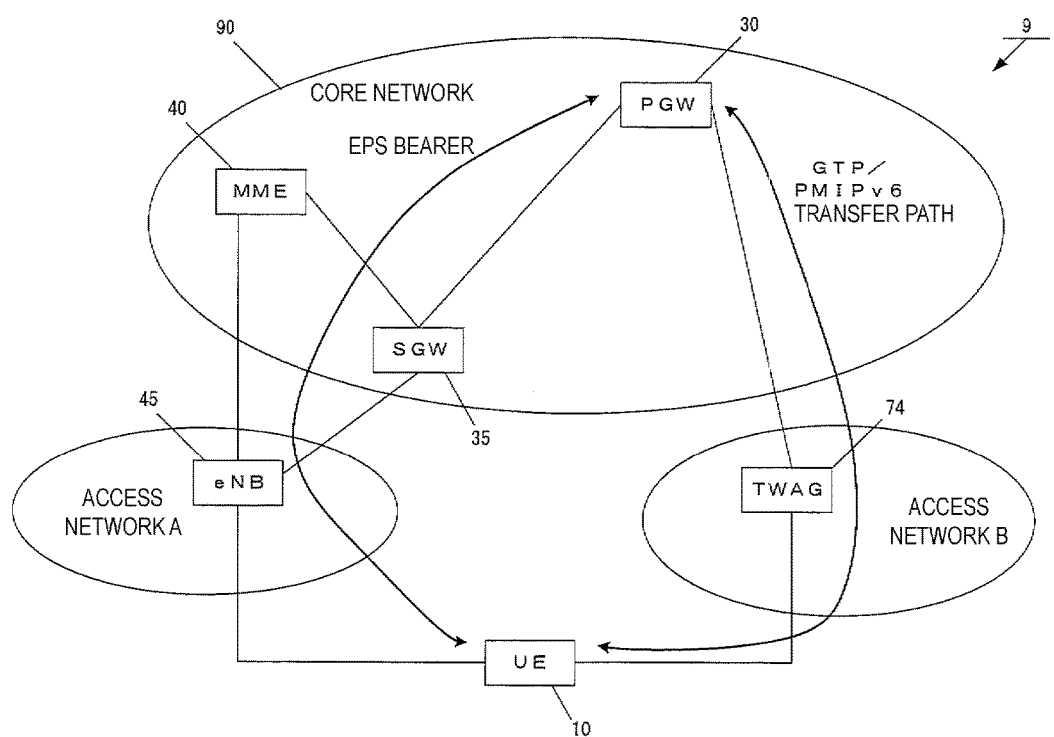
FIG. 1 is a diagram illustrating an overview of a mobile communication system.

FIG. 1 is a diagram illustrating an overview of a mobile communication system according to the present embodiment. As illustrated in FIG. 1, a mobile communication system 9 includes a mobile terminal device UE 10, an LTE base station eNB 45 included in an access network A, a Trusted WLAN access gateway (gateway TWAG) 74 included in an access network B, a Mobility Management Entity (MME) 40 included in a core network 90, a Serving Gateway (SGW) 35, and a PDN Gateway (PGW) 30.

Here, the UE 10 may be any mobile terminal device, and may be a User Equipment (UE), a Mobile Equipment (ME), or a Mobile Station (MS).

Furthermore, the access network A may be an LTE access network, and the eNB 45 included in the access network A may be an LTE radio base station. Note that the access network A may include multiple radio base stations. Note that the LTE access network may be an Evolved Universal Terrestrial Radio Access Network (E-UTRAN). Alternatively, the access network A may be a Universal Terrestrial Radio Access Network (UTRAN) or a GSM EDGE Radio Access Network (GERAN).

Furthermore, the access network B may be a Wireless LAN (WLAN) access network. The TWAG 74 may be a gateway for connecting to the PGW 30 in the core network 90, and for connecting the core network 90 and the WLAN access network.

In the present embodiment, the UE 10 is capable of establishing a PDN connection using an EPS bearer through the access network A.

Furthermore, the UE 10 is capable of establishing a PDN connection by using a GTP/PMIPv6 transfer path between the PGW 30 and the UE 10. Note that the transfer path may be a bearer.

Here, the core network 90 denotes an IP mobile communication network run by a Mobile Operator.

For example, the core network 90 may be a core network 90 for the mobile operator that operates and manages the mobile communication system 9, or may be a core network 90 for a virtual mobile operator such as a Mobile Virtual Network Operator (MVNO).

The MME 40 is a control device configured to perform, through the access network A, location management and access control of the UE 10. Details of the MME 40 will be descried later.

Furthermore, the SGW 35 is a gateway device between the core network 90 and the access network A, and is configured to transfer user data between the UE 10 and the PGW 30.

The PGW 30 is a gateway device of a packet data service network (Packet Data Network (PDN)) that provides a communication service to the UE 10.

In the present embodiment, the UE 10 is capable of establishing a first PDN connection and/or a second PDN connection.

Furthermore, in the present embodiment, an NBIFOM is a technology that allows an establishment of a multi-access PDN connection.

Furthermore, in the present embodiment, the multi-access PDN connection denotes a PDN connection capable of accommodating, in one PDN connection, a transfer path and/or a bearer over a 3GPP access and/or a WLAN access. In other words, the multi-access PDN connection is capable of accommodating both a transfer path through the 3GPP access and a transfer path through the WLAN access. Note that the multi-access PDN connection may be a PDN connection accommodating only a bearer through the 3GPP access or may be a PDN connection accommodating only a transfer path through the WLAN access. In other words, the multi-access PDN connection denotes a PDN connection capable of constituting one or multiple transfer paths.

In a case where the multi-access PDN connection includes multiple transfer paths, the same IP address can be used for respective transfer paths. That is, respective communication paths are associated with a multi-access PDN connection flow, and the communication paths can be switched in each flow.

In the present embodiment, to clearly distinguish from a PDN connection established based on an IP Flow Mobility (IFOM), a PDN connection in which a transfer path of a certain flow is selectable based on the NBIFOM is defined as "multi-access PDN connection".

Note that the IFOM is a technology for switching a communication path of a certain IP flow by using a Dual Stack Mobile IPv6 (DSMIPv6) protocol, and in the present embodiment, a PDN connection capable of switching, based on the IFOM, a communication path of a certain IP flow is described as a PDN connection for the IFOM.

Furthermore, the first PDN connection may be the above-described multi-access PDN connection.

In detail, the first PDN connection is a PDN connection in which, as one PDN connection, a communication path EPS bearer through the access network A and a communication path including a GTP/PMIPv6 tunnel through the access network B can be used. That is, such a PDN connection enables transmission and/or reception of data through the 3GPP access, the WLAN access, or both thereof. The first PDN connection may be the multi-access PDN connection.

Furthermore, the second PDN connection may be a known PDN connection, rather than the multi-access PDN connection. Note that the second PDN connection may be a single-access PDN connection.

Here, the single-access PDN connection denotes one PDN connection constituting only a transfer path through either the 3GPP access or the WLAN access, unlike the multi-access PDN connection. In detail, the single-access PDN connection is a PDN connection established by the attach in the related art.

That is, the second PDN connection is a PDN connection including the EPS bearer through the access network A or a PDN connection including the GTP/PMIPv6 transfer path through the access network B. The second PDN connection accommodates a transfer path and/or a communication path through either one of the access networks.

As described above, the single-access PDN connection denotes a PDN connection that is different from the multi-access PDN connection and the PDN connection for the IFOM. Moreover, the single-access PDN connection denotes a PDN connection that is also different from a PDN connection for a Local IP Access (LIPA). Here, the LIPA denotes communication control for offloading the connection to a home network. More specifically, the base station to which the terminal device connects achieves the offloading, by transmitting, to a home network to which the base station connects, user data that is conventionally delivered to the core network 90. The PDN connection for the LIPA is a PDN connection for performing such communication based on the LIPA.

Figure 2A:
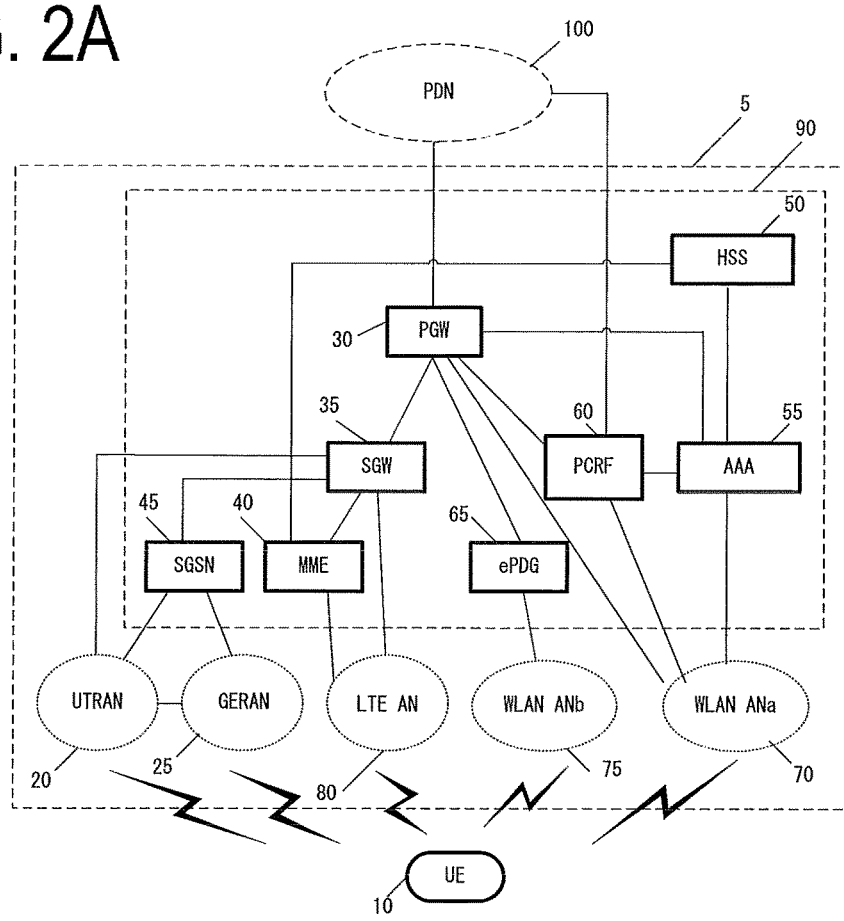

Next, an example of a configuration of the core network 90 will be described. FIG. 2A illustrates an example of a configuration of the IP mobile communication network. As illustrated in FIG. 2A, the core network 90 includes a Home Subscriber Server (HSS) 50, an Authentication, Authorization, Accounting (AAA) 55, a Policy and Charging Rules Function (PCRF) 60, the PGW 30, an enhanced Packet Data Gateway (ePDG) 65, the SGW 35, the MME 40, and a Serving GPRS Support Node (SGSN) 45.

Furthermore, the core network 90 is capable of connecting to multiple radio access networks (an LTE AN 80, a WLAN ANb 75, a WLAN ANa 70, a UTRAN 20, and a GERAN 25).

A radio access network may be configured by connecting to multiple different access networks, or may be configured with either one of the access networks. Moreover, the UE 10 is capable of connecting wirelessly to the radio access network.

Moreover, a WLAN Access Network b (WLAN ANb 75) that connects to the core network 90 via the ePDG 65 and a WLAN Access Network a (WLAN ANa 75) that connects to the PGW 30, the PCRF 60, and the AAA 55 can be configured as access networks to be connectable in a WLAN access system.

Note that the devices have a similar configuration to those of the devices in the related art in a mobile communication system using EPS, and thus detailed descriptions will be omitted. The devices will be described briefly, hereinafter.

The PGW 30 is connected to the PDN 100, the SGW 35, the ePDG 65, the WLAN ANa 70, the PCRF 60, and the AAA 55, and serves as a relay device configured to transfer user data by functioning as a gateway device between the PDN 100 and the core network 90.

The SGW 35 is connected to the PGW 30, the MME 40, the LTE AN 80, the SGSN 45, and the UTRAN 20, and serves as a relay device configured to transfer user data by functioning as a gateway device between the core network 90 and the 3GPP access network (the UTRAN 20, the GERAN 25, and the LTE AN 80).

The MME 40 is connected to the SGW 35, the LTE AN 80, and the HSS 50, and serves as an access control device configured to perform location information management and access control for the UE 10 via the LTE AN 80. Furthermore, the core network 90 may include multiple location management devices. For example, a location management device different from the MME 40 may be included. Like the MME 40, the location management device different from the MME 40 may be connected to the SGW 35, the LTE AN 80, and the HSS 50.

Furthermore, in a case where multiple MMEs 40 are included in the core network 90, the MMEs 40 may be connected to each other. With this configuration, the context of the UE 10 may be transmitted and/or received among the MMEs 40.

The HSS 50 is connected to the MME 40 and the AAA 55, and serves as a managing node configured to manage subscriber information. The subscriber information of the HSS 50 is referenced, for example, in the access control for the MME 40. Moreover, the HSS 50 may be connected to the location management device different from the MME 40.

The AAA 55 is connected to the PGW 30, the HSS 50, the PCRF 60, and the WLAN ANa 70, and is configured to perform access control for the UE 10 connected via the WLAN ANa 70.

The PCRF 60 is connected to the PGW 30, the WLAN ANa 75, the AAA 55, and the PDN 100, and is configured to perform QoS management on data delivery. For example, the PCRF 60 manages QoS of a communication path between the UE 10 and the PDN 100.

The ePDG 65 is connected to the PGW 30 and the WLAN ANb 75, and is configured to deliver user data by functioning as a gateway device between the core network 90 and the WLAN ANb 75.

The SGSN 45 is connected to the UTRAN 20, the GERAN 25, and the SGW 35, and serves as a control device for location management between a 3G/2G access network (UTRAN/GERAN) and the LTE access network (E-UTRAN). In addition, the SGSN 45 has a function of selecting the PGW 30 and the SGW 35, a function of managing a time zone of the UE 10; and a function of selecting the MME 40 at the time of handover to the E-UTRAN.

Figure 2B:
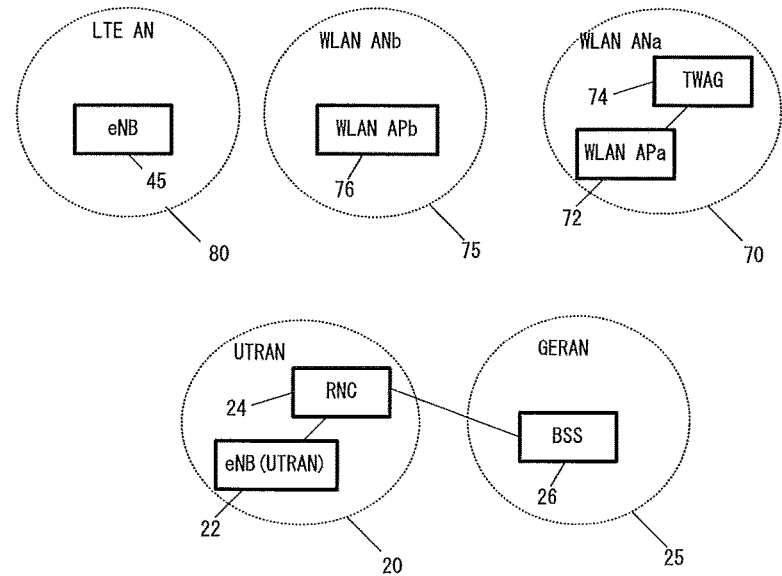

Also, as illustrated in FIG. 2B, each radio access network includes devices to which the UE 10 is actually connected (for example, a base station device and an access point device), and the like. The devices used in these connections are assumed to adapt to the radio access networks.

In the present embodiment, the LTE AN 80 may serve as the E-URAN including the eNB 45. The eNB 45 serves as a radio base station, to which the UE 10 connects in an LTE access system, and the LTE AN 80 may include one or multiple radio base stations.

The WLAN ANa 70 includes a WLAN APa 72 and the TWAG 74. The WLAN APa 72 is a radio base station to which the UE 10 connects in the WLAN access system trusted by the operator running the core network 90, and the WLAN ANa 70 may include one or multiple radio base stations. The TWAG 74 serves as a gateway device between the core network 90 and the WLAN ANa 70. The WLAN APa 72 and the TWAG 74 may be configured as a single device.

Even in a case where the operator running the core network 90 and the operator running the WLAN ANa 70 are different from each other, such a configuration can be implemented through contracts and agreements between the operators.

Furthermore, the WLAN ANb 75 is configured to include a WLAN APb 76. The WLAN APb 76 serves as a radio base station to which the UE 10 connects in the WLAN access system, in a case where no trusting relationship is established with the operator running the core network 90, and the WLAN ANb 75 may include one or multiple radio base stations.

In this manner, the WLAN ANb 75 is connected to the core network 90 via the ePDG 65, which is a device included in the core network 90, serving as a gateway. The ePDG 65 has a security function for ensuring security.

The UTRAN 20 includes a Radio Network Controller (RNC) 24 and an eNB (UTRAN) 22. The eNB (UTRAN) 22 is a radio base station to which the UE 10 connects through a UMTS Terrestrial Radio Access (UTRA), and the UTRAN 20 may include one or multiple radio base stations. Furthermore, the RNC 24 is a control unit configured to connect the core network 90 and the eNB (UTRAN) 22, and the UTRAN 20 may include one or multiple RNCs. Moreover, the RNC 24 may be connected to one or multiple eNBs (UTRANs) 22. In addition, the RNC 24 may be connected to a radio base station (Base Station Subsystem (BSS) 26) included in the GERAN 25.

The GERAN 25 includes the BSS 26. The BSS 26 is a radio base station to which the UE 10 connects through GSM/EDGE Radio Access (GERA), and the GERAN 25 may be configured with one or multiple radio Base Station BSs. Furthermore, the multiple BSSs 26 may be connected to each other. Moreover, the BSS 26 may be connected to the RNC 24.

Note that in the present specification, a UE 10 to be connected to each radio access network denotes a UE 10 to be connected to a base station device, an access point, or the like included in each radio access network, and data, signals, and the like being transmitted and/or received also traverse those base station devices, access points, or the like.

1.2. Device Configuration

Configurations of the devices will be described below.

1.2.1. TWAG Configuration

Figure 3:
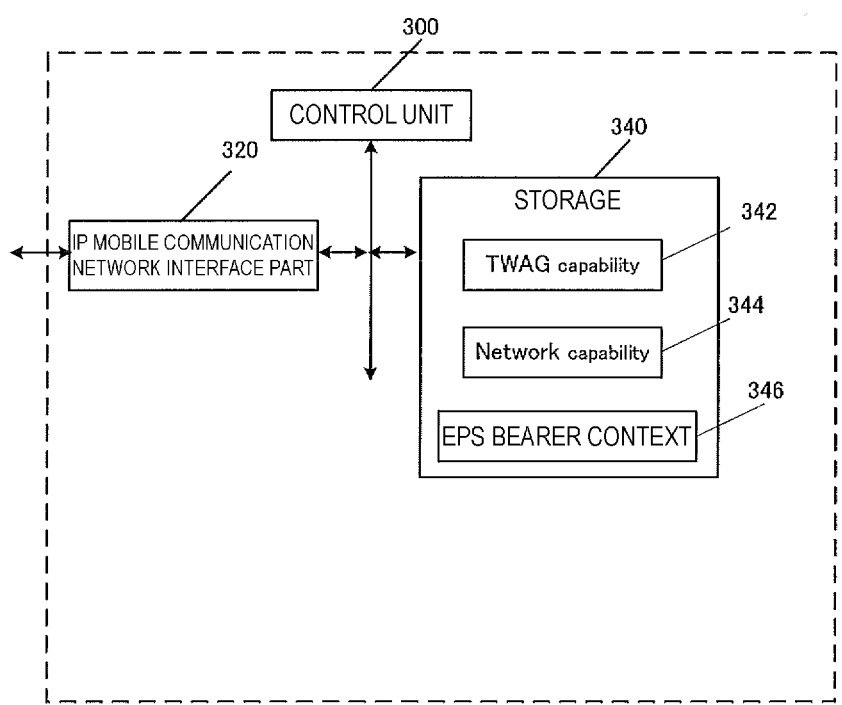
FIG. 3 is a diagram illustrating a functional configuration of a TWAG

FIG. 3 illustrates a device configuration of the TWAG 74. As illustrated in FIG. 3, the TWAG 74 includes an IP mobile communication network interface unit 320, a control unit 300, and a storage 340. The IP mobile communication network interface unit 320 and the storage 340 are connected to the control unit 300 via a bus.

The control unit 300 serves as a function unit for controlling the TWAG 74. The control unit 300 implements various processes by reading out and executing various programs stored in the storage 340.

The IP mobile communication network interface unit 320 serves as a data transmission and/or reception unit configured to transmit and/or receive user data and/or a control message, and serves as a function unit through which the TWAG 74 is connected to the PGW 30.

The storage 340 serves as a function unit for storing programs, data, and the like necessary for each operation of the TWAG 74. The storage 340 includes, for example, a semiconductor memory, a Hard Disk Drive (HDD), or the like.

As illustrated in FIG. 3, the storage 340 stores a TWAG capability 342, a Network capability 344, and an EPS bearer context 346. Hereinafter, information elements stored in the storage 340 will be described.

FIGS. 4A to 4E illustrate the information elements stored in the storage 340. FIG. 4A illustrates an example of the TWAG capability stored in the TWAG 74. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

As illustrated in FIG. 4A, an NBIFOM capability may be stored in association with a TWAG ID, which is the identification information of the TWAG 74. In a case of not being associated with the TWAG ID, the NBIFOM capability may mean a capability of the TWAG 74 to be stored.

In a case where the TWAG ID and the NBIFOM capability are stored in association with each other, the TWAG 74 may store the TWAG capability of multiple TWAGs 74.

In this case, when the UE 10 performs a handover to another TWAG 74, the TWAG 74 may select such another TWAG 74, to which the handover is made, based on the TWAG Capability.

Next, the Network capability 344 will be described. FIG. 4B illustrates an example of the Network capability stored in the TWAG 74. In the Network capability, the NBIFOM capability is stored for each network, i.e., for each PGW 30.

Here, the NBIFOM capability denotes identification information indicating whether the capability of establishing the first PDN connection is supported for each network. In other words, the identification information indicates whether the PGW 30 supports the NBIFOM function. More specifically, for example, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. In other words, the NBIFOM capability may be identification information indicating that a gateway supports the NBIFOM function. That is, the existence of the NBIFOM capability in the storage may mean that the PGW 30 is a gateway having a function of establishing a first PDN connection. In other words, the existence of the NBIFOM capability in the storage may mean that the PGW 30 is a gateway supporting the NBIFOM function.

As illustrated in FIG. 4B, the TWAG 74 stores an NBIFOM capability in association with a PGW ID. Furthermore, as illustrated in FIG. 4B, the NBIFOM capabilities may be stored in association with the multiple PGWs 30, respectively.

The PGW ID may be any information for identifying the PGW 30, and may be, for example, an Access Point Name (APN).

Next, an EPS bearer context will be described. The EPS bearer context may be classified into the EPS bearer context for each UE 10 stored for each UE 10, the EPS bearer context for each PDN connection, and the EPS bearer context for each bearer and/or transfer path.

FIG. 4C illustrates information elements included in the EPS bearer context for each UE 10. As seen from FIG. 4C, the TWAG 74 stores, for each UE 10, a UE NBIFOM capability and an NBIFOM allowed.

A UE NBIFOM capability denotes an NBIFOM capability of the UE 10. The UE NBIFOM capability denotes identification information, for each UE 10, indicating whether the capability of establishing the first PDN connection is supported. In other words, the UE NBIFOM capability denotes identification information indicating whether the UE 10 supports the NBIFOM function. More specifically, for example, the UE NBIFOM capability may include "allowed" or "Not allowed".

Note that the NBIFOM function may include information indicating provision of a function of establishing a multi-access PDN connection.

Alternatively, the UE NBIFOM capability may be identification information indicating that the UE 10 has the capability of establishing the first PDN connection. That is, the existence of the UE NBIFOM capability may mean that the UE 10 has the function of establishing the first PDN connection.

In other words, the UE NBIFOM capability may be identification information indicating that the UE 10 supports the NBIFOM function. That is, the existence of the UE NBIFOM capability in the storage may mean that the UE 10 supports the NBIFOM function.

Furthermore, the NBIFOM allowed is identification information indicating an APN, which is allowed to establish a PDN connection using the NBIFOM. The NBIFOM may be associated with at least the APN. The NBIFOM allowed may be associated with multiple APNs.

In the present embodiment, an APN 1 is associated with the NBIFOM allowed. That is, the APN 1 is allowed to establish the multi-access PDN connection. In other words, in the present embodiment, the UE 10 is allowed to establish the multi-access PDN connection by using the APN 1. Note that the APN 1 is also allowed to establish the known PDN connection, rather than the multi-access PDN connection.

In addition, in the present embodiment, an APN 2 is not associated with the NBIFOM allowed. That is, in the present embodiment, the APN 2 is not allowed to establish a multi-access PDN connection. That is, in the present embodiment, the UE 10 is not capable of establishing the multi-access PDN connection by using the APN 2.

The NBIFOM allowed may be stored before the PDN connection is established.

The TWAG 74 may access the HSS 50 to acquire the NBIFOM allowed, before the PDN connection is established and/or while the establishment procedure is being performed.

Furthermore, the EPS bearer context for each UE 10 may include identification information of the UE 10. The identification information of the UE 10 may be an IMSI.

Furthermore, FIG. 4D illustrates the EPS bearer context for each PDN connection. The EPS bearer context for each PDN connection includes a PDN connection ID, a Network allowed mode, an Operation mode, a User plane connection ID, a TWAG MAC address, and an NBIFOM Permission.

The PDN connection ID is identification information for identifying a PDN connection. The UE 10, the TWAG 74, and the PGW 30 may store the same identification information.

The Operation mode is identification information of a mode that indicates which one of the UE 10 and a network takes an initiative in transmitting and/or receiving data or is allowed to initiate communication control in a case where the PDN connection is the first PDN connection.

More specifically, for example, an Operation mode that allows the UE 10 to initiate the communication control may be a UE-Initiated mode.

Furthermore, an Operation mode that allows a network and/or the PGW 30 and/or the PCRF 60 to initiate the communication control may be a Network Initiated mode.

The Network allowed mode indicates an Operation mode allowed by a network. The Network allowed mode may include the UE Initiated mode, the Network Initiated mode, or both thereof.

The User plane connection ID is identification information for identifying a connection used for transmission of user data in a case where the UE 10 establishes a transfer path via the TWAG 74.

A TWAG MAC address is a physical address of the TWAG 74.

The NBIFOM permission is information indicating that this PDN connection has established the multi-access PDN connection. In other words, the NBIFOM permission indicates that the first PDN connection has been established.

That is, the TWAG 74 having stored the NBIFOM permission means that this PDN connection is the first PDN connection.

The NBIFOM permission is identification information that is stored in the TWAG 74 upon the PDN connection being established.

The TWAG 74 may access the HSS 50 to acquire the NBIFOM permission while the PDN connection is being established. Alternatively, the TWAG 74 may store the NBIFOM Permission, based on the multi-access PDN connection having been established.

Next, the EPS bearer context for each bearer and/or transfer path will be described. As illustrated in FIG. 4E, the EPS bearer context for each bearer and/or transfer path may include the transfer path identification information and a Routing Rule.

The transfer path identification information is information for identifying a transfer path and/or bearer. The transfer path identification information may be an EPS bearer ID, for example.

The Routing Rule indicates an association of a Routing Filter with a Routing address or Routing access type. Whether using a communication path through the 3GPP access network or using a communication path through the WLAN access network is determined, based on such an association.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60, or may be notified from the UE 10. Alternatively, the Routing Rule may be a value that the TWAG 74 stores beforehand as a default value.

A Routing Filter may include an IP header to switch an IP flow. Alternatively, the Routing Filter may include an application ID to switch the flow for each application. Alternatively, the Routing Filter may include a TFT.

The Routingu Rule may store multiple rules. Furthermore, the Routing rule may include a priority for each rule.

The TWAG capability and the Network capability may be included in the EPS bearer context.

1.2.2. HSS Configuration

Figures 5, 6A, 6B:
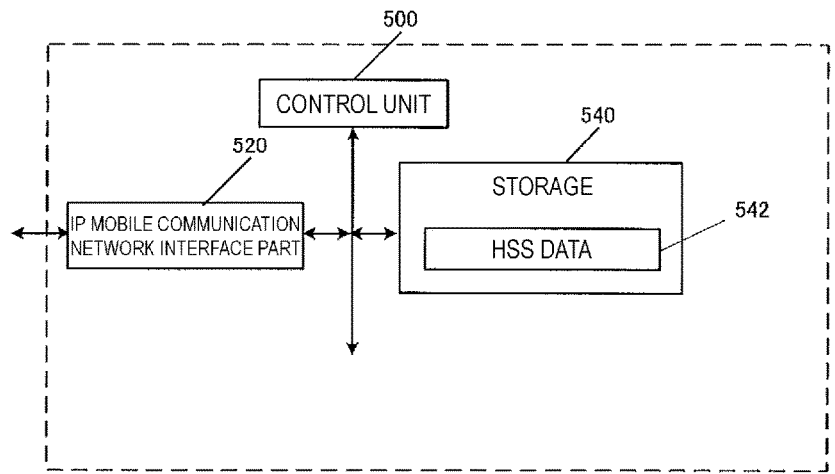
FIG. 5 is a diagram illustrating a functional configuration of an HSS.
FIGS. 6A and 6B are diagrams illustrating a configuration of a storage of the HSS.

Next, the configuration of the HSS 50 will be described. FIG. 5 illustrates a device configuration of the HSS 50. As illustrated in FIG. 5, the HSS 50 includes an IP mobile communication network interface unit 520, a control unit 500, and a storage 540. The IP mobile communication network interface unit 520 and the storage 540 are connected to the control unit 500 via a bus.

The control unit 500 serves as a function unit for controlling the HSS 50. The control unit 500 implements various processes by reading out and executing various programs stored in the storage 540.

The IP mobile communication network interface unit 520 serves as a data transmission and/or reception unit configured to transmit and/or receive user data and/or a control message, and also serves as a function unit for connecting the HSS 50 to the MME 40 and/or another MME 40, and the AAA 55.

The storage 540 serves as a function unit for storing programs, data, and the like necessary for each operation of the HSS 50. The storage 540 includes, for example, a semiconductor memory, a Hard Disk Drive (HDD), or the like.

As illustrated in FIG. 5, the storage 540 stores HSS data 542. Hereinafter, information elements stored in the storage 540 will be described.

FIGS. 6A and 6B illustrate the information elements to be stored in the storage 540. FIG. 6A illustrates an example of HSS data for each UE 10 to be stored in the HSS 50.

As seen from FIG. 6A, the HSS data for each UE 10 includes an IMSI, an MSISDN, an IMEI/IMEISV, an Access Restriction, a UE NBIFOM capability, and an NBIFOM allowed.

The IMSI is identification information to be assigned to a user (subscriber) using the UE 10.

The MSISDN represents the phone number of the UE 10.

The IMEI/IMISV is identification information assigned to the UE 10.

The Access Restriction indicates registration information for an access restriction.

A UE NBIFOM capability denotes an NBIFOM capability of the UE 10. The UE NBIFOM capability denotes identification information, for each UE 10, indicating whether the capability of establishing the first PDN connection is supported. In other words, the UE NBIFOM capability indicates whether the UE 10 supports the NBIFOM function. More specifically, for example, the NBIFOM capability may include "allowed" or "Not allowed".

Alternatively, the UE NBIFOM capability may be identification information indicating that the UE 10 has the capability of establishing the first PDN connection. That is, the existence of the UE NBIFOM capability may mean that the UE 10 has the function of establishing the first PDN connection.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection. In other words, in the present embodiment, the UE 10 is allowed to establish the multi-access PDN connection by using the APN 1. Note that the APN 1 is also allowed to establish the known PDN connection, rather than the multi-access PDN connection.

In addition, in the present embodiment, the APN 2 is not associated with the NBIFOM allowed. That is, in the present embodiment, the APN 2 is not allowed to establish the multi-access PDN connection. That is, in the present embodiment, the UE 10 cannot establish the multi-access PDN connection by using the APN 2.

The NBIFOM allowed may be stored before the PDN connection is established.

FIG. 6B illustrates an example of HSS data for each PDN connection stored in the HSS 50. As seen from FIG. 6B, the HSS data for each PDN connection includes at least a Context ID, a PDN address, a PDN Type, an Access Point Name (APN), a WLAN offlaod ability, a PDN GW ID, and an NBIFOM Permission.

The Context ID is identification information of the context storing the HSS data for each PDN connection.

The PDN Address represents a registered IP address. The PDN Address is an IP address of the UE 10.

The PDN Type indicates the type of PDN Address. That is, the PDN Type is identification information for identifying IPv4, IPv6, or IPv4v6, for example.

The APN is a label indicating an access destination in the network, in accordance with the DNS naming convention.

The WLAN offload ability is identification information indicating whether traffic connected through the APN can be offloaded to the WLAN by utilizing a cooperative function between the WLAN and the 3GPP, or the 3GPP connection is maintained. The WLAN offload ability may vary for each RAT type. Specifically, the LTE (E-UTRA) and the 3G (UTRA) may have different WLAN offload abilities.

The PDN GW identity is identification information for identifying the PGW 30 utilized in this APN. This identification information may be a Fully Qualified Domain Name (FQDN) or an IP address.

The NBIFOM permission is information indicating that this PDN connection has established the multi-access PDN connection. In other words, the NBIFOM permission indicates that the first PDN connection has been established.

That is, the TWAG 74 having stored the NBIFOM permission means that this PDN connection is the first PDN connection.

The NBIFOM permission is identification information that is stored in the TWAG 74 upon the PDN connection being established.

Specifically, for example, the HSS data for each PDN connection including the APN 1 may include the NBIFOM permission, and the HSS data for each PDN connection including the APN 2 may not necessarily include the NBIFOM permission.

In other words, the PDN connection based on the APN 1 may be the first PDN connection, and the PDN connection based on the APN 2 cannot be the first PDN connection.

1.2.3. UE Configuration

Figure 7:
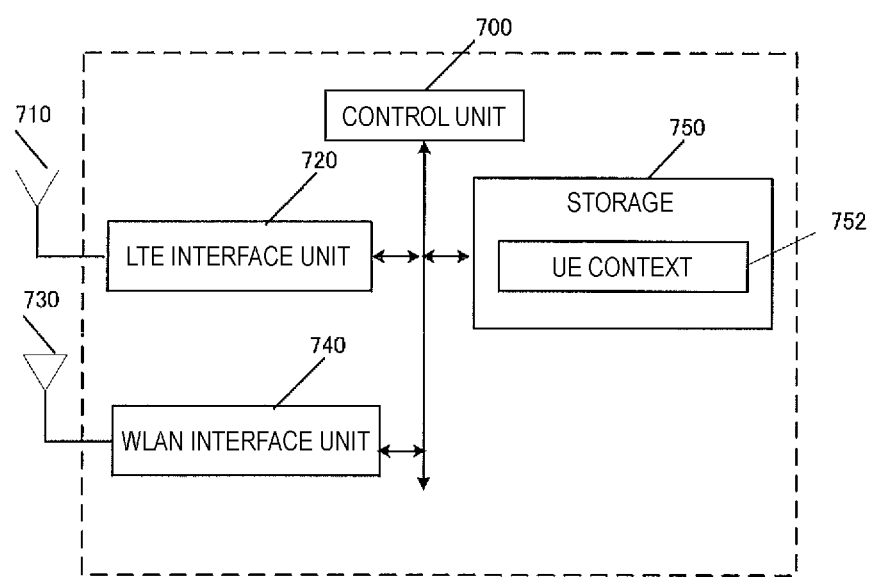
FIG. 7 is a diagram illustrating a functional configuration of a UE.

Next, the configuration of a UE 10 will be described. FIG. 7 illustrates a device configuration of the UE 10. As illustrated in FIG. 7, the UE 10 includes an LTE interface unit 720, a WLAN interface unit 740, a control unit 700, and a storage 750.

The LTE interface unit 720, the WLAN interface unit 740, and the storage 750 are connected to the control unit 700 via a bus.

The control unit 700 serves as a function unit for controlling the UE 10. The control unit 700 implements various processes by reading out and executing various programs stored in the storage 750.

The LTE interface unit 720 serves as a data transmission and/or reception unit configured to transmit and/or receive user data and/or a control message, and also serves as a function unit through which the UE 10 connects to an IP access network via an LTE base station. Furthermore, an external antenna 710 is connected to the LTE interface unit 720.

The WLAN interface unit 740 serves as a data transmission and/or reception unit configured to transmit and/or receive user data and/or a control message, and also serves as a function unit through which the UE 10 connects to a WLAN AP and connects to the IP access network. Furthermore, an external antenna 730 is connected to the WLAN interface unit 740.

The control unit 700 serves as a function unit for controlling the UE 10. The control unit 700 implements various processes by reading out and executing various programs stored in the storage 750.

The storage 750 serves as a function unit for storing programs, data, and the like necessary for each operation of the UE 10. The storage 750 is configured with, for example, a semiconductor memory, a Hard Disk Drive (HDD), or the like.

As illustrated in FIG. 7, the storage 750 stores a UE context 752. Hereinafter, information elements stored in the storage 750 will be described. Note that the UE context 752 is classified into a UE context for each UE 10, a UE context for each PDN connection, and a UE context for each transfer path and/or bearer.

FIG. 8A is an example of the UE context stored for each UE 10. As illustrated in FIG. 8A, the UE context for each UE 10 includes an IMSI, an EMM State, a GUTI, an ME Identity, and a UE NBIFOM capability.

The IMSI is identification information to be assigned to a user (subscriber) using the UE 10.

The EMM State indicates a mobility management state of the UE 10. For example, the EMM State may be EMM-REGISTERED in which the UE 10 is registered with the network (registered state) or EMM-DEREGISTERD in which the UE 10 is not registered with the network (deregistered state).

The GUTI is an abbreviation of "Globally Unique Temporary Identity," and is temporary identification information of the UE 10. The GUTI is configured with identification information of the MME 40 (Globally Unique MME Identifier (GUMMEI)) and identification information of the UE 10 in a specific MME 40 (M-TMSI).

The ME identity is an ID of an ME, and may be, for example, an IMEI/IMISV.

A UE NBIFOM capability denotes an NBIFOM capability of the UE 10. The UE NBIFOM capability denotes identification information, for each UE 10, indicating whether the capability of establishing the first PDN connection is supported. In other words, the UE NBIFOM capability denotes identification information, for each UE 10, indicating whether the NBIFOM function is supported.

More specifically, for example, the NBIFOM capability may include "allowed" or "Not allowed".

Note that the NBIFOM function may include information indicating provision of a function of establishing a multi-access PDN connection.

Alternatively, the UE NBIFOM capability may be identification information indicating that the UE 10 has the capability of establishing the first PDN connection. That is, the existence of the UE NBIFOM capability in the storage of the UE 10 may mean that the UE 10 has the function of establishing the first PDN connection.

In other words, the UE NBIFOM capability may be identification information indicating that the UE 10 supports the NBIFOM function. That is, the existence of the UE NBIFOM capability in the storage of the UE 10 may mean that the UE 10 supports the NBIFOM function.

FIG. 8B illustrates an example of the UE context for each PDN connection. As illustrated in FIG. 8B, the UE context for each PDN connection includes at least a PDN connection ID, an APN in Use, an IP address, a Default Bearer, a WLAN offload ability, a UE allowed mode, and an Operation mode.

The PDN connection ID is identification information for identifying a PDN connection. The UE 10, the TWAG 74, and the PGW 30 may store the same identification information.

The APN in Use is an APN that has been used by the UE 10 most recently. This APN may include identification information of the network and identification information of a default operator.

The IP Address is an IP address assigned to the UE 10 through the PDN connection, and may be an IPv4 address or an IPv6 prefix.

The Default Bearer is EPS bearer identification information for identifying a default bearer in this PDN connection.

Note that the UE 10 may establish multiple default bearers for a PDN connection, in a case where the PDN connection is a multi-access PDN connection. Therefore, the multi-access PDN connection may be managed in association with the multiple default bearers. Specifically, EPS bearer identification information corresponding to each default bearer may be managed in association with the multi-access PDN connection.

Furthermore, the UE 10 may manage a default bearer and an access network in association with each other.

Specifically, the UE 10 may store the EPS bearer identification information identifying each of the default bearer for the access network A and the default bearer for the access network B. Here, the default bearer for an access network may be a default bearer for an access system of the access network. Therefore, the UE 10 may store a default bearer for a 3GPP access and a default bearer for a WLAN access in association with a multi-access PDN connection.

The default bearer for the multi-access PDN connection may be a default bearer that is being established by the UE 10. In other words, the UE 10 stores one default bearer for the multi-access PDN connection in a state where only one default bearer is established for the multi-access PDN connection, and the UE 10 may store two default bearers for the multi-access PDN connection in a state where two default bearers are established for the multi-access PDN connection.

Furthermore, the UE 10 may store information indicating a default access (Default Assess) in the multi-access PDN connection, for the multi-access PDN connection. Note that the default access may be information indicating a 3GPP access or a WLAN access. The 3GPP access may be an access system that is not the WLAN access. More specifically, the 3GPP access may be information indicating an access network including an E-UTRAN access, a UTRAN access, and a GERAN access.

Alternatively, the default access may include more detailed information. For example, the default access may be one of E-UTRAN access, UTRAN access, and GERAN access.

In a case where multiple default bearers are established, the UE 10 may select a default bearer based on the default access, and may transmit and/or receive user data by using the selected default bearer.

The WLAN offload ability is WLAN offload permission information indicating whether a communication associated with the PDN connection allows offloading the connection to the WLAN by using an interworking function between the WLAN and the 3GPP, or the 3GPP access is maintained.

The UE allowed mode is an operation mode to be allowed by the UE 10. This identification information may indicate the UE initiated mode, the Network Initiated mode, or both thereof.

The Operation mode is identification information of a mode that indicates which one of the UE 10 and a network takes an initiative in transmitting and/or receiving data or is allowed to initiate communication control in a case where the current PDN connection is the first PDN connection.

FIG. 8C illustrates a UE context for each bearer. The UE context for each bearer includes transfer path identification information and a Routing Rule.

The transfer path identification information is information for identifying a transfer path and/or bearer. The transfer path identification information may be an EPS bearer ID, for example.

Furthermore, the transfer path identification information may be associated with the TFT.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60. Alternatively, the Routing rule may be a value that the UE 10 stores beforehand as a default value.

An IP flow may be switched by including an IP header in a Routing Filter. Alternatively, the UE 10 may switch the flow for each application by including an application ID in the Routing Filter. Alternatively, the Routing Filter may include a TFT.

The Routingu Rule may store multiple rules (regulations). Furthermore, the Routing rule may include a priority for each rule.

FIG. 8D illustrates a TWAG Capability. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

The UE 10 may store the NBIFOM capability in association with the TWAG ID. Furthermore, the NBIFOM capabilities of multiple TWAGs 74 may be stored.

FIG. 8E illustrates an example of a Network capability. In the Network capability, the NBIFOM capability is stored for each network, i.e., for each PGW 30.

Here, the NBIFOM capability denotes identification information indicating whether the capability of establishing the first PDN connection is supported for each network. More specifically, for example, the NBIFOM capability may include "allowed" or "Not allowed".

Alternatively, the NBIFOM capability may be identification information indicating the capability of establishing the first PDN connection. That is, the existence of the NBIFOM capability may mean that the PGW 30 and/or the network is a gateway having a function of establishing the first PDN connection.

As illustrated in FIG. 8E, the TWAG 74 stores the NBIFOM capability in association with the PGW ID. Furthermore, as illustrated in FIG. 4B, the NBIFOM capabilities may be stored in association with the multiple PGWs 30, respectively.

The PGW ID is information for identifying the PGW 30. The PGW ID may be an APN, for example.

FIG. 8F illustrates an MME capability. In the MME capability, identification information (NBIFOM capability) is stored for each MME 40, the information indicating whether the capability of establishing the first PDN connection is supported. In other words, the identification information indicates whether the MME 40 supports the NBIFOM function. Specifically, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. That is, the existence of the NBIFOM capability in the storage may mean that the MME 40 is a gateway having the function of establishing the first PDN connection. In other words, the existence of the NBIFOM capability in the storage may mean that the MME 40 is a gateway supporting the NBIFOM function.

The UE 10 may store the NBIFOM capability in association with the MME ID.

FIG. 8G illustrates an SGW capability. In the SGW capability, identification information (NBIFOM capability) is stored for each SGW 35, the information indicating whether capability of establishing the first PDN connection is supported. In other words, the identification information indicates whether the SGW 35 supports the NBIFOM function. Specifically, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. That is, the existence of the NBIFOM capability in the storage may mean that the SGW 35 is a gateway having the function of establishing the first PDN connection. In other words, the existence of the NBIFOM capability in the storage may mean that the SGW 35 is a gateway supporting the NBIFOM function.

The UE 10 may store the NBIFOM capability in association with the SGW ID.

The TWAG capability, the Network capability, the MME capability, and the SGW capability may be included in the UE context, or may be information separated from the UE context.

That is, the UE 10 may store the TWAG Capability and the Network capability included in the UE context, or may store the TWAG Capability and the Network capability separately from the UE context.

1.2.4. PGW Components

Figure 9:
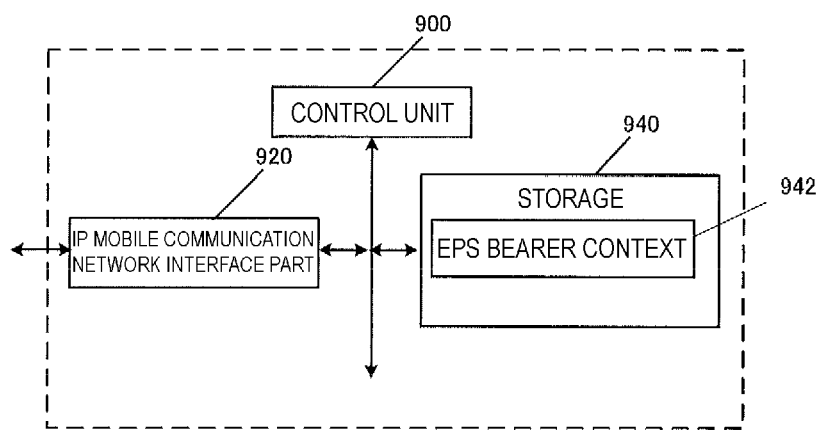
FIG. 9 is a diagram illustrating a functional configuration of a PGW.

Next, the components of the PGW 30 will be described. FIG. 9 illustrates a device configuration of the PGW 30. As illustrated in FIG. 9, the PGW 30 includes an IP mobile communication network interface unit 920, a control unit 900, and a storage 940. The IP mobile communication network interface unit 920 and the storage 940 are connected to the control unit 900 via a bus.

The control unit 900 serves as a function unit for controlling the PGW 30. The control unit 900 implements various processes by reading out and executing various programs stored in the storage 940.

The IP mobile communication network interface unit 920 serves as a data transmission and/or reception unit configured to transmit and/or receive user data and/or a control message, and also serves as a function unit through which the PGW 30 is connected to the SGW 35 and/or the PCRF 60 and/or the ePDG 65 and/or the AAA 55 and/or the GW 74.

The storage 940 serves as a function unit for storing programs, data, and the like necessary for each operation of the PGW 30. The storage 940 is configured with, for example, a semiconductor memory, a Hard Disk Drive (HDD), or the like.

As illustrated in FIG. 9, the storage 940 stores an EPS bearer context 942. Note that an EPS bearer context includes an EPS bearer context stored for each UE 10, an EPS bearer context stored for each APN, an EPS bearer context stored for each PDN connection, and an EPS bearer context stored for each transfer path and/or bearer.

First, the EPS bearer context for each UE 10 will be described. FIG. 10A illustrates an example of the EPS bearer context for each UE 10. As illustrated in FIG. 10A, the EPS bearer context includes at least an IMSI, an ME identity, an MSISDN, and a UE NBIFOM capability.

The IMSI is information for identifying a user of the UE 10.

The ME identity is an ID of an ME, and may be, for example, an IMEI/IMISV.

The MSISDN represents the phone number of the UE 10.

A UE NBIFOM capability denotes an NBIFOM capability of the UE 10. The UE NBIFOM capability denotes identification information, for each UE 10, indicating whether the capability of establishing the first PDN connection is supported. More specifically, for example, the NBIFOM capability may include "allowed" or "Not allowed".

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

Next, the EPS bearer context for each PDN connection will be described. FIG. 10B illustrates an example of the EPS bearer context for each PDN connection.

As illustrated in FIG. 10B, the context includes at least a PDN connection ID, an IP address, a PDN type, an APN, a Network allowed mode, and an Operation mode.

The PDN connection ID is identification information for identifying a PDN connection. The UE 10, the TWAG 74, the MME 40, and the PGW 30 may store the same identification information.

The IP Address indicates an IP address assigned to the UE 10 for the PDN connection. The IP address may be an IPv4 and/or IPv6 prefix.

The PDN type indicates the type of IP address. The PDN type indicates IPv4, IPv6, or IPv4v6, for example.

The APN is a label indicating an access destination in the network, in accordance with the DNS naming convention.

The Network allowed mode indicates an Operation mode allowed by the network. The Network allowed mode may include the UE Initiated mode, the Network Initiated mode, or both thereof.

The Operation mode is identification information of a mode that indicates which one of the UE 10 and a network takes an initiative in transmitting and/or receiving data or is allowed to initiate communication control in a case where the current PDN connection is the first PDN connection.

More specifically, for example, the UE Initiated mode in which the UE 10 is allowed to initiate the communication control or the Network Initiated mode in which the network is allowed to initiate the communication control may be identified.

Next, an example of the EPS bearer context for each transfer path and/or bearer will be described with reference to FIG. 10C. As illustrated in FIG. 10C, the context includes at least transfer path identification information and a Routing Rule.

The transfer path identification information is information for identifying a transfer path and/or bearer. The transfer path identification information may be an EPS bearer ID, for example.

Furthermore, the transfer path identification information may be associated with the TFT.

The Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60. Alternatively, the Routing rule may be a value that the UE 10 stores beforehand as a default value.

The Routing Filter may include an IP header and the PGW 30 switches the IP flow. Alternatively, by including an application ID in the Routing Filter, the PGW 30 may switch the flow for each application. Alternatively, the Routing Filter may include a TFT.

The Routingu Rule may store multiple rules. Furthermore, the Routing rule may include a priority for each rule.

Furthermore, the PGW 30 may establish the default bearer for each PDN connection established with the UE 10, and store the EPS bearer identification information identifying the default bearer.

Note that the PGW 30 may establish multiple default bearers for a PDN connection, in a case where the PDN connection is a multi-access PDN connection. Therefore, the multi-access PDN connection may be managed in association with the multiple default bearers. Specifically, EPS bearer identification information corresponding to each default bearer may be managed in association with the multi-access PDN connection.

Furthermore, the PGW 30 may manage the default bearers and the access network in association with each other.

Specifically, the PGW 30 may store the EPS bearer identification information identifying each of the default bearer for the access network A and the default bearer for access network B. Here, the default bearer for an access network may be a default bearer for an access system of the access network. Therefore, the PGW 30 may store the default bearer for 3GPP access and the default bearer for a WLAN access in association with the multi-access PDN connection.

The default bearer for the multi-access PDN may be a default bearer that is being established between the PGW 30 and the UE 10. In other words, the PGW 30 stores one default bearer for the multi-access PDN connection in a state where only one default bearer is established for the multi-access PDN connection, and the PGW 30 may store two default bearers for the multi-access PDN connection in a state where two default bearers are established for the multi-access PDN connection.

Furthermore, the PGE 30 may store information indicating a default access (Default Assess) in the multi-access PDN connection, for the multi-access PDN connection. Note that the default access may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the default access may include more detailed information. For example, the default access may be one of E-UTRAN access, UTRAN access and GERAN access.

When multiple default bearers are established, the PGW 30 may select a default bearer based on the default access, and transmit and/or receive user data by using the selected default bearer.

FIG. 10D illustrates the TWAG Capability. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

The PGW 30 may store the NBIFOM capability in association with the TWAG ID.

FIG. 10E illustrates an example of the Network capability. In the Network capability, the NBIFOM capability is stored for each network, i.e., for each PGW 30.

Here, the NBIFOM capability denotes identification information indicating whether the capability of establishing the first PDN connection is supported for each network. More specifically, for example, the NBIFOM capability may include "allowed" or "Not allowed".

Alternatively, the NBIFOM capability may be identification information indicating the capability of establishing the first PDN connection. That is, the existence of the NBIFOM capability may mean that the PGW 30 and/or the network is a gateway having the function of establishing the first PDN connection.

As illustrated in FIG. 10E, the PGW 30 stores the NBIFOM capability in association with the PGW ID. Furthermore, as illustrated in FIG. 4B, the NBIFOM capabilities may be stored in association with the multiple PGWs 30, respectively.

The PGW ID may be any information for identifying the PGW 30, and may be, for example, an APN.

FIG. 10F illustrates the MME capability. In the MME capability, identification information (NBIFOM capability) is stored for each MME 40, the information indicating whether the capability of establishing the first PDN connection is supported. In other words, the identification information indicates whether the MME 40 supports the NBIFOM function. Specifically, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. That is, the existence of the NBIFOM capability in the storage may mean that the MME 40 is a gateway having the function of establishing the first PDN connection. In other words, the existence of the NBIFOM capability in the storage may mean that the MME 40 is a gateway supporting the NBIFOM function.

The PGW 30 may store the NBIFOM capability in association with the MME ID.

FIG. 10G illustrates the SGW capability. In the SGW capability, identification information (NBIFOM capability) is stored for each SGW 35, the information indicating whether capability of establishing the first PDN connection is supported. In other words, the identification information indicates whether the SGW 35 supports the NBIFOM function. Specifically, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. That is, the existence of the NBIFOM capability in the storage may mean that the SGW 35 is a gateway having the function of establishing the first PDN connection. In other words, the existence of the NBIFOM capability in the storage may mean that the SGW 35 is a gateway supporting the NBIFOM function.

The PGW 30 may store the NBIFOM capability in association with the SGW ID.

The TWAG capability, the Network capability, the MME capability, and the SGW capability may be included in the EPS bearer context, or may be information separated from the UE context.

1.2.5. PCRF Components

Figure 11:
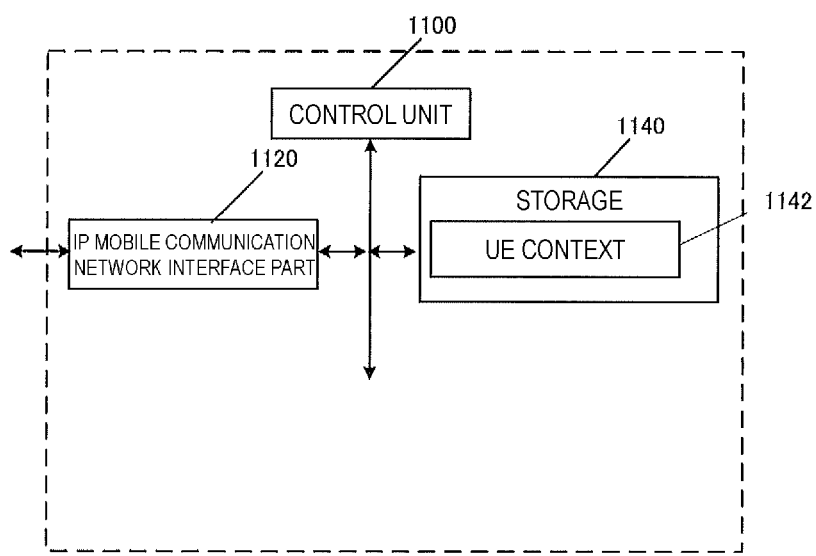
FIG. 11 is a diagram illustrating a functional configuration of a PCRF.

Next, the components of the PCRF 60 will be described. FIG. 11 illustrates a device configuration of the PCRF 60. As illustrated in FIG. 11, the PCRF 60 includes an IP mobile communication network interface unit 1120, a control unit 1100, and a storage 1140. The IP mobile communication network interface unit 1120 and the storage 1140 are connected to the control unit 1100 via a bus.

The control unit 1100 serves as a function unit for controlling the PCRF 60. The control unit 1100 implements various processes by reading out and executing various programs stored in the storage 1140.

The IP mobile communication network interface unit 1120 serves as a data transmission and/or reception unit configured to transmit and/or receive user data and/or a control message, and also serves as a function unit through which the PCRF 60 is connected to the PGW 30 and/or the TWAG 74 and/or the AAA 55.

The storage 1140 serves as a function unit for storing programs, data, and the like necessary for each operation of the PCRF 60. The storage 940 is configured with, for example, a semiconductor memory, a Hard Disk Drive (HDD), or the like.

As illustrated in FIG. 11, the storage 1140 stores a UE context 1142. Note that the UE context may be classified into a UE context stored for each UE 10 and a UE context stored for each PDN connection.

FIG. 12A illustrates the UE context for each UE 10. As illustrated in FIG. 12A, the context includes at least a Subscriber ID and UE NBIFOM capability.

The Subscriber ID is identification information of a user. For example, the subscriber ID may be an IMSI.

A UE NBIFOM capability denotes an NBIFOM capability of the UE 10. The UE NBIFOM capability denotes identification information, for each UE 10, indicating whether the capability of establishing the first PDN connection is supported. In other words, the UE NBIFOM capability denotes identification information indicating whether the UE 10 supports the NBIFOM function. More specifically, for example, the NBIFOM capability may include "allowed" or "Not allowed".

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage may mean that the UE 10 supports the NBIFOM function.

Next, the UE context for each PDN connection will be described. FIG. 12B illustrates an example of the UE context for each PDN connection. As illustrated in FIG. 12B, the context may include at least an APN, an Operation mode, a Network Policy, a Charging Rule, a PCC Rule, and a QoS Rule.

The APN is a label indicating an access destination in the network, in accordance with the DNS naming convention.

The Operation mode is identification information of a mode that indicates which one of the UE 10 and a network takes an initiative in transmitting and/or receiving data or is allowed to initiate communication control in a case where the PDN connection is the first PDN connection.

More specifically, for example, an Operation mode that allows the UE 10 to initiate the communication control may be the UE Initiated mode.

Furthermore, an Operation mode that allows the network and/or the PGW 30 and/or the PCRF 60 to initiate the communication control may be a Network Initiated mode.

The Network Policy is a communication control policy on the network side, and may include the Network allowed mode. Alternatively, the PCRF 60 may store the Network allowed mode separately from the Network Policy.

The Charging Rule is a regulation on charging. In accordance with the Charging Rule determined by the PCRF 60, the PCEF 60 performs charging.

The PCC Rule is a regulation relating to control of the Network Policy and Charging Rule. In accordance with the PCC Rule, the PCEF performs communication control and charging.

The QoS Rule is a regulation relating to QoS of the flow. The QoS Rule may be associated with the PCC Rule.

FIG. 12C illustrates the UE context for each transfer path and/or bearer. As illustrated in FIG. 12C, the UE context for each transfer path and/or bearer includes at least a Routing Rule.

The Routing Rule indicates an association of a Routing Filter, and a Routing address or Routing access type. According to such an association, whether using a communication path through the 3GPP access network or using a transfer path through the WLAN access network is determined.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the UE 10 and/or the TWAG 74 and/or the PGW 30. Alternatively, the Routing Rule may be a value that the PCRF 60 stores beforehand as a default value. In this case, the PCRF 60 may determine the default value of the Routing Rule in accordance with the PCC Rule.

A Routing Filter may include an IP header to switch an IP flow. Alternatively, the Routing Filter may include an application ID to switch the flow for each application. Alternatively, the Routing Filter may include a TFT.

The Routingu Rule may store multiple rules. Furthermore, the Routing rule may include a priority for each rule.

FIG. 12D illustrates an example of the TWAG capability stored in the TWAG 74. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

As illustrated in FIG. 4A, an NBIFOM capability may be stored in association with a TWAG ID, which is the identification information of the TWAG 74. In a case of not being associated with the TWAG ID, the NBIFOM capability may mean a capability of the TWAG 74 to be stored.

In a case where the TWAG ID and the NBIFOM capability are stored in association with each other, the PCRF 60 may store the TWAG capability of multiple TWAGs 74.

FIG. 12E illustrates an example of the Network capability stored in the PCRF 60. In the Network capability, the NBIFOM capability is stored for each network, i.e., for each PGW 30.

Here, the NBIFOM capability denotes identification information indicating whether the capability of establishing the first PDN connection is supported for each network. In other words, the identification information indicates whether the PGW 30 supports the NBIFOM function. More specifically, for example, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. In other words, the NBIFOM capability may be identification information indicating that a gateway supports the NBIFOM function. That is, the existence of the NBIFOM capability in the storage may mean that the PGW 30 is a gateway having the function of establishing the first PDN connection. In other words, the existence of the NBIFOM capability in the storage may mean that the PGW 30 is a gateway supporting the NBIFOM function.

FIG. 12F illustrates the MME capability. In the MME capability, identification information (NBIFOM capability) is stored for each MME 40, the information indicating whether the capability of establishing the first PDN connection is supported. In other words, the identification information indicates whether the MME 40 supports the NBIFOM function. Specifically, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. That is, the existence of the NBIFOM capability in the storage may mean that the MME 40 is a gateway having the function of establishing the first PDN connection. In other words, the existence of the NBIFOM capability in the storage may mean that the MME 40 is a gateway supporting the NBIFOM function.

The PCRF 60 may store the NBIFOM capability in association with the MME ID.

FIG. 12G illustrates the SGW capability. In the SGW capability, identification information (NBIFOM capability) is stored for each SGW 35, the information indicating whether capability of establishing the first PDN connection is supported. In other words, the identification information indicates whether the SGW 35 supports the NBIFOM function. Specifically, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. That is, the existence of the NBIFOM capability in the storage may mean that the SGW 35 is a gateway having the function of establishing the first PDN connection. In other words, the existence of the NBIFOM capability in the storage may mean that the SGW 35 is a gateway supporting the NBIFOM function.

The PCRF 60 may store the NBIFOM capability in association with the SGW ID.

1.2.6. MME Configuration

The device configuration of the MME 40 will be described. The MME 40 includes an IP mobile communication network interface unit 320, a control unit 300, and a storage 340. The IP mobile communication network interface unit 320 and the storage 340 are connected to the control unit 300 via a bus.

The control unit 300 is a function part for controlling the MME 40. The control unit 300 implements various processes by reading out and executing various programs stored in the storage 340.

The IP mobile communication network interface unit 320 serves as a function unit through which the MME 40 is connected to the PGW 30.

The storage 340 serves as a function unit for storing programs, data, and the like necessary for each operation of the MME 40. The storage 340 includes, for example, a semiconductor memory, a Hard Disk Drive (HDD), or the like.

The storage 340 stores an MME capability 342, a Network capability 344, and an EPS bearer context 346. Hereinafter, information elements stored in the storage 340 will be described.

Information elements stored in the storage 340 will be described. An example of the MME capability stored in the MME 40 will be described. In the MME capability, identification information (NBIFOM capability) is stored for each MME 40, the information indicating whether the capability of establishing the first PDN connection is supported. In other words, the identification information indicates whether the MME 40 supports the NBIFOM function. Specifically, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. That is, the existence of the NBIFOM capability in the storage may mean that the MME 40 is a gateway having the function of establishing the first PDN connection. In other words, the existence of the NBIFOM capability in the storage may mean that the MME 40 is a gateway supporting the NBIFOM function.

The NBIFOM capability may be stored in association with the MME ID, which is identification information of the MME 40. In a case of not being associated with the MME ID, the NBIFOM capability may mean capability of the MME 40 to be stored.

In a case where the MME ID and the NBIFOM capability are stored in association with each other, the MME 40 may store the MME capability of multiple MMEs 40.

In this case, when the UE 10 performs a handover to another MME 40, the MME 40 may select an MME 40 to which the handover is made, based on the MME Capability.

Next, the Network capability 344 will be described. An example of the Network capability stored in the MME 40 will be described. In the Network capability, the NBIFOM capability is stored for each network, i.e., for each PGW 30.

Here, the NBIFOM capability denotes identification information indicating whether the capability of establishing the first PDN connection is supported for each network. In other words, the identification information indicates whether the PGW 30 supports the NBIFOM function. More specifically, for example, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. In other words, the NBIFOM capability may be identification information indicating that a gateway supports the NBIFOM function. That is, the existence of the NBIFOM capability in the storage may mean that the PGW 30 is a gateway having the function of establishing the first PDN connection. In other words, the existence of the NBIFOM capability in the storage may mean that the PGW 30 is a gateway supporting the NBIFOM function.

The MME 40 stores the NBIFOM capability in association with the PGW ID. Furthermore, the NBIFOM capability may be stored in association with each of multiple PGWs 30.

The PGW ID may be any information for identifying the PGW 30, and may be, for example, an Access Point Name (APN).

Next, the EPS bearer context will be described. The EPS bearer context may be classified into the EPS bearer context for each UE 10 stored for each UE 10, the EPS bearer context for each PDN connection, and the EPS bearer context for each bearer and/or transfer path.

Information elements included in the EPS bearer context for each UE 10 will be described. The MME 40 stores, for each UE 10, a UE NBIFOM capability and an NBIFOM allowed.

A UE NBIFOM capability denotes an NBIFOM capability of the UE 10. The UE NBIFOM capability denotes identification information, for each UE 10, indicating whether the capability of establishing the first PDN connection is supported. In other words, the UE NBIFOM capability denotes identification information indicating whether the UE 10 supports the NBIFOM function. More specifically, for example, the UE NBIFOM capability may include "allowed" or "Not allowed".

Note that the NBIFOM function may include information indicating provision of a function of establishing a multi-access PDN connection.

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage may mean that the UE 10 supports the NBIFOM function.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection. In other words, in the present embodiment, the UE 10 is allowed to establish the multi-access PDN connection by using the APN 1. Note that the APN 1 is also allowed to establish the known PDN connection, rather than the multi-access PDN connection.

In addition, in the present embodiment, the APN 2 is not associated with the NBIFOM allowed. That is, in the present embodiment, the APN 2 is not allowed to establish the multi-access PDN connection. That is, in the present embodiment, the UE 10 cannot establish the multi-access PDN connection by using the APN 2.

The NBIFOM allowed may be stored before the PDN connection is established.

The MME 40 may access the HSS 50 to acquire the NBIFOM allowed before the PDN connection is established and/or while the establishment procedure is being performed.

Furthermore, the EPS bearer context for each UE 10 may include identification information of the UE 10. The identification information of the UE 10 may be an IMSI.

The EPS bearer context for each PDN connection will be described. The EPS bearer context for each PDN connection includes a PDN connection ID, a Network allowed mode, an Operation mode, a User plane connection ID, an MME MAC address, and an NBIFOM Permission.

The PDN connection ID is identification information for identifying a PDN connection. The UE 10, the MME 40, and the PGW 30 may store the same identification information.

The Operation mode is identification information of a mode that indicates which one of the UE 10 and a network takes an initiative in transmitting and/or receiving data or is allowed to initiate communication control in a case where the PDN connection is the first PDN connection.

More specifically, for example, an Operation mode that allows the UE 10 to initiate the communication control may be the UE Initiated mode.

Furthermore, an Operation mode that allows the network and/or the PGW 30 and/or the PCRF 60 to initiate the communication control may be a Network Initiated mode.

The Network allowed mode indicates an Operation mode allowed by the network. The Network allowed mode may include the UE Initiated mode, the Network Initiated mode, or both thereof.

The User plane connection ID is identification information for identifying a connection used for transmission of user data when the UE 10 establishes a transfer path via the MME 40.

The NBIFOM permission is information indicating that this PDN connection has established the multi-access PDN connection. In other words, the NBIFOM permission indicates that the first PDN connection has been established.

That is, the MME 40 having stored the NBIFOM permission means that the PDN connection is the first PDN connection.

The NBIFOM permission is identification information that is stored in the MME 40 upon establishment of the PDN connection.

The MME 40 may access the HSS 50 to acquire the NBIFOM permission while the PDN connection is being established. Alternatively, the MME 40 may store the NBIFOM Permission, based on the multi-access PDN connection having been established.

Next, the EPS bearer context for each bearer and/or transfer path will be described. The EPS bearer context for each bearer and/or transfer path may include the transfer path identification information and the Routing Rule.

The transfer path identification information is information for identifying a transfer path and/or bearer. The transfer path identification information may be an EPS bearer ID, for example.

The Routing Rule indicates an association of a Routing Filter, and a Routing address or Routing access type.

Whether using a communication path through the 3GPP access network or using a communication path through the WLAN access network is determined, based on such an association.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the MME 40. Alternatively, the Routing address may be an IP address of a Mobile Access Gateway (MAG).

The Routing Rule may be notified from the PGW 30 or the PCRF 60, or may be notified from the UE 10. Alternatively, the Routing Rule may be a value that the MME 40 stores beforehand as a default value.

A Routing Filter may include an IP header to switch an IP flow. Alternatively, the Routing Filter may include an application ID to switch the flow for each application. Alternatively, the Routing Filter may include the TFT.

The Routingu Rule may store multiple rules. Furthermore, the Routing rule may include a priority for each rule.

In the SGW capability, identification information (NBIFOM capability) is stored for each SGW 35, the information indicating whether capability of establishing the first PDN connection is supported. In other words, the identification information indicates whether the SGW 35 supports the NBIFOM function. Specifically, the NBIFOM capability may include "allowed" or "Not allowed".

Note that the NBIFOM function may include information indicating provision of a function of establishing a multi-access PDN connection.

Alternatively, the NBIFOM capability may be identification information indicating the capability of establishing the first PDN connection. That is, the existence of the NBIFOM capability in the storage may mean that the SGW 35 is a gateway having the function of establishing the first PDN connection. In other words, the existence of the NBIFOM capability in the storage may mean that the SGW 35 is a gateway supporting the NBIFOM function.

The MME 40 may store the NBIFOM capability in association with the SGW ID.

The MME Capability and the Network capability may be included in the EPS bearer context.

1.3. Description of Initial State

An initial state in the present embodiment will be described. The initial state in the present embodiment may be a first initial state as will be described later.

Note that the initial state in the present embodiment may not necessarily be limited to the first initial state.

1.3.1. Description of First Initial State

The first initial state will be described. In the first state, the UE 10 has not established the first PDN connection with the core network 90. However, the UE 10 has already established the second PDN connection. In greater detail, the UE 10 has not established the first PDN connection with a PGW_A 1310. However, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of a gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the second PDN connection may be configured with a transfer path between the UE 10 and the PGW 30 through the access network A. Thus, the second PDN connection may be configured with a transfer path that is a combination of a transfer path between the UE 10 and the eNB 45, a transfer path between the eNB 45 and the SGW 35, and a transfer path between the SGW 35 and the PGW_B 1320. Here, the transfer path may be a bearer.

As described above, in the first initial state, the UE 10 may be in a state of being connected to the core network 90 via the access network A.

Note that the UE 10 may not necessarily be connected to the core network 90 via the access network B. In other words, the UE 10 may not necessarily perform an attach through the WALN access network.

Alternatively, the UE 10 may be in a state of being connected to the core network 90 via the access network B. In this case, the UE 10 may perform an attach procedure initiated by the UE 10 to establish a third PDN connection.

Note that the third PDN connection may be established with a gateway selected by using the APN 2. Alternatively, the third PDN connection may be established with a gateway selected by using another APN different from either the APN 1 or the APN 2.

The first initial state has been described above; however, the first initial state is not limited to the above-described state, and may be any state in which, for example, the multi-access PDN connection has not been established through the access network A.

1.3.2. Description of Procedure for Leading to First Initial State

Figure 15:
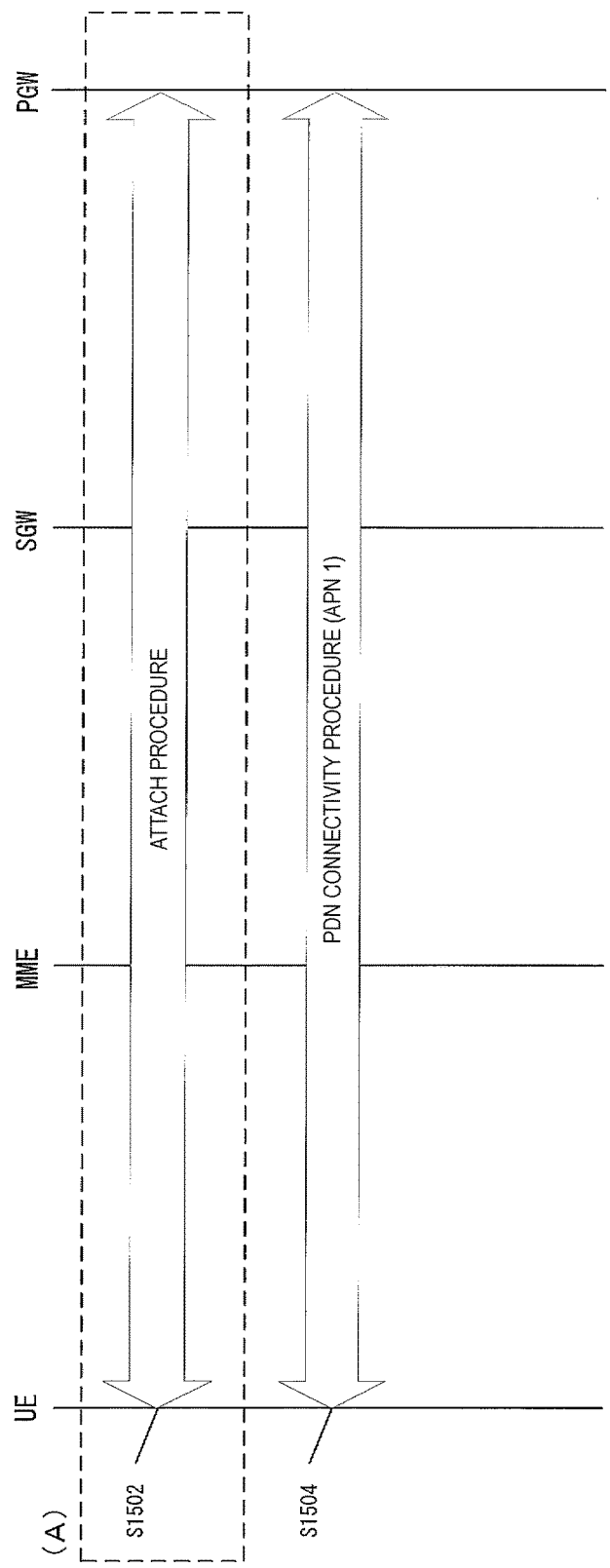
FIG. 15 is a diagram illustrating a procedure for leading to an initial state.

A procedure for leading to a first initial state will be described with reference to FIG. 15. In the procedure for leading to the first initial state, at least a PDN connectivity procedure to the core network 90 through the access network A, illustrated in (A) of FIG. 15, is performed. The first initial state is a state after at least the attach procedure to the core network 90 through the access network A, illustrated in (A) of FIG. 15, is performed.

Next, details of the attach procedure to the core network 90 through the access network A will be described.

The UE 10 performs an attach procedure for establishing the second PDN connection with the core network 90 through the access network A. In greater detail, the UE 10 establishes, via the eNB 45 arranged in the access network A and the SGW 35 arranged in the core network 90, the PDN connection with the PGW_B 1320 arranged in the core network 90. Note that the MME 40 arranged in the core network 90 handles establishment and management of the PDN connection. The MME 40 also selects the SGW 35, and selects the PGW 30 using an APN.

Specifically, in the establishment of the second PDN connection, the UE 10 transmits an Attach request to the MME 40 via the eNB 45. The MME 40 receives the Attach request transmitted from the UE 10. On the basis of the reception of the Attach request, the MME 40 performs a procedure for establishing a security association with the UE 10.

Here, the UE 10 may transmit the Attach request including the APN 2. Alternatively, the UE 10 may transmit the APN 2 to the MME 40 after the security association procedure between the UE 10 and the MME 40 described below is completed.

The MME 40 transmits an Attach accept to the UE 10 via the eNB 45 upon completion of the security association procedure. The MME 40 may transmit an Activate default EPS bearer context request including the APN 2.

The UE 10 receives the Attach accept, which has been transmitted from the MME 40. The UE 10 transmits an Attach complete to the MME 40 via the eNB 45 in response to the Attach accept.

The MME 40 receives the Attach request transmitted from the UE 10.

1.3.3. Description of Multi-Access PDN Connectivity Establishment Procedure

Next, an establishment procedure of the first PDN connection will be described. Here, the initial state may be the first initial state. In the present embodiment, after the establishment of the initial state, the UE 10 performs a PDN connectivity procedure for establishing the first PDN connection with the core network 90 through the access network A. In greater detail, the UE 10 establishes, via the eNB 45 arranged in the access network A and the SGW 35 arranged in the core network 90, the first PDN connection with the PGW_A 1310 arranged in the core network 90.

Note that the first PDN connection may be configured with a transfer path that is a combination of a transfer path between the UE 10 and the eNB 45, a transfer path between the eNB 45 and the SGW 35, and a transfer path between the eNB 45 and the PGW_A 1310. Here, the transfer path may be a bearer.

As illustrated in FIG. 15, the procedure for establishing the first PDN connection may be a PDN connectivity procedure using the APN 1.

Hereinafter, specific examples of the PDN connectivity procedure will be described.

1.4. Examples of PDN Connectivity Procedure

Figure 16:
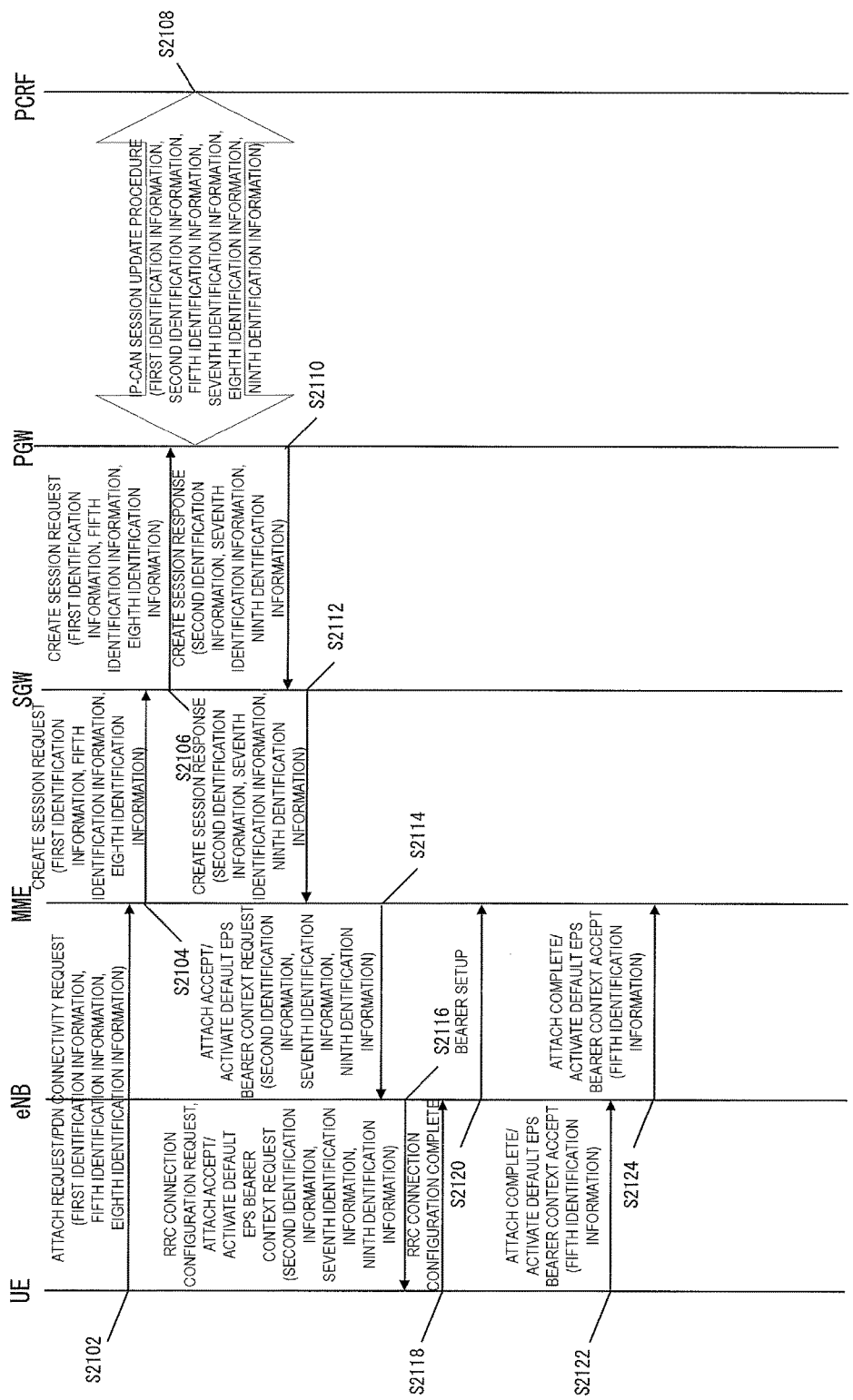
FIG. 16 is a diagram illustrating a first PDN connectivity procedure.

Examples of the first PDN connectivity procedure for establishing the first PDN connection will be described with reference to FIG. 16.

1.4.1. Example of First PDN Connectivity Procedure

An example of the first PDN connectivity procedure will be described with reference to FIG. 16.

The UE 10 first transmits a PDN connectivity request to the MME 40 via the eNB 45 (S2102). The UE 10 may transmit the PDN connectivity request including at least the PDN connectivity request message identity (PDN connectivity request message ID), the Procedure transaction identity (Procedure transaction ID), the Request type, the PDN type, the Protocol discriminator, and EPS bearer identity (EPS bearer ID). Furthermore, the UE 10 may include at least first identification information and/or fifth identification information and/or eighth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit a PCO including the first identification information and/or the fifth identification information and/or the eighth identification information and/or the TFT.

Here, the first identification information may be the UE NBIFOM capability representing that the UE 10 supports the NBIFOM. Note that the NBIFOM capability may be information indicating the provision of the function of establishing the multi-access PDN connection.

Furthermore, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

As described above, the UE 10 may transmit the fifth identification information to request a mode of the multi-access PDN connection. In other words, the UE 10 may transmit the fifth identification information to request the establishment of the multi-access PDN connection corresponding to the mode indicated by the fifth identification information. Note that the mode indicated by the fifth identification information may be selected by the UE 10.

Note that, the UE 10 may be configured to transmit the fifth identification information in a case of requesting the establishment of the multi-access PDN connection in the UE-Initiated mode, and may be configured not to transmit the fifth identification information in a case of requesting the establishment of the multi-access PDN connection in the Network-Initiated mode.

Furthermore, the eighth identification information may be information indicating a default access (Default Assess) in the multi-access PDN connection. The eighth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the eighth identification information may include more detailed information. For example, the eighth identification information may be one of the E-UTRAN access, the UTRAN access and the GERAN access.

As described above, the UE 10 may transmit the eighth identification information to request a default access for the multi-access PDN connection. In other words, the UE 10 may transmit the eighth identification information to request the establishment of the multi-access PDN connection in which the access network indicated by the eighth identification information is used as the default access.

Note that the access network indicated by the eighth identification information may be selected by the UE 10. Furthermore, the UE 10 may select the access network indicated by the eighth identification information based on operator policy such as Inter System Routing Policy (ISRP) received from an Access Network Discovery and Selection Function (ANDSF) server. More specifically, the UE 10 may select the access network indicated by the eighth identification information based on priority information of the access network of the ISRP received from the ANDSF server. For example, since the ISRP indicates that a higher priority is given to a WLAN, the UE 10 may set information indicating the WLAN as the eighth identification information. Note that the UE 10 may select the access network indicated by the eighth identification information based on the ISRP, only in a case where the ISRP is valid or active.

Note that, the UE 10 may be configured to transmit the eighth identification information when requesting the establishment of the multi-access PDN connection in the UE-Initiated mode, and may be configured not to transmit the eighth identification information when requesting the establishment of the multi-access PDN connection in the Network-Initiated mode.

Furthermore, the UE 10 may be configured to transmit the eighth identification information in a case where a default bearer has not been established for the multi-access PDN connection, the establishment of which is to be requested, and may be configured not to transmit the eighth identification information in a case where the default bearer has already been established for the multi-access PDN connection.

More specifically, the UE 10 may be configured to transmit the eighth identification information in a case of establishing a new multi-access PDN connection, and may be configured not to transmit the eighth identification information in a case of adding a transfer path in a state in which the default bearer is established for the multi-access PDN connection through the WLAN access network.

As described above, the UE 10 may make a request for establishing the multi-access PDN connection by transmitting the first identification information and/or the fifth identification information and/or the eighth identification information. In other words, the first identification information and/or the fifth identification information and/or the eighth identification information may be information indicating the request for establishing a multi-access PDN connection.

The PDN connectivity request message ID may be a message type representing the PDN connectivity request message.

The procedure transaction ID may be information for identifying the PDN connectivity procedure.

The APN may be an APN, to which the UE 10 requests a connection. More specifically, the APN may be the APN 1. The UE 10 may include the APN 1 to establish the multi-access PDN connection. Here, the APN 1 may be an APN that is allowed to establish the multi-access PDN connection and/or an APN that is allowed to perform communication based on the NBIFOM.

The request type may be information for identifying the type of PDN connectivity procedure to be requested. For example, since the UE 10 performs an initial connection by using the APN 1, the request type may be the type indicating an attach, rather than the type indicating a handover.

The PDN type may indicate an available IP version. For example, the PDN type may be IPv4, IPv6, or IPv4v6.

The protocol discriminator may be an identifier representing a protocol type currently used for transmission and/or reception of the PDN connectivity request.

The EPS bearer ID may be information identifying the EPS bearer. The EPS bearer ID may be assigned by the MME 40.

The PCO may be protocol information associated with the PDN connection. Furthermore, the PCO may include identification information of the request. Note that the UE 10 may transmit the PCO including the first identification information and/or the fifth identification information and/or the eighth identification information.

The TFT may be information for identifying an IP flow for performing communication by using the PDN connection established in the current PDN connectivity procedure. Note that the IP flow to be identified may vary for each application. Thus, the TFT identifies user data of a certain application.

More specifically, the TFT may include a 5-tuple, or may include identification information such as the application ID. Note that the 5-tuple may include a combination of information of one or more of a transmission-source IP address, a transmission-destination IP address, a transmission-source port number, a transmission-destination port number, and a protocol number.

Note that in the present example, when transmitting the PDN connectivity request, the UE 10 does not request a certain NBIFOM operation mode, and thus, the UE 10 may transmit the PDN connectivity request without including the TFT. In other words, when the UE 10 requests the establishment of the multi-access PDN connection without requesting the certain NBIFOM operation mode, the UE 10 may transmit the PDN connectivity request without including the TFT. More specifically, in a case where the UE 10 includes the first identification information and/or the fifth identification information and/or the eighth identification information, the UE 10 may transmit the PDN connectivity request without including the TFT.

Note that conventionally, the UE 10 is capable of transmit the PCO including information indicating an IFOM support. Here, the IFOM support is identification information representing that the IP Flow Mobility (IFOM) is supported. Furthermore, the IFOM is a technique for switching a communication path of a certain IP flow by using between the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, in a case where the UE 10 includes the first identification information and/or the fifth identification information and/or the eighth identification information in the PCO, the UE 10 does not include the IFOM support. In contrast, in a case where the UE 10 includes the IFOM support in the PCO, the UE 10 does not include the first identification information and/or the fifth identification information and/or the eighth identification information. As described above, it may be possible to not configure both the first identification information and/or the fifth identification information and/or the eighth identification information and the IFOM support to be effective to ensure a clear distinction between the use of the switching of the communication path based on the NBIFOM and the use of the switching of the communication path based on the IFOM.

Thus, the UE 10 is capable of establishing either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

The MME 40 receives the PDN connectivity request transmitted from the UE 10. On the basis of the reception of the PDN connectivity request and/or in accordance with the first identification information and/or the fifth identification information and/or the eighth identification information included in the PDN connectivity request, the MME 40 transmits a Create Session Request to the SGW 35 (S2104).

On the basis of the reception of the PDN connectivity request and/or in accordance with the first identification information and/or the fifth identification information and/or the eighth identification information included in the PDN connectivity request, the MME 40 may transmit the Create Session Request including at least the first identification information and/or the fifth identification information and/or the eighth identification information.

Furthermore, the MME 40 may include the TFT in the Create Session Request, based on the reception of the TFT transmitted from the UE 10.

Furthermore, the TFT may be information for identifying an IP flow that performs communication by using the PDN connection established in the current PDN connectivity procedure. Note that the IP flow to be identified may vary for each application. Thus, the TFT identifies user data of a certain application.

More specifically, the TFT may include a 5-tuple, or may include identification information such as the application ID. Note that the 5-tuple may include a combination of information of one or more of a transmission-source IP address, a transmission-destination IP address, a transmission-source port number, a transmission-destination port number, and a protocol number.

Note that in a case where none of the first identification information and fifth identification information and/or the eighth identification information is included in the PDN connectivity request, the MME 40 may transmit the Create Session Request without including the first identification information and/or the fifth identification information and/or the eighth identification information. Moreover, in a case where the first identification information and/or the fifth identification information and/or the eighth identification information is not included in the PDN connectivity request, the MME 40 may perform a procedure for establishing the single-access PDN connection.

Note that, the MME 40 may be configured to transmit the eighth identification information when requesting the establishment of the multi-access PDN connection in the UE-Initiated mode, and may be configured not to transmit the eighth identification information when requesting the establishment of the multi-access PDN connection in the Network-Initiated mode.

The SGW 35 receives the Create Session Request transmitted from the MME 40. On the basis of the reception of the PDN connectivity request and/or in accordance with the first identification information and/or the fifth identification information and/or the eighth identification information included in the PDN connectivity request, the SGW 35 transmits the Create Session Request to the PGW 30 (S2106).

On the basis of the reception of the session connectivity request and/or in accordance with the first identification information and/or the fifth identification information and/or the eighth identification information included in the session connectivity request, the SGW 35 may transmit the Create Session Request including at least the first identification information and/or the fifth identification information and/or the eighth identification information.

Furthermore, the SGW 35 may include the TFT in the Create Session Request.

Furthermore, the TFT may be information for identifying an IP flow that performs communication by using the PDN connection established in the current PDN connectivity procedure. Note that the IP flow to be identified may vary for each application. Thus, the TFT identifies user data of a certain application.

More specifically, the TFT may include a 5-tuple, or may include identification information such as the application ID. Note that the 5-tuple may include a combination of information of one or more of a transmission-source IP address, a transmission-destination IP address, a transmission-source port number, a transmission-destination port number, and a protocol number.

Note that in a case where none of the first identification information and the fifth identification information and/or the eighth identification information is included in the PDN connectivity request, the SGW 35 may transmit the Create Session Request without including the first identification information and/or the fifth identification information and/or the eighth identification information. Moreover, in a case where the first identification information and/or the fifth identification information and/or the eighth identification information is not included in the PDN connectivity request, the MME 40 may perform a procedure for establishing the single-access PDN connection.

The PGW 30 receives the Create Session Request transmitted from the SGW 35. On the basis of the reception of the Create Session Request, and/or in accordance with the first identification information and/or the fifth identification information and/or the eighth identification information included in the Create Session Request, the PGW 30 may perform an IP-CAN session update procedure with the PCRF 60 (S2108).

On the basis of the reception of the Create Session Request and/or in accordance with the first identification information and/or the fifth identification information and/or the eighth identification information included in the Create Session Request, the PGW 30 may perform the IP-CAN session update procedure including at least the first identification information and/or the fifth identification information and/or the eighth identification information.

Note that the PGW 30 may perform the IP-CAN session update procedure to notify the PCRF 60 of information of the UE 10 and/or the eNB 45 and/or the MME 40 and/or the SGW 35.

The PGW 30 may transmit, to the PCRF 60, a control message in the IP-CAN session procedure, including information indicating whether the PDN connection to be established is the multi-access PDN connection or the single-access PDN connection, and/or the first identification information and/or the fifth identification information and/or the eighth identification information.

More specifically, when the multi-access PDN connection is to be established, the PGW 30 transmits, to the PCRF 60, the information indicating the access network A, the PDN connection ID, the information indicating that the PDN connection is the multi-access PDN connection, and the first identification information and/or the fifth identification information and/or the eighth identification information. Alternatively, when the single-access PDN connection is to be established, the PGW 30 transmits, to the PCRF 60, the information indicating the access network A, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Furthermore, on the basis of the reception of the first identification information and/or the fifth identification information and/or the eighth identification information, the PCRF 60 may transmit, to the PGW 30, a control message in the IP-CAN session update procedure with the PGW 30, the control message including at least the second identification information and/or the seventh identification information and/or the ninth identification information. The detailed description of the second identification information and/or the seventh identification information and/or the ninth identification information will be described later.

Note that the PCRF 60 may perform the IP-CAN session update procedure to notify the PGW 30 of the charging information and/or the QoS control information and/or the routing information.

On the basis of the reception of the Create Session Request or completion of the IP-CAN session update procedure, and/or in accordance with the first identification information and/or the fifth identification information and/or the eighth identification information included in the Create Session Request, and/or in accordance with the second identification information and/or the seventh identification information and/or the ninth identification information included in the IP-CAN session update procedure, the PGW 30 transmits a Create Session Response to the SGW 35 (S2110).

On the basis of the reception of the Create Session Request or completion of the IP-CAN session update procedure, and/or in accordance with the first identification information and/or the fifth identification information and/or the eighth identification information included in the Create Session Request, and/or in accordance with the second identification information and/or the seventh identification information and/or the ninth identification information included in the IP-CAN session update procedure, the PGW 30 transmits the Create Session Response including at least the second identification information and/or the seventh identification information and/or the ninth identification information.

Furthermore, the PGW 30 may include the PDN Address and/or the PDN connection ID and/or the TFT and/or the bearer identification information identifying the default bearer in the Create Session Response.

The bearer identification information identifying the default bearer may be a bearer for the multi-access PDN connection, and may be identification information of a bearer established through E-UTRAN.

Note that a method by which the PGW 30 acquires the second identification information and/or the seventh identification information and/or the ninth identification information is not limited to the above-described method for acquiring the seventh identification information from the PCRF 60 in the IP-CAN session update procedure, and another example may be employed. For example, the PGW 30 may create the second identification information and/or the seventh identification information and/or the ninth identification information and transmit the Create Session Response including the second identification information and/or the seventh identification information and/or the ninth identification information, without acquiring from the PCRF 60 in the IP-CAN session update procedure.

Here, the second identification information may be the NBIFOM capability representing that the network supports the NBIFOM. Note that the NBIFOM capability may be information indicating the provision of the function of establishing the multi-access PDN connection.

Here, the seventh identification information may be an Allowed Mode representing the NBIFOM operation mode, which is allowed for the multi-access PDN connection to be established. In other words, the seventh identification information may be an operation mode allowed by the operator.

As described above, the UE 10 may transmit the seventh identification information to make a notification of the mode of the multi-access PDN connection. In other words, the UE 10 may transmit the seventh identification information to permit the establishment of the multi-access PDN connection corresponding to the mode indicated by the seventh identification information. Note that the mode indicated by the seventh identification information may be selected by the PCRF 60 or the PGE 30. Note that the PCRF 60 or the PGE 30 may transmit the mode indicated by the fifth identification information as the seventh identification information, in a case where the PCRF 60 or the PGE 30 allows the establishment of the multi-access PDN connection in the mode indicated by the fifth identification information requested by the UE 10.

Note that the PCRF 60 or the PGW 30 may determine the Allowed Mode, the seventh identification information based on the operator policy. For example, a policy that allows the establishment of only the PDN connection of the UE-Initiated mode, a policy that allows the establishment of only the PDN connection of the Network-Initiated mode, a policy that allows the establishment of both modes, a policy that prohibits the establishment of both modes, and the like may be managed.

Note that the PCRF 60 or the PGW 30 may acquire the operator policy from the HSS 50 or the like. Alternatively, an operator policy created by an administrator may be stored.

In addition, regarding the operator policy, different policies for the respective subscribers may be managed. Alternatively, different policies for the respective APNs may be managed. For example, for each APN, a different Allowed Mode established for a PDN connection may be managed.

The PCRF 60 or the PGW 30 may include the allowed operation mode in the seventh identification information, based on the Allowed Mode.

In other words, in a case where only the Network-Initiated mode is allowed, the PCRF 60 or the PGW 30 may include the Network-Initiated mode in the seventh identification information. Alternatively, in a case where only the UE-Initiated mode is allowed, the PCRF 60 or the PGW 30 may include the UE-Initiated mode in the seventh identification information.

Note that in a case where the UE-Initiated mode and the Network-Initiated mode are allowed, the seventh identification information may include both the operation modes. Alternatively, in a case where both the UE-Initiated mode and the Network-Initiated mode are allowed and a default operation mode is configured, the seventh identification information may include only the default operation mode. Note that which one of the UE-Initiated mode and the Network-Initiated mode is defined as the default operation mode may be configured based on the operator policy.

Note that, in a case where none of the operation modes is allowed for establishment of the PDN connection, the PCRF 60 may transmit, to the PGW 30, the cause information indicating that the Requested Operation Mode is not allowed.

In a case where none of the operation modes is allowed for establishment of the PDN connection, the PGW 30 may not necessarily notify the MME 40 of the seventh identification information via the SGW 35.

In a case where none of the operation modes is allowed for establishment of the PDN connection, the PGW 30 may transmit, to the MME 40 via the SGW 35, the Create Session Response including the cause information indicating that the Requested Operation Mode is not allowed.

In a case where none of the operation modes is allowed for establishment of the PDN connection, the PGW 30 may notify the MME 40 that there is no allowed operation via the SGW 35.

As described above, in accordance with the Allowed Mode, the PCRF 60 or the PGW 30 may regard an operation mode that is allowed for establishment of the PDN connection as the seventh identification information.

Note that in a case where the Network-Initiated mode is not included in the seventh identification information, the PCRF 60 may not necessarily transmit the TFT to the PGW 30.

In other words, only in the case where the Network-Initiated mode is included in the seventh identification information, the PCRF 60 may transmit the TFT to the PGW 30.

Note that in the case where the Network-Initiated mode is not included in the seventh identification information, the PGW 30 may not necessarily transmit the TFT to the MME 40 via the SGW 35. Thus, in this case, the PGW 30 may not necessarily include the TFT in the Create Session Response.

In other words, only in the case where the Network-Initiated mode is included in the seventh identification information, the PGW 30 may transmit the TFT to the MME 40 via the SGW 35. Thus, in this case, the PGW 30 may include the TFT in the Create Session Response.

The PDN address may be an IP address assigned to the UE 10. For example, the PDN address may be an IPv4 address, or an IPv6 prefix and an interface ID for constituting an IPv6 address. Here, the PGW 30 may assign the IP address of the UE 10. Moreover, the PGW 30 may include the IP address that has been assigned to the UE 10, in the PDN address.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

Furthermore, the ninth identification information may be information indicating a default access (Default Assess) in the multi-access PDN connection. Note that the ninth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the ninth identification information may include more detailed information. For example, the ninth identification information may be one of E-UTRAN access, UTRAN access and GERAN access.

As described above, the PCRF 60 or the PGE 30 may transmit the ninth identification information to notify the UE 10 of the default access for the multi-access PDN connection. In other words, the PCRF 60 or the PGE 30 may transmit the ninth identification information to request the establishment of the multi-access PDN connection in which the access network indicated by the ninth identification information is used as the default access. Note that the access network indicated by the ninth identification information may be selected by the PCRF 60 or the PGE 30. Note that the PCRF 60 or the PGE 30 may transmit the access network indicated by the eighth identification information as the ninth identification information, in a case where the PCRF 60 or the PGE 30 allows the establishment of the multi-access PDN connection for the default access indicated by the eighth identification information requested by the UE 10.

As described above, the establishment of the multi-access PDN connection is permitted by transmitting the second identification information and/or the seventh identification information and/or the ninth identification information. In other words, the second identification information and/or the seventh identification information and/or the ninth identification information may be information indicating that the multi-access PDN connection is to be established or establishment of the multi-access PDN connection is permitted.

Note that, the PCRF 60 and the PGW 30 may be configured to transmit the ninth identification information in a case where a default bearer has not been established for the multi-access PDN connection, the establishment of which is to be requested, and may be configured not to transmit the ninth identification information in a case where the default bearer has already been established for the multi-access PDN connection.

More specifically, the PCRF 60 and the PGW 30 may be configured to transmit the ninth identification information when establishing a new multi-access PDN connection, and may be configured not to transmit the ninth identification information when adding a transfer path in a state in which the default bearer is established for the multi-access PDN connection through the WLAN access network.

The SGW 35 receives the Create Session Response transmitted from the PGW 30. On the basis of the reception of the Create Session Response and/or in accordance with the second identification information and/or the seventh identification information and/or the ninth identification information included in the Create Session Response, the SGW 35 transmits the Create Session Response to the MME 40 (S2112).

On the basis of the reception of the Create Session Response and/or in accordance with the second identification information and/or the seventh identification information and/or the ninth identification information included in the Create Session Response, the SGW 35 may transmit the Create Session Response including at least the second identification information and/or the seventh identification information and/or the ninth identification information.

Furthermore, the SGW 35 may include the PDN Address and/or the PDN connection ID and/or the TFT in the Request Session Response.

The MME 40 receives the Create Session Response transmitted from the SGW 35. On the basis of the reception of the Create Session Response and/or in accordance with the second identification information and/or the seventh identification information and/or the ninth identification information included in the Create Session Response, the MME 40 transmit the Activate default EPS bearer context request to the eNB 45 (S2114).

On the basis of the reception of the Create Session Response, and/or in accordance with the second identification information and/or the seventh identification information and/or the ninth identification information included in the Create Session Response, the MME 40 may transmit the Activate default EPS bearer context request including at least an Activate default EPS bearer context request message identity (Activate default EPS bearer context request message ID), a Procedure transaction ID, an APN, a PDN address, a protocol discriminator, an EPS bearer ID, and EPS QoS. On the basis of the reception of the Create Session Response, and/or in accordance with the second identification information and/or the seventh identification information and/or the ninth identification information included in the Create Session Response, the MME 40 may further include at least the second identification information and/or the seventh identification information and/or the ninth identification information in the Activate default EPS bearer context request. Moreover, the MME 40 may include the PCO and/or the ESM Cause and/or the TFT and/or the bearer identification information identifying the default bearer, and/or the PDN connection ID and/or the PDN connection attribute information, in the Activate default EPS bearer context request. Note that the MME 40 may transmit the PCO including the second identification information and/or the seventh identification information and/or the ninth identification information and/or the TFT and/or the bearer identification information identifying the default bearer and/or the PDN connection ID. Note that the Activate default EPS bearer context request message may be a Packet Data Network (PDN) connectivity accept message.

Here, the Activate default EPS bearer context request message ID may be a message type representing the Activate default EPS bearer context request message.

The APN may be an APN, to which the UE 10 is allowed to connect. More specifically, the APN may be the APN 1. The APN 1 may be an APN that is allowed to establish the multi-access PDN connection. The MME 40 may include the APN 1 in the Activate default EPS bearer context request.

The PDN address may be an IP address assigned to the UE 10. For example, the PDN address may be an IPv4 address, or an interface ID for constituting an IPv6 address.

The EPS QoS may indicate a state representing QoS of an EPS bearer.

The bearer identification information identifying the default bearer and/or the PDN connection ID may be a bearer for the multi-access PDN connection, and may be identification information of a bearer established through the E-UTRAN.

The PDN connection attribute information may be information indicating that the PDN connection established in the current PDN connectivity procedure is the multi-access PDN connection, and/or information indicating that user data transmitted or received by using the PDN connection established in the current PDN connectivity procedure is allowed to be transmitted or received through the access network A and the access network B, and/or information indicating that the PDN connection established in the current PDN connectivity procedure is the multi-access PDN connection of the operation mode indicated by the seventh identification information.

Note that the UE 10 may transmit the Activate default EPS bearer context request message that further includes the connectivity type indicating the type of PDN connection and/or the WLAN offload permission information (WLAN offload acceptability) indicating whether the WLAN offload is allowed or denied. Furthermore, the MME 40 may transmit the connectivity type or the WLAN offload permission information including the PDN connection attribute information.

ESM Cause may be information representing that the PDN type of the PDN address assigned to the UE 10 is different from the PDN type requested by the UE 10 in the PDN connectivity request.

Note that the MME 40 and/or the PGW 30 may include the second identification information and/or the seventh identification information and/or the ninth identification information in the PCO. However, in a case where the MME 40 and/or the PGW 30 includes the second identification information and/or the seventh identification information and/or the ninth identification information in the PCO, the MME 40 and/or the PGW 30 does not include the IFOM support. In contrast, in a case where the MME 40 and/or the PGW 30 includes the IFOM support in the PCO, the MME 40 and/or the PGW 30 does not include the second identification information and/or the seventh identification information and/or the ninth identification information. As described above, it may be possible to not configure both the second identification information and/or the seventh identification information and/or the ninth identification information and the IFOM support to be effective to ensure a clear distinction between the use of the switching of the communication path based on the NBIFOM and the use of the switching of the communication path based on the IFOM.

The eNB 45 receives the Activate default EPS bearer context request transmitted from the MME 40. On the basis of the reception of the Activate default EPS bearer context request, the eNB 45 transfers the Activate default EPS bearer context request to the UE 10.

The eNB 45 may transmit at least an RRC connection configuration request (RRC Connection Reconfiguration) to the UE 10 with an Activate default EPS bearer context request (S2116).

Note that the Activate default EPS bearer context request may be a response message to a PDN connectivity request.

The UE 10 receives the RRC connection configuration request transmitted from the eNB 45. Furthermore, the UE 10 receives the Activate default EPS bearer context request transmitted from the MME 40 and transferred by the eNB 45.

On the basis of the reception of the RRC connection configuration request, the UE 10 transmits an RRC connection configuration complete (RRC Connection Reconfiguration Complete) to the eNB 45 (S2118).

The eNB 45 receives an RRC connection configuration complete transmitted from the UE 10. The eNB 45 transmits bearer configuration to the MME 40 in response to the RRC connection configuration complete.

The MME 40 receives the bearer configuration transmitted from the eNB 45 (S2120).

On the basis of the reception of the Activate default EPS bearer context request and/or in accordance with the second identification information and/or the seventh identification information and/or the ninth identification information included in the Activate default EPS bearer context request, the UE 10 transmits an Activate default EPS bearer context accept to the MME 40 (S2122) (S2124).

The UE 10 may transmit at least an Activate default EPS bearer context accept message identity (Activate default EPS bearer context accept message ID), a procedure transaction ID, a protocol discriminator, and an EPS bearer ID included in the Activate default EPS bearer context accept.

Furthermore, the UE 10 may include the PCO in the Activate default EPS bearer context accept.

Furthermore, in a case where multiple INFOM operation modes are included in the seventh identification information, the UE 10 may include at least the fifth identification information in the Activate default EPS bearer context accept. In other words, in a case where multiple INFOM operation modes are allowed, the UE 10 may select one of the allowed modes and transmit the fifth identification information including the selected mode. Here, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

Specifically, in a case where the UE-Initiated mode and the Network-Initiated mode are included in the seventh identification information included in the Activate default EPS bearer context request, the UE 10 may include the UE-Initiated mode or the Network-Initiated mode in the fifth identification information.

Which one of the UE-Initiated mode and the Network-Initiated mode is to be included in the fifth identification information may be determined based on the UE policy.

Note that the UE policy may be any information configured for the UE 10. For example, the UE policy may be information configured by a user.

Here, the Activate default EPS bearer context accept message ID may be a message type representing the Activate default EPS bearer context accept message.

After the first PDN connectivity procedure is completed, the UE 10 and the PGW 30 establish the first PDN connection of the operation mode determined based on the operator policy. Alternatively, the UE 10 establishes the first PDN connection of an operation mode selected from the operation modes allowed based on the operator policy. Note that, on the basis of the reception of the Activate default EPS bearer context request, and/or in accordance with the PDN connection attribute information and/or the seventh identification information and/or the operation mode selected based on the seventh identification information, the UE 10 may identify the NBIFOM operation mode for the established PDN connection. On the basis of the establishment of the first PDN connection, the UE 10 and the PGW 30 determine a PDN connection and/or a transfer path, such as an EPS bearer, for transmitting and/or receiving the IP flow by using the TFT, and transmit and/or receive user data corresponding to the IP flow identified by the TFT. More specifically, the UE 10 and the PGW 30 transmit and/or receive a flow identified by the TFT by using the first PDN connection.

Furthermore, in the establishment of the first PDN connection, the UE 10 and the PGW 30 establish a default bearer. The UE 10 and the PGW 30 store the identification information of the default bearer established in the PDN connectivity procedure and the information identifying the LTE access network in association with each other, in response to completion of the PDN connectivity procedure through the LTE access network.

Note that the UE 10 performs data transmission and/or reception using the default bearer when the UE 10 does not receive the TFT or transmits and/or receives the user data not matching the held TFT. In addition, the PGW 30 performs data transmission and/or reception using the default bearer when the PGW 30 does not receive the TFT or transmits and/or receives the user data not matching the held TFT.

In this way, the UE 10 and the PGW 30 establish a multi-access PDN connection in the PDN connectivity procedure, and establish a default bearer for the multi-access PDN connection. Furthermore, the UE 10 and the PGW 30 are capable of storing a default access for selecting a default bearer in association with the multi-access PDN connection, in a case where multiple default bearers are established.

Note that in the example of the first PDN connectivity procedure, the case in which the transmission and/or reception of the TFT is included in the PDN connectivity procedure has been described. However, the first PDN connectivity procedure is not limited to this case. The TFT may be transmitted and/or received, after the multi-access PDN connection is established.

Therefore, the UE 10 and the MME 40 may transmit and/or receive the TFT without including the TFT in the PDN connectivity request and/or the Activate default EPS bearer context request, and establish the multi-access PDN connection. In other words, at a point in time when the PDN connection is established, there may be no IP flow transmitting and/or receiving user data by using the PDN connection. In this case, the UE 10 and the MME 40 transmit the TFT after the multi-access PDN connection is established.

More specifically, in a case where the PDN connection of the UE-Initiated mode is established, the UE 10 may transmit the TFT to the MME 40 via the eNB 45. In addition, the MME 40 receives the TFT from the UE 10 and transmits the TFT to the PGW 30 via the SGW 35. Thus, the UE 10 and the PGW 30 are capable of determining a PDN connection and/or a transfer path such as an EPS bearer for transmitting and/or receiving the IP flow by using the TFT, and are capable of transmitting and/or receiving user data corresponding to the IP flow identified by the TFT.

Note that the UE 10 and the PGW 30 perform data transmission and/or reception using the default bearer when the UE 10 and the PGW 30 transmit and/or receive the user data not matching the held TFT.

In contrast, in a case where the PDN connection of the Network-Initiated mode is established, the PGW 30 may transmit the TFT to the MME 40 via the SGW 35. Here, the PGW 30 may receive, from the PCRF 60, the TFT determined based on the operator policy. In addition, the MME 40 receives the TFT from the PGW 30 via the SGW 35, and transmits the TFT to the UE 10 via the eNB 45. Thus, the UE 10 and the PGW 30 are capable of determining a PDN connection and/or a transfer path such as an EPS bearer for transmitting and/or receiving the IP flow by using the TFT, and are capable of transmitting and/or receiving user data corresponding to the IP flow identified by the TFT.

Note that the UE 10 and the PGW 30 perform data transmission and/or reception using the default bearer when the UE 10 and the PGW 30 transmit and/or receive the user data not matching the held TFT.

Furthermore, in the example of the first PDN connectivity procedure, a case has been described in which the UE 10 and the PGW 30 establish the first PDN connection, of an operation mode selected by the UE 10, from the operation modes determined based on the operator policy or the operation modes allowed based on the operator policy. However, the first PDN connectivity procedure is not limited to this case. The UE 10 may reject the establishment of the first PDN connection.

For example, in a case where the UE 10 does not support the operation mode allowed based on the operator policy and/or in a case where the operation mode allowed based on the operator policy does not comply with the policy of the UE 10, the UE 10 may reject the establishment of the first PDN connection.

More specifically, on the basis of the reception of the Activate default EPS bearer context request and/or in accordance with the seventh identification information included in the Activate default EPS bearer context request and/or PDN connection attribute information and/or policy of the UE 10, the UE 10 may transmit an Activate default EPS bearer context reject to the MME 40 via the eNB 45.

The UE 10 may transmit at least an Activate default EPS bearer context reject message identity (Activate default EPS bearer context reject message ID), a Procedure transaction ID, a protocol discriminator, an EPS bearer ID, and an ESM Cause included in the Activate default EPS bearer context reject. Furthermore, the UE 10 may further include fourth identification information in the Activate default EPS bearer context reject. Furthermore, the UE 10 may further include the PCO in the Activate default EPS bearer context reject. Note that the UE 10 may transmit the PCO including the fourth identification information.

The fourth identification information may be information representing that the UE 10 does not support the operation mode allowed based on the operator policy and/or information representing that the operation mode allowed based on the operator policy does not comply with the policy of the UE 10.

The Activate default EPS bearer context reject message ID may be a message type representing the Activate default EPS bearer context reject message.

The ESM Cause may be information representing a reason why the Activate default EPS bearer context request is rejected. Here, the UE 10 may notify the UE 10 of the fourth identification information included in the ESM Cause.

The MME 40 may receive the Activate default EPS bearer context reject transmitted from the UE 10. On the basis of the reception of the Activate default EPS bearer context reject and/or in accordance with the fourth identification information included in the Activate default EPS bearer context reject, the MME 40 may delete the EPS bearer context, held by the MME 40, relating to the established PDN connection. Furthermore, the MME 40 may transmit the fourth identification information included in the Activate default EPS bearer context reject to the SGW 35.

The SGW 35 may receive the fourth identification information transmitted from the MME 40. On the basis of the reception of the fourth identification information and/or in accordance with the operator policy, the SGW 35 may delete the EPS bearer context, held by the SGW 35, relating to the established PDN connection. Furthermore, the SGW 35 may transmit, to the PGW 30, the fourth identification information received from the MME 40.

The PGW 30 may receive the fourth identification information transmitted from the SGW 35. On the basis of the reception of the fourth identification information and/or in accordance with the operator policy, the PGW 30 may delete the EPS bearer context, held by the PGW 30, relating to the established PDN connection.

Furthermore, the PGW 30 may perform the IP-CAN session update procedure with the PCRF 60, based on the reception of the fourth identification information. The PGW 30 may include the fourth identification information in the IP-CAN session update procedure.

The PCRF 60 may change the operator policy based on the IP-CAN session update procedure. Note that based on the change of the operator policy, the PGW 30 may delete the EPS bearer context, held by the PGW 30, relating to the established PDN connection.

Note that in a case where the multi-PDN connection is established, a procedure for adding a new transfer path can be performed. In contrast, when a single access PDN connection is established, it is possible to change a transfer path, but the procedure for adding a transfer path cannot be performed.

1.4.2. Description of State After PDN Connectivity Establishment Procedure

Performing the above-described first PDN connectivity procedure leads to a first state and a second state, both of which will be described later.

Note that an initial state in the additional attach procedure may be the second state. The initial state in the additional attach procedure may not be limited to the second state.

1.4.3. Description of First State

Figure 13:
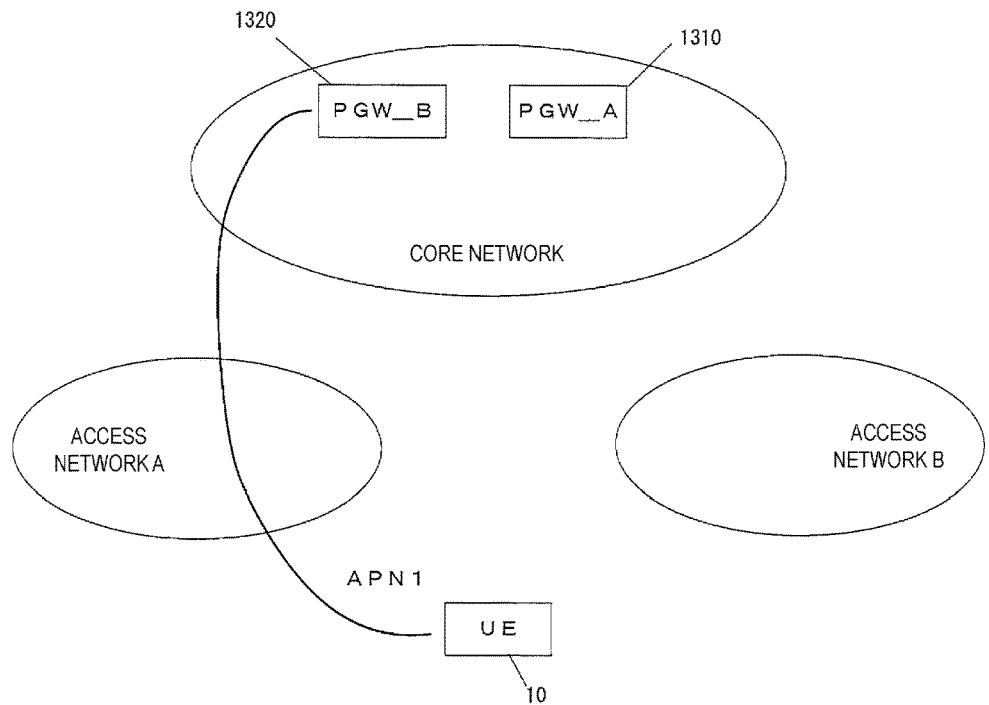
FIG. 13 is a diagram illustrating a state after a PDN connectivity procedure is completed from a first initial state.

The first state will be described with reference to FIG. 13. In the first state, the UE 10 has established the first PDN connection with the core network 90. However, the UE 10 has not yet established the second PDN connection. In greater detail, the UE 10 has established the first PDN connection with the PGW_A 1310. However, the UE 10 has not established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of a gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be configured with a transfer path between the UE 10 and the PGW 30 through the access network A. Thus, the first PDN connection may be configured with a transfer path that is a combination of a transfer path between the UE 10 and the eNB 45, a transfer path between the eNB 45 and the SGW 35, and a transfer path between the SGW 35 and the PGW_A 1310. Here, the transfer path may be a bearer.

As described above, in the first state, the UE 10 may be in a state in which the multi-access PDN connection has been established via the access network A. In addition, in the first state, the UE 10 may be in a state of not being connected to the core network 90 via the access network B.

Note that the UE 10 may not necessarily establish the single-access PDN connection via the access network A.

Alternatively, the UE 10 may be in a state in which the single-access PDN connection is established via the access network A. In this case, the UE 10 performs, in the LTE access network, the attach procedure or the PDN connectivity procedure in the single-access PDN connection initiated by the UE 10 to establish the third PDN connection.

Note that the third PDN connection may be established with a gateway selected by using the APN 2. Alternatively, the third PDN connection may be established with a gateway selected by using another APN different from either the APN 1 or the APN 2.

The first state has been described above; however, the first state is not limited to the above-described state, and may be any state in which, for example, the multi-access PDN connection has been established through the access network A and the PDN connection has not been established through the access network B.

1.4.4. Description of Second State

Figure 14:
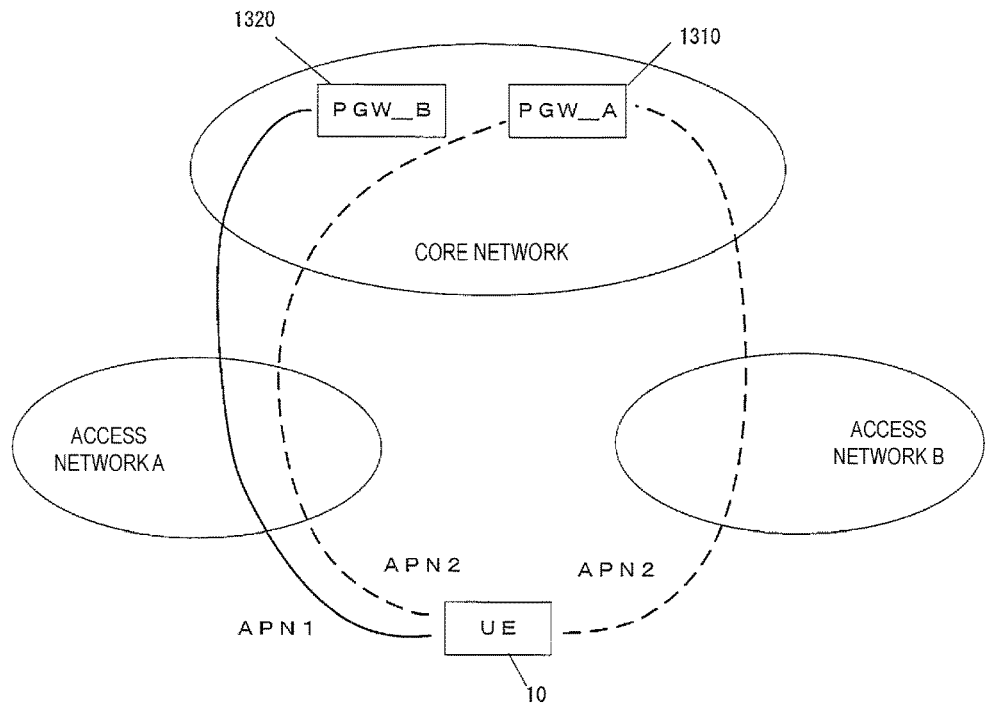
FIG. 14 is a diagram illustrating a state after the PDN connectivity procedure is completed from a second initial state.

The second state will be described with reference to FIG. 14. In the second state, the UE 10 has established the first PDN connection with the core network 90. Furthermore, the UE 10 has established the second PDN connection with the core network 90. In greater detail, the UE 10 has established the first PDN connection with the PGW_A 1310. Furthermore, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of a gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be configured with a transfer path between the UE 10 and the PGW 30 through the access network A. Thus, the first PDN connection may be configured with a transfer path that is a combination of a transfer path between the UE 10 and the eNB 45, a transfer path between the eNB 45 and the SGW 35, and a transfer path between the SGW 35 and the PGW_A 1310. Here, the transfer path may be a bearer.

In addition, the second PDN connection may be configured with a transfer path between the UE 10 and the PGW 30 through the access network B. Thus, the second PDN connection may be configured with a transfer path between the UE 10 and the TWAG 74 and a transfer path between the TWAG 74 and the PGW_B 1320. Here, the transfer path may be a bearer.

As described above, in the first state, the UE 10 may be in a state in which the multi-access PDN connection has been established via the access network A. Furthermore, the UE 10 may be in a state in which the single-access PDN connection is established via the access network B.

Note that the UE 10 may not necessarily establish the single-access PDN connection via the access network A.

Alternatively, the UE 10 may be in a state in which the single-access PDN connection is established via the access network A. In this case, the UE 10 performs, in the LTE access network, the attach procedure or the PDN connectivity procedure in the single-access PDN connection initiated by the UE 10 to establish the third PDN connection.

Note that the third PDN connection may be established with a gateway selected by using the APN 2. Alternatively, the third PDN connection may be established with a gateway selected by using another APN different from either the APN 1 or the APN 2.

The second state has been described above; however, the second state is not limited to the above-described state, and may be any state in which, for example, the multi-access PDN connection has been established through the access network B and the single-access PDN connection has been established through the access network A.

1.5. Additional Attach Procedure

An additional attach procedure will be described below.

The additional attach procedure is a procedure for adding a transfer path configured in the multi-PDN connection, based on the function of the multi-PDN connection capable of constituting multiple transfer paths.

Specifically, the procedure aims to add a transfer path through the access network B to the multi-access PDN connection only including a transfer path or transfer paths through the access network A.

For example, the Operation mode of the first PDN connection being the Network-Initiated mode denotes, in other words, flow switching and/or update of the Routing Rule of the PDN connection initiated by the UE 10 being not possible. In contrast, the PDN connectivity procedure and/or the attach procedure is initiated by the UE 10.

Note that the Routing Rule may be information for selecting a transfer path or bearer through which user data is transmitted and/or received based on the TFT held by the UE 10. More specifically, the Routing Rule may be information in which the TFT and the transfer path or bearer are associated with each other.

As described above, the second state is a state in which the UE 10 establishes the first PDN connection only through the access network A. That is, the transfer path through the access network B is not included in the first PDN connection. Note that the transfer path may be a bearer and/or a communication path.

Therefore, when the first PDN connection in the second state is in the Network-Initiated mode, the network and/or the PCRF 60 cannot include the transfer path through the access network B in the first PDN connection.

Therefore, in accordance with the state transition to the second state and the Operation mode being the Network-Initiated mode, the UE 10 may perform a procedure for establishing the transfer path through the access network B.

Moreover, also in a case where the Operation mode of the first PDN connection in the second state is the UE-Initiated mode, the UE 10 may perform a procedure for establishing the transfer path through the access network B based on the Routing Rule stored in the UE 10.

Specifically, the UE 10 may perform the procedure for adding a transfer path through the access network B to the first PDN connection in a case where the Routing Rule of the first PDN connection indicates a priority to a WLAN access.

More specifically, the UE 10 may perform the procedure for adding a transfer path through the access network B in a case where the UE 10 stores the Routing Rule in which a specific flow and a WLAN access are associated with each other for the first PDN connection.

In other words, the UE 10 does not perform the procedure for adding a transfer path through the access network B to the first PDN connection in a case where the Routing Rule of the first PDN connection does not indicate a priority to a WLAN access.

More specifically, the UE 10 does not perform the procedure for adding a transfer path through the access network B in a case where the UE 10 does not store the Routing Rule in which a specific flow and a WLAN access are associated with each other for the first PDN connection.

Hereinafter, details of the procedure will be described.

1.5.1. Example of Second Additional Attach Procedure

Figure 17:
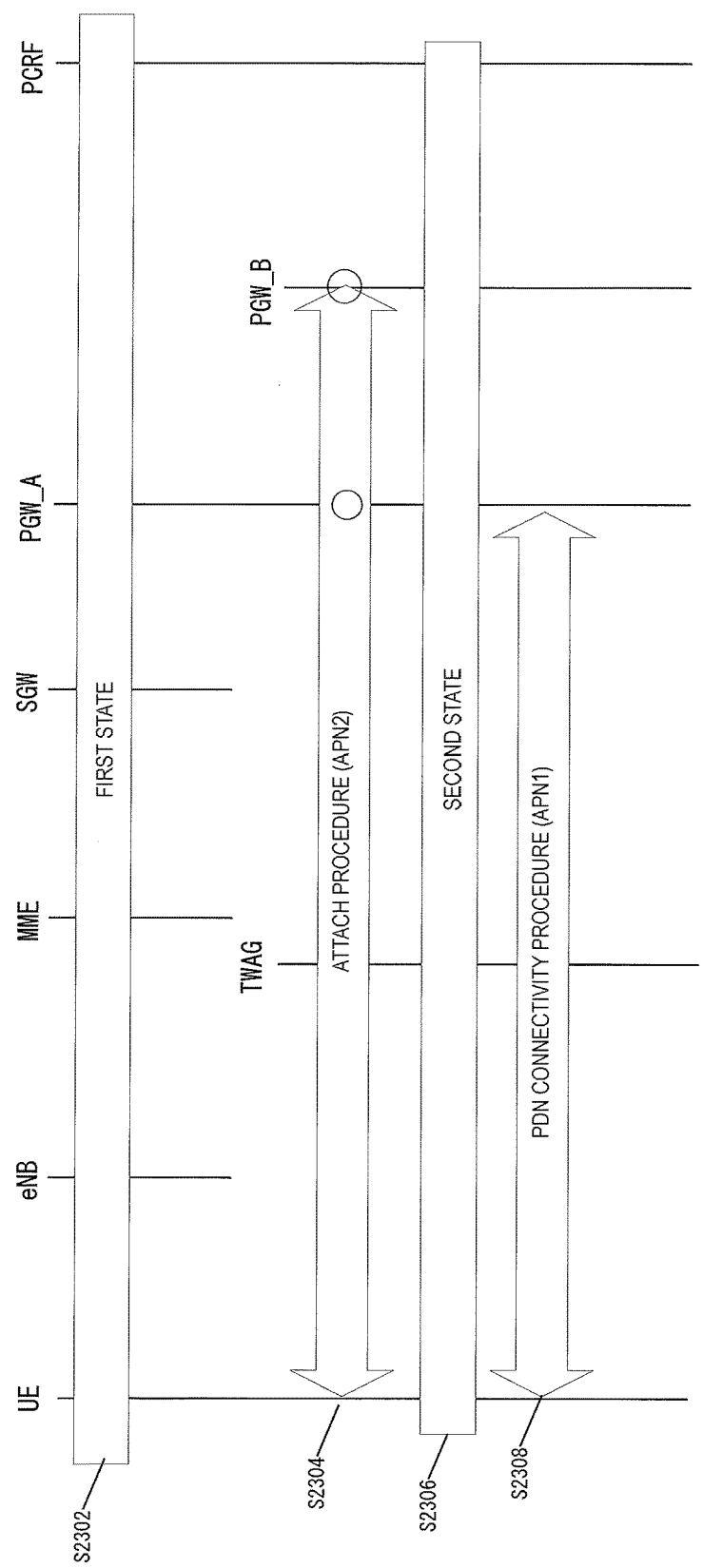
FIG. 17 is a diagram illustrating a first additional attach procedure.

Next, an example of a second additional attach procedure will be described with reference to FIG. 17. As illustrated in FIG. 17, the initial state in the present example of the procedure is first initial (S2302). Note that the procedure for changing the state to the first state may be similar to the procedure described above, therefore the detailed description will be omitted.

In the first state, the UE 10 may be in any state where the first PDN connection is established with the PGW 30 and/or the network through the access network A. Specifically, the first initial state means a state in which the UE 10 establishes the first PDN connection, through the eNB 45 and the SGW 35, with the PGW_A selected using the APN 1. Note that the first PDN connection may be a multi-access PDN connection.

The UE 10 performs the attach procedure through the access network B upon transition to the first state and establishment of the first PDN connection in the Network-Initiated mode (S2304).

The UE 10 may perform the attach procedure through the access network B, upon transition to the first initial state in which the first PDN connection in the UE-Initiated mode is established and based on the Routing Rule.

Specifically, the UE 10 may perform the attach procedure through the access network B, based on the Routing Rule giving priority to a WLAN access.

Specifically, the UE 10 may perform the attach procedure through the access network B in a case where the state is changed to the first initial state in which the first PDN connection in the UE-Initiated mode is established and the Routing Rule of the first PDN connection indicates a priority to a WLAN access.

More specifically, the UE 10 may perform the attach procedure through the access network B in a case where the state is changed to the first initial state in which the first PDN connection in the UE-Initiated mode is established and the UE 10 stores the Routing Rule in which a specific flow and a WLAN access are associated with each other for the first PDN connection.

In other words, the UE 10 does not perform the attach procedure through the access network B in a case where the Routing Rule of the first PDN connection does not indicate a priority to a WLAN access, even when the state is changed to the first initial state in which the first PDN connection in the UE-Initiated mode is established.

More specifically, the UE 10 does not perform the attach procedure through the access network B in a case where the UE 10 does not store the Routing Rule, in which a specific flow and a WLAN access are associated with each other for the first PDN connection, even when the state is changed to the first initial state in which the first PDN connection in the UE-Initiated mode is established.

Note that the UE 10 may transmit the Attach request including at least the APN and/or the PDN connection ID.

The APN may be an APN, to which the UE 10 requests a connection. More specifically, the APN may be the APN 2. The UE 10 may include the APN 2 to establish the single-access PDN connection. Here, the APN 2 may be an APN, which is not allowed to establish the multi-access PDN connection and/or an APN, which is not allowed to perform communication based on the NBIFOM.

That is, the UE 10 may request establishment of a single access PDN connection, using the APN 2, which is different from the APN 1, and which has acquired from the network when establishing the first PDN connection.

Furthermore, the PDN connection ID may be an ID assigned when the PGW 30 establishes the PDN connection in the PDN connectivity procedure, or may be information for uniquely identifying the PDN connection that the UE 10 establishes with the PGW 30.

Note that in the attach procedure, the UE 10 performs authentication and a security association procedure with the MME 40 and the PGW_A and the PGW_B.

In addition, the UE 10 may acquire an APN from the network in response to the attach procedure complete.

The APN may be an APN, to which the UE 10 requests a connection. More specifically, the APN may be the APN 2. The UE 10 may include the APN 2 to establish the single-access PDN connection. Here, the APN 2 may be an APN that is not allowed to establish the multi-access PDN connection and/or an APN that is not allowed to perform communication based on the NBIFOM.

That is, the UE 10 may establish a single access PDN connection, using different APN 2 from the APN 1 acquired from the network in response to establishment of the first PDN connection.

Through above procedures, the UE 10 and the core network 90 changes their states from the first state to the second state (S2306).

Next, the UE 10 performs the PDN connectivity procedure through the access network B upon transition to the second state and establishment of the first PDN connection in the Network-initiated mode (S2308).

Alternatively, the UE 10 performs the PDN connectivity procedure through the access network B, upon transition to the second state and based on the Routing Rule of the first PDN connection established in the UE-Initiated mode.

Specifically, the UE 10 may perform the attach procedure through the access network B, based on the Routing Rule giving priority to a WLAN access.

Specifically, the UE 10 may perform the procedure for adding a transfer path through the access network B to the first PDN connection in a case where the state is changed to the second state in which the first PDN connection in the UE-initiated mode is established and the Routing Rule of the first PDN connection indicates a priority to a WLAN access.

More specifically, the UE 10 may perform the procedure for adding a transfer path through the access network B when the state is changed to the second state in which the first PDN connection in the UE-initiated mode is established and the UE 10 stores the Routing Rule in which a specific flow and a WLAN access are associated with each other for the first PDN connection.

In other words, the UE 10 may not perform the procedure for adding a transfer path through the access network B to the first PDN connection in a case where the Routing Rule of the first PDN connection does not indicate a priority to a WLAN access, even when the state is changed to the second state in which the first PDN connection in the UE-initiated mode is established.

More specifically, the UE 10 does not perform the procedure for adding a transfer path through the access network B in a case where the UE 10 does not store the Routing Rule in which a specific flow and a WLAN access are associated with each other for the first PDN connection, even when the state is changed to the second state in which the first PDN connection in the UE-initiated mode is established.

Figure 18:
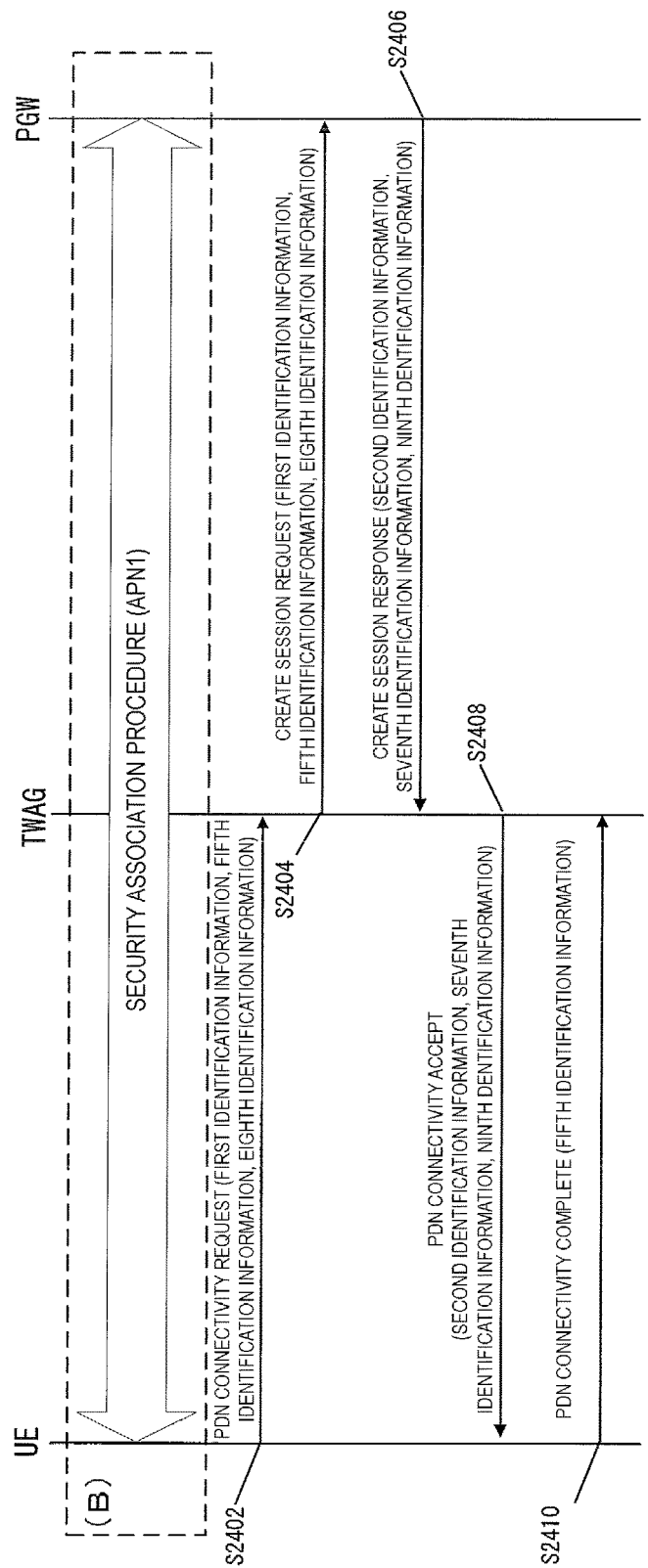
FIG. 18 is a diagram illustrating a PDN connectivity procedure through an access network B.

A PDN connectivity procedure through an access network B will be described with reference to FIG. 18.

The UE 10 first transmits a PDN connectivity request to the TWAG 74 (S2402). The UE 10 may transmit the PDN connectivity request including at least the PDN connectivity request message identity (PDN connectivity request message ID), the Procedure transaction identity (procedure transaction ID), the Request type, and the PDN type. Furthermore, the UE 10 may include at least first identification information and/or the fifth identification information and/or the eighth identification information and/or PDN connection ID in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or the fifth identification information and/or the eighth identification information and/or the PDN connection ID and/or the TFT.

Here, the first identification information may be the UE NBIFOM capability representing that the UE 10 supports the NBIFOM. Note that the NBIFOM capability may be information indicating the provision of the function of establishing the multi-access PDN connection.

Furthermore, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

As described above, the UE 10 may transmit the fifth identification information to request a mode of the multi-access PDN connection. In other words, the UE 10 may transmit the fifth identification information to request the establishment of the multi-access PDN connection corresponding to the mode indicated by the fifth identification information. Note that the mode indicated by the fifth identification information may be selected by the UE 10.

Note that, the UE 10 may be configured to transmit the fifth identification information in a case of requesting the establishment of the multi-access PDN connection in the UE-Initiated mode, and may be configured not to transmit the fifth identification information in a case of requesting the establishment of the multi-access PDN connection in the Network-Initiated mode.

Furthermore, the eighth identification information may be information indicating a default access (Default Assess) in the multi-access PDN connection. The eighth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the eighth identification information may include more detailed information. For example, the eighth identification information may be one of the E-UTRAN access, the UTRAN access and the GERAN access.

As described above, the UE 10 may transmit the eighth identification information to request a default access for the multi-access PDN connection. In other words, the UE 10 may transmit the eighth identification information to request the establishment of the multi-access PDN connection in which the access network indicated by the eighth identification information is used as the default access.

Note that the access network indicated by the eighth identification information may be selected by the UE 10. Furthermore, the UE 10 may select the access network indicated by the eighth identification information based on operator policy such as Inter System Routing Policy (ISRP) received from an Access Network Discovery and Selection Function (ANDSF) server. More specifically, the UE 10 may select the access network indicated by the eighth identification information based on priority information of the access network of the ISRP received from the ANDSF server. For example, since the ISRP indicates that a higher priority is given to a WLAN, the UE 10 may set information indicating the WLAN as the eighth identification information. Note that the UE 10 may select the access network indicated by the eighth identification information based on the ISRP, only in a case where the ISRP is valid or active.

Note that, the UE 10 may be configured to transmit the eighth identification information when requesting the establishment of the multi-access PDN connection in the UE-Initiated mode, and may be configured not to transmit the eighth identification information when requesting the establishment of the multi-access PDN connection in the Network-Initiated mode.

Furthermore, the UE 10 may be configured to transmit the eighth identification information in a case where a default bearer has not been established for the multi-access PDN connection, the establishment of which is to be requested, and may be configured not to transmit the eighth identification information in a case where the default bearer has already been established for the multi-access PDN connection.

More specifically, the UE 10 may be configured to transmit the eighth identification information when establishing a new multi-access PDN connection, and may be configured not to transmit the eighth identification information when adding a transfer path in a state in which the default bearer is established for the multi-access PDN connection through the LTE access network.

As described above, the UE 10 may make a request for establishing the multi-access PDN connection by transmitting the first identification information and/or the fifth identification information and/or the eighth identification information. In other words, the first identification information and/or the fifth identification information and/or the eighth identification information may be information indicating the request for establishing a multi-access PDN connection.

The PDN connectivity request message ID may be a message type representing the PDN connectivity request message.

The procedure transaction ID may be information for identifying the PDN connectivity procedure.

The APN may be an APN, to which the UE 10 requests a connection. More specifically, the APN may be the APN 1. The UE 10 may include the APN 1 to establish the multi-access PDN connection. Here, the APN 1 may be an APN that is allowed to establish the multi-access PDN connection and/or an APN that is allowed to perform communication based on the NBIFOM. Furthermore, the APN may be identification information identifying the first PDN connection.

The PDN connection ID may be an ID assigned when the PGW 30 establishes the PDN connection in the PDN connectivity procedure, or may be information for uniquely identifying the PDN connection that the UE 10 establishes with the PGW 30. Furthermore, the PDN connection ID may be identification information identifying the first PDN connection. The PDN connection ID may be associated with the APN.

Note that the UE 10 may identify the first PDN connection by using the APN and/or the PDN connection ID.

The request type may be information for identifying the type of PDN connectivity procedure to be requested. For example, since the UE 10 performs an initial connection by using the APN 1, the request type may be the type indicating an attach, rather than the type indicating a handover.

The PDN type may indicate an available IP version. For example, the PDN type may be IPv4, IPv6, or IPv4v6.

The PCO may be protocol information associated with the PDN connection. Furthermore, the PCO may include identification information of the request. Note that the UE 10 may transmit the PCO including the first identification information and/or the fifth identification information and/or the eighth identification information.

The TFT may be information for identifying an IP flow for performing communication by using the PDN connection established in the current PDN connectivity procedure. Note that the IP flow to be identified may vary for each application. Thus, the TFT identifies user data of a certain application.

More specifically, the TFT may include a 5-tuple, or may include identification information such as the application ID. Note that the 5-tuple may include a combination of information of one or more of a transmission-source IP address, a transmission-destination IP address, a transmission-source port number, a transmission-destination port number, and a protocol number.

Note that in the present example, when transmitting the PDN connectivity request, the UE 10 does not request a certain NBIFOM operation mode, and thus, the UE 10 may transmit the PDN connectivity request without including the TFT. In other words, when the UE 10 requests the establishment of the multi-access PDN connection without requesting the certain NBIFOM operation mode, the UE 10 may transmit the PDN connectivity request without including the TFT. More specifically, in a case where the UE 10 includes the first identification information and/or the fifth identification information and/or the eighth identification information, the UE 10 may transmit the PDN connectivity request without including the TFT. Note that conventionally, the UE 10 is capable of transmit the PCO including information indicating an IFOM support. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, in a case where the UE 10 includes the first identification information and/or the fifth identification information and/or the eighth identification information in the PCO, the UE 10 does not include the IFOM support. In contrast, in a case where the UE 10 includes the IFOM support in the PCO, the UE 10 does not include the first identification information and/or the fifth identification information and/or the eighth identification information. As described above, it may be possible to not configure both the first identification information and/or the fifth identification information and/or the eighth identification information and the IFOM support to be effective to ensure a clear distinction between the use of the switching of the communication path based on the NBIFOM and the use of the switching of the communication path based on the IFOM.

Thus, the UE 10 is capable of establishing either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

The TWAG 74 receives the PDN connectivity request transmitted from the UE 10. On the basis of the reception of the PDN connectivity request, and/or in accordance with the first identification information and/or the fifth identification information and/or the eighth identification information included in the PDN connectivity request, the TWAG 74 transmits a Create Session Request to the PGW 30 (S2404).

On the basis of the reception of the PDN connectivity request, and/or in accordance with the first identification information and/or the fifth identification information and/or the eighth identification information included in the PDN connectivity request, the TWAG 74 may transmit the Create Session Request including at least the first identification information and/or the fifth identification information and/or the eighth identification information. Furthermore, the TWAG 74 may include the TFT in the Create Session Request, based on the reception of the TFT transmitted from the UE 10.

Furthermore, the TWAG 74 may include the APN and/or PDN connection ID in the Create Session Request, based on the reception of the APN and/or PDN connection ID transmitted from the UE 10. Note that the TWAG 74 may identify the first PDN connection by using the received APN and/or PDN connection ID.

Furthermore, the TFT may be information for identifying an IP flow that performs communication by using the PDN connection established in the current PDN connectivity procedure. Note that the IP flow to be identified may vary for each application. Thus, the TFT identifies user data of a certain application.

More specifically, the TFT may include a 5-tuple, or may include identification information such as the application ID. Note that the 5-tuple may include a combination of information of one or more of a transmission-source IP address, a transmission-destination IP address, a transmission-source port number, a transmission-destination port number, and a protocol number.

Note that in a case where none of the first identification information and/or the fifth identification information and/or the eighth identification information is included in the PDN connectivity request, the TWAG 74 may transmit the Create Session Request without including the first identification information and/or the fifth identification information and/or the eighth identification information. Moreover, in a case where the first identification information and/or the fifth identification information and/or the eighth identification information is not included in the PDN connectivity request, the TWAG 74 may perform a procedure for establishing the single-access PDN connection.

The PGW 30 receives the Create Session Request transmitted from the TWAG 74. On the basis of the reception of the Create Session Request, and/or in accordance with the first identification information and/or the fifth identification information and/or the eighth identification information included in the Create Session Request, the PGW 30 may perform an IP-CAN session update procedure with the PCRF 60.

On the basis of the reception of the Create Session Request and/or in accordance with the first identification information and/or the fifth identification information and/or the eighth identification information included in the Create Session Request, the PGW 30 may perform the IP-CAN session update procedure including at least the first identification information and/or the fifth identification information and/or the eighth identification information.

Furthermore, the PGW 30 may identify the first PDN connection by using the received APN and/or PDN connection ID, based on the reception of the APN and/or PDN connection ID transmitted from the TWAG 74.

Note that the PGW 30 may perform the IP-CAN session update procedure to notify the PCRF 60 of information of the UE 10 and/or TWAG 74.

The PGW 30 may transmit, to the PCRF 60, a control message in the IP-CAN session procedure, including information indicating whether the PDN connection to be established is the multi-access PDN connection or the single-access PDN connection, and/or the first identification information and/or the fifth identification information and/or the eighth identification information.

More specifically, when the multi-access PDN connection is to be established, the PGW 30 transmits, to the PCRF 60, the information indicating the access network B, the PDN connection ID, the information indicating that the PDN connection is the multi-access PDN connection, and the first identification information and/or the fifth identification information and/or the eighth identification information. Alternatively, when the single-access PDN connection is to be established, the PGW 30 transmits, to the PCRF 60, the information indicating the access network B, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Furthermore, on the basis of the reception of the first identification information and/or the fifth identification information and/or the eighth identification information, the PCRF 60 may transmit, to the PGW 30, a control message in the IP-CAN session update procedure with the PGW 30, the control message including at least the second identification information and/or the seventh identification information and/or the ninth identification information. The detailed description of the second identification information and/or the seventh identification information and/or the ninth identification information will be described later.

Note that the PCRF 60 may perform the IP-CAN session update procedure to notify the PGW 30 of the charging information and/or the QoS control information and/or the routing information.

On the basis of the reception of the Create Session Request or completion of the IP-CAN session update procedure, and/or in accordance with the first identification information and/or the fifth identification information and/or the eighth identification information included in the Create Session Request, and/or in accordance with the second identification information and/or the seventh identification information and/or the ninth identification information included in the IP-CAN session update procedure, the PGW 30 transmits a Create Session Response to the TWAG 74 (S2406).

On the basis of the reception of the Create Session Request or completion of the IP-CAN session update procedure, and/or in accordance with the first identification information and/or the fifth identification information and/or the eighth identification information included in the Create Session Request, and/or in accordance with the second identification information and/or the seventh identification information and/or the ninth identification information included in the IP-CAN session update procedure, the PGW 30 transmits the Create Session Response including at least the second identification information and/or the seventh identification information and/or the ninth identification information.

Furthermore, the PGW 30 may include the PDN Address and/or the PDN connection ID and/or the TFT and/or the bearer identification information identifying the default bearer in the Create Session Response.

Note that a method by which the PGW 30 acquires the second identification information and/or the seventh identification information and/or the ninth identification information is not limited to the above-described method for acquiring the seventh identification information from the PCRF 60 in the IP-CAN session update procedure, and another example may be employed. For example, the PGW 30 may create the second identification information and/or the seventh identification information and/or the ninth identification information and transmit the Create Session Response including the second identification information and/or the seventh identification information and/or the ninth identification information, without acquiring from the PCRF 60 in the IP-CAN session update procedure.

Here, the second identification information may be the NBIFOM capability representing that the network supports the NBIFOM. Note that the NBIFOM capability may be information indicating the provision of the function of establishing the multi-access PDN connection.

Here, the seventh identification information may be the Allowed Mode representing the NBIFOM operation mode that is allowed for the multi-access PDN connection to be established. In other words, the seventh identification information may be an operation mode allowed by the operator.

As described above, the UE 10 may transmit the seventh identification information to make a notification of the mode of the multi-access PDN connection. In other words, the UE 10 may transmit the seventh identification information to permit the establishment of the multi-access PDN connection corresponding to the mode indicated by the seventh identification information. Note that the mode indicated by the seventh identification information may be selected by the PCRF 60 or the PGE 30. Note that the PCRF 60 or the PGE 30 may transmit the mode indicated by the fifth identification information as the seventh identification information, in a case where the PCRF 60 or the PGE 30 allows the establishment of the multi-access PDN connection in the mode indicated by the fifth identification information requested by the UE 10.

Note that the PCRF 60 or the PGW 30 may determine the Allowed Mode, the seventh identification information based on the operator policy. For example, a policy that allows the establishment of only the PDN connection of the UE-Initiated mode, a policy that allows the establishment of only the PDN connection of the Network-Initiated mode, a policy that allows the establishment of both modes, a policy that prohibits the establishment of both modes, and the like may be managed.

Note that the PCRF 60 or the PGW 30 may acquire the operator policy from the HSS 50 or the like. Alternatively, an operator policy created by an administrator may be stored.

In addition, for the operator policy, a policy different for each subscriber may be managed. Alternatively, a policy different for each APN may be managed. For example, for each APN, a different Allowed Mode for the PDN connection to be established may be managed.

The PCRF 60 or the PGW 30 may include the allowed operation mode in the seventh identification information, based on the Allowed Mode.

In other words, in a case where only the Network-Initiated mode is allowed, the PCRF 60 or the PGW 30 may include the Network-Initiated mode in the seventh identification information. Alternatively, in a case where only the UE-Initiated mode is allowed, the PCRF 60 or the PGW 30 may include the UE-Initiated mode in the seventh identification information.

Note that in a case where the UE-Initiated mode and the Network-Initiated mode are allowed, the seventh identification information may include both the operation modes. Alternatively, in a case where both the UE-Initiated mode and the Network-Initiated mode are allowed and a default operation mode is configured, the seventh identification information may include only the default operation mode. Note that which one of the UE-Initiated mode and the Network-Initiated mode is defined as the default operation mode may be configured based on the operator policy.

Note that, in a case where none of the operation modes is allowed for establishment of the PDN connection, the PCRF 60 may transmit, to the PGW 30, the cause information indicating that the Requested Operation Mode is not allowed.

In a case where none of the operation modes is allowed for establishment of the PDN connection, the PGW 30 may not necessarily notify the TWAG 74 of the seventh identification information.

In a case where none of the operation modes is allowed for establishment of the PDN connection, the PGW 30 may transmit, to the TWAG 74, the Create Session Response including the cause information indicating that the requested operation mode is not allowed.

In a case where none of the operation modes is allowed for establishment of the PDN connection, the PGW 30 may notify the TWAG 74 that there is no allowed operation.

As described above, based on the Allowed Mode, the PCRF 60 or the PGW 30 may regard an operation mode that is allowed for establishment of the PDN connection as the seventh identification information.

Note that in a case where the Network-Initiated mode is not included in the seventh identification information, the PCRF 60 may not necessarily transmit the TFT to the PGW 30.

In other words, only in the case where the Network-Initiated mode is included in the seventh identification information, the PCRF 60 may transmit the TFT to the PGW 30.

Note that in a case where the Network-Initiated mode is not included in the seventh identification information, the PGW 30 may not necessarily transmit the TFT to the TWAG 74. Thus, in this case, the PGW 30 may not necessarily include the TFT in the Create Session Response.

In other words, only in a case where the Network-Initiated mode is included in the seventh identification information, the PGW 30 may transmit the TFT to the TWAG 74. Thus, in this case, the PGW 30 may include the TFT in the Create Session Response.

The PDN address may be an IP address assigned to the UE 10. For example, the PDN address may be an IPv4 address, or an IPv6 prefix and an interface ID for constituting an IPv6 address. Here, the PGW 30 may assign the IP address of the UE 10. Moreover, the PGW 30 may include the IP address that has been already assigned to the UE 10, in the PDN address. Specifically, the PDN address may be the same as the PDN address acquired at the time of the multi-access PDN connection establishment, the multi-access PDN connection being established in the initial state.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

Furthermore, the ninth identification information may be information indicating a default access (Default Assess) in the multi-access PDN connection. Note that the ninth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the ninth identification information may include more detailed information. For example, the ninth identification information may be one of E-UTRAN access, UTRAN access and GERAN access.

As described above, the PCRF 60 or the PGE 30 may transmit the ninth identification information to notify the UE 10 of the default access for the multi-access PDN connection. In other words, the PCRF 60 or the PGE 30 may transmit the ninth identification information to request the establishment of the multi-access PDN connection in which the access network indicated by the ninth identification information is used as the default access. Note that the access network indicated by the ninth identification information may be selected by the PCRF 60 or the PGE 30. Note that the PCRF 60 or the PGE 30 may transmit the access network indicated by the eighth identification information as the ninth identification information, in a case where the PCRF 60 or the PGE 30 allows the establishment of the multi-access PDN connection for the default access indicated by the eighth identification information requested by the UE 10.

As described above, the establishment of the multi-access PDN connection is permitted by transmitting the second identification information and/or the seventh identification information and/or the ninth identification information. In other words, the second identification information and/or the seventh identification information and/or the ninth identification information may be information indicating that the multi-access PDN connection is to be established or establishment of the multi-access PDN connection is permitted.

Note that, the PCRF 60 and the PGW 30 may be configured to transmit the ninth identification information in a case where a default bearer has not been established for the multi-access PDN connection, the establishment of which is to be requested, and may be configured not to transmit the ninth identification information in a case where the default bearer has already been established for the multi-access PDN connection.

More specifically, the PCRF 60 and the PGW 30 may be configured to transmit the ninth identification information when establishing a new multi-access PDN connection, and may be configured not to transmit the ninth identification information when adding a transfer path in a state in which the default bearer is established for the multi-access PDN connection through the WLAN access network.

The TWAG 74 receives the Create Session Response transmitted from the PGW 30. On the basis of the reception of the Create Session Response and/or in accordance with the second identification information and/or the seventh identification information and/or the ninth identification information included in the Create Session Response, the TWAG 74 transmits a PDN connectivity accept to the UE 10 (S2408). Note that the PDN connectivity accept message may be any control message indicating that establishment of a PDN connection is allowed, and may be any Activate default EPS bearer context request.

On the basis of the reception of the Create Session Response and/or in accordance with the second identification information and/or the seventh identification information and/or the ninth identification information included in the Create Session Response, the TWAG 74 may transmit the PDN connectivity accept including at least a PDN connectivity accept message identity (PDN connectivity accept message ID), the Procedure transaction ID, the APN, the PDN address (PDN Address), the PDN connection ID, and the user plane connection ID (User Plane Connection ID). Furthermore, the TWAG 74 may include at least the second identification information and/or the seventh identification information and/or the ninth identification information in the PDN connectivity accept. Moreover, the TWAG 74 may include the PCO and/or the Cause and/or the TFT and/or the bearer identification information identifying the default bearer, and/or the PDN connection attribute information, in the PDN connectivity accept. Note that the TWAG 74 may transmit the PCO including the second identification information and/or the seventh identification information and/or the ninth identification information and/or the TFT.

Here, the PDN connectivity accept message ID may be a message type representing the PDN connectivity accept message.

The APN may be an APN, to which the UE 10 is allowed to connect. More specifically, the APN may be the APN 1. The APN 1 may be an APN that is allowed to establish the multi-access PDN connection. The TWAG 74 may include the APN 1 in the PDN connectivity accept.

The PDN address may be an IP address assigned to the UE 10. For example, the PDN address may be an IPv4 address, or an interface ID for constituting an IPv6 address.

The PDN connection ID may be information for uniquely identifying the PDN connection established between the UE 10 and the PGW 30. The PDN connection ID may be an ID assigned by the PGW 30, or an ID assigned by the TWAG 74. In other words, the TWAG 74 may assign the PDN connection ID.

The user plane connection ID is information for identifying a user plane. The user plane is a transfer path used for transferring user data in the PDN connection. The TWAG 74 may assign the user plane connection ID.

The Cause may be information representing that the PDN type of the PDN address assigned to the UE 10 is different from the PDN type requested by the UE 10 in the PDN connectivity request.

Note that the TWAG 74 and/or the PGW 30 may include the second identification information and/or the seventh identification information and/or the ninth identification information in the PCO. However, in a case where the TWAG 74 and/or the PGW 30 includes the second identification information and/or the seventh identification information and/or the ninth identification information in the PCO, the TWAG 74 and/or the PGW 30 does not include the IFOM support. In contrast, in a case where the TWAG 74 and/or the PGW 30 includes the IFOM support in the PCO, the TWAG 74 and/or the PGW 30 does not include the second identification information and/or the seventh identification information and/or the ninth identification information. As described above, it may be possible to not configure both the second identification information and/or the seventh identification information and/or the ninth identification information and the IFOM support to be effective to ensure a clear distinction between the use of the switching of the communication path based on the NBIFOM and the use of the switching of the communication path based on the IFOM.

The PDN connection attribute information may be information indicating that the PDN connection established in the current PDN connectivity procedure is the multi-access PDN connection, and/or information indicating that user data transmitted and/or received by using the PDN connection established in the current PDN connectivity procedure is allowed to be transmitted and/or received through the access network A and the access network B, and/or in a case where there is only one operation mode indicated by the seventh identification information, information indicating that the PDN connection established in the current PDN connectivity procedure is the multi-access PDN connection of the operation mode indicated by the seventh identification information.

Note that the UE 10 may transmit the PDN connectivity accept message that further includes the connectivity type indicating the type of PDN connection and/or the WLAN offload permission information (WLAN offload acceptability) indicating whether the WLAN offload is allowed or denied. Furthermore, the TWAG 74 may transmit the connectivity type or the WLAN offload permission information including the PDN connection attribute information.

The UE 10 receives the PDN connectivity accept transmitted from the TWAG 74. On the basis of the reception of the PDN connectivity accept and/or in accordance with the second identification information and/or the seventh identification information and/or the ninth identification information included in the PDN connectivity accept, the UE 10 transmits a PDN connectivity complete to the TWAG 74 (S2410). The UE 10 may transmit the PDN connectivity complete including at least a PDN connectivity complete message ID (PDN connectivity complete), the Procedure transaction ID, and the PDN connection ID.

Furthermore, in a case where multiple INFOM operation modes are included in the seventh identification information, the UE 10 may include at least the fifth identification information in the PDN connectivity complete. In other words, in a case where multiple INFOM operation modes are allowed, the UE 10 may select one of the allowed modes and transmit the fifth identification information including the selected mode.

Here, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

Specifically, in a case where the UE-Initiated mode and the Network-Initiated mode are included in the seventh identification information included in the PDN connectivity accept, the UE 10 may include the UE-Initiated mode or the Network-Initiated mode in the fifth identification information.

Which one of the UE-Initiated mode and the Network-Initiated mode is to be included in the fifth identification information may be determined based on the UE policy. Note that the UE policy may be any information configured for the UE 10. For example, the UE policy may be information configured by a user.

The PDN connectivity complete message ID may be a message type representing the PDN connectivity complete message.

Thus, the UE 10 completes the additional attach procedure.

The UE 10 is capable of acquiring the same PDN address with the PDN address assigned in the multi-access PDN connection established in the initial state.

The UE 10 is capable of establishing an additional transfer path through the access network B, upon the transition to the first initial state and based on the Operation mode of the first PDN connection.

Specifically, the UE 10 is capable of performing the attach procedure and the PDN connectivity procedure on the access network B to establish the additional transfer path via the TWAG 74, based on the transition to the first initial state and the first PDN connection being in the Network-Initiated mode. Note that the transfer path may be a bearer and/or a communication path.

More specifically, the UE 10 performs the attach procedure, establishes the second PDN connection between the PGW_B selected using the APN 2 and the UE 10, and then performs the PDN connectivity procedure. This enables a transfer path through the access network B to be added to the first PDN connection between the PGW_A selected using the APN 1 and the UE 10. Note that the transfer path may be a bearer and/or a communication path. That is, in a state where a bearer that is for multi-access PDN connection and is through the E-UTRAN is established, a default bearer through the Wireless LAN (WLAN) for the first PDN connection can be further established.

Alternatively, the UE 10 is capable of performing the attach procedure and the PDN connectivity procedure on the access network B to establish the additional transfer path via the TWAG 74, upon transition to the first initial state and based on the Routing Rule of the first PDN connection in the UE-Initiated mode. Note that the transfer path may be a bearer and/or a communication path.

Specifically, the UE 10 performs the attach procedure, establishes the second PDN connection between the PGW_B selected using the APN 2 and the UE 10, and then performs the PDN connectivity procedure. This enables a transfer path through the access network B to be added to the first PDN connectivity between the PGW_A selected using the APN 1 and the UE 10. Note that the transfer path may be a bearer and/or a communication path.

Furthermore, the UE 10 is capable of establishing an additional transfer path through the access network B, upon the transition to the second initial state and based on the Operation mode of the first PDN connection.

Specifically, the UE 10 is capable of performing the PDN connectivity procedure on the access network B to establish the additional transfer path via the TWAG 74, upon the transition to the second initial state and based on the first PDN connection being in the Network-Initiated mode. Note that the transfer path may be a bearer and/or a communication path.

More specifically, the UE 10 performs the PDN connectivity procedure. This enables a transfer path through the access network B to be added to the first PDN connectivity between the PGW_A selected using the APN 1 and the UE 10. Note that the transfer path may be a bearer and/or a communication path.

Alternatively, the UE 10 is capable of performing the PDN connectivity procedure on the access network B to establish the additional transfer path via the eNB 45, upon transition to the second initial state and based on the Routing Rule of the first PDN connection in the UE-Initiated mode. Note that the transfer path may be a bearer and/or a communication path.

Specifically, the UE 10 performs the PDN connectivity procedure. This enables a transfer path through the access network B to be added to the first PDN connectivity between the PGW_A selected using the APN 1 and the UE 10. Note that the transfer path may be a bearer and/or a communication path.

In this way, with respect to the first PDN connection, the UE 10 and the PGW 30 establish a new default bearer. The UE 10 and the PGW 30 store the identification information of the default bearer established in the PDN connectivity procedure and the information identifying the access network B in association with each other, in response to completion of the PDN connectivity procedure through the access network B. Note that the access network B may be a WLAN access network. Furthermore, the information identifying the access network B may be information indicating a WLAN access network.

Note that the UE 10 performs data transmission and/or reception using the default bearer, when the UE 10 does not receive the TFT or transmits and/or receives the user data not matching the held TFT. When multiple default bearers are established, the UE 10 is capable of selecting a default bearer for transmitting and/or receiving data based on the default access, and is capable of transmitting and/or receiving data by using the selected default bearer.

Here, the default access may be default access indicated by the ninth identification information. In a case where the UE 10 does not receive the ninth identification information at the time of establishing the second default bearer for the first PDN connection, the UE 10 may select the default access based on the ninth identification information received at the time of establishing the first default bearer for the first PDN connection, and transmit and/or receive data using the selected default bearer.

Furthermore, the PGW 30 performs data transmission and/or reception using the default bearer when the PGW 30 does not receive the TFT or transmits and/or receives the user data not matching the held TFT. When the PGW 30 establishes multiple default bearers with the UE 10, the PGW 30 is capable of selecting a default bearer for transmitting and/or receiving data based on the default access, and is capable of transmitting and/or receiving data by using the selected default bearer. Here, the default access may be default access indicated by the ninth identification information.

Here, the default access may be default access indicated by the ninth identification information. In a case where the PGW 30 does not transmit the ninth identification information at the time of establishing the second default bearer for the first PDN connection, the PGW 30 may select the default access based on the ninth identification information transmitted at the time of establishing the first default bearer for the first PDN connection, and transmit and/or receive data using the selected default bearer.

In this way, in a case where the UE 10 and the PGE 30 are capable of acquiring the default access in the state where the second default bearer is not established, the PDN connectivity establishment procedure for establishing the second unnecessary default bearer is eliminated. For example, in a case where the communication path through the WLAN access network is established by the additional PDN connection procedure, there may be a case in which no user data that selects the communication path through the WLAN access network exists, and the communication path is not used, depending on the Routing Rule based on the TFT or the like. Learning a default access beforehand eliminates the establishment of such an unnecessary communication path between the UE 10 and the PGW 30, and therefore reduces transmission and/or reception of control messages for unnecessary communication path establishment, consumption of the resources for the communication path, and the like.

In this way, the UE 10 and the PGE 30 acquire the default access in the state where the second default bearer is not established. This enables the UE 10 to determine whether to perform the PDN connection establishment procedure for establishing a new default bearer for the multi-access PDN connection, based on the information of the default access, when the UE 10 is newly located in a serving area of a WLAN access network.

For example, in a case where the default access indicates a LTE network, the multi-access access PDN connection is in the UE-Initiated mode, and the Routing Rule does not include user data to which priority is given to communicate by the communication path through the WLAN, it is not necessary to immediately perform the additional transfer path establishment procedure for establishing the default bearer through the WLAN.

2. Second Embodiment

Hereinafter, a radio communication technology according to an embodiment of the present invention will be described in detail with reference to the drawings.

2.1. System Overview

FIG. 1 is a diagram illustrating an overview of a mobile communication system according to the present embodiment. As illustrated in FIG. 1, a mobile communication system 9 includes a mobile terminal device UE 10, an LTE base station eNB 45 included in an access network A, a Trusted WLAN access gateway (gateway TWAG) 74 included in an access network B, a Mobility Management Entity (MME) 40 included in a core network 90, a Serving Gateway (SGW) 35, and a PDN Gateway (PGW) 30.

Here, the UE 10 may be any mobile terminal device, and may be a User Equipment (UE), a Mobile Equipment (ME), or a Mobile Station (MS).

Furthermore, the access network A may be an LTE access network, and the eNB 45 included in the access network A may be an LTE radio base station. Note that the access network A may include multiple radio base stations.

Furthermore, the access network B may be a WLAN access network. The TWAG 74 may be a gateway that connects to the PGW 30 in the core network 90 to connect the core network 90 and the WLAN access network.

In the present embodiment, the UE 10 is capable of establishing a PDN connection using an EPS bearer through the access network A.

Furthermore, the UE 10 is capable of establishing a PDN connection by using a GTP/PMIPv6 transfer path between the PGW 30 and the UE 10. Note that the transfer path may be a bearer.

Here, the core network 90 denotes an IP mobile communication network run by a Mobile Operator.

For example, the core network 90 may be a core network 90 for the mobile operator that operates and manages the mobile communication system 9, or may be a core network 90 for a virtual mobile operator such as a Mobile Virtual Network Operator (MVNO).

The MME 40 is a control device configured to perform, through the access network A, location management and access control of the UE 10. Details of the MME 40 will be descried later.

Furthermore, the SGW 35 is a gateway device between the core network 90 and the access network A, and is configured to transfer user data between the UE 10 and the PGW 30.

The PGW 30 is a gateway device of a packet data service network (Packet Data Network (PDN)) that provides a communication service to the UE 10.

In the present embodiment, the UE 10 is capable of establishing a first PDN connection and/or a second PDN connection.

Furthermore, in the present embodiment, the NBIFOM is a technology that allows establishment of a multi-access PDN connection.

Furthermore, in the present embodiment, the multi-access PDN connection denotes a PDN connection capable of accommodating, in one PDN connection, a transfer path and/or a bearer over a 3GPP access and/or a WLAN access. In other words, the multi-access PDN connection is capable of accommodating both a transfer path through the 3GPP access and a transfer path through the WLAN access. Note that the multi-access PDN connection may be a PDN connection accommodating only a bearer through the 3GPP access or may be a PDN connection accommodating only a transfer path through the WLAN access. In other words, the multi-access PDN connection denotes a PDN connection capable of constituting one or multiple transfer paths.

Note that in the present embodiment, unlike the first embodiment, the multi-access PDN connection may be a PDN connection established based on the NBIFOM or a PDN connection established based on the IP Flow Mobility (IFOM). Thus, in the present embodiment, the multi-access PDN connection may be either the multi-access PDN connection corresponding to the PDN connection in which a transfer path of a certain flow is selectable based on the NBIFOM or the multi-access PDN connection corresponding to the PDN connection in which a transfer path of a certain flow is selectable based on the IFOM.

Note that the IFOM is a technology for switching a communication path of a certain IP flow by using the Dual Stack Mobile IPv6 (DSMIPv6) protocol. In contrast, the NBIFOM is a technology for switching a communication path of a certain IP flow by using a network-based mobility management protocol such as a General Packet Radio System Tunneling Protocol (GTP) and a Proxy Mobile IP (PMIP).

Furthermore, the first PDN connection may be the above-described multi-access PDN connection.

In detail, the first PDN connection is a PDN connection in which, as one PDN connection, a communication path EPS bearer through the access network A and a communication path including a GTP/PMIPv6 tunnel through the access network B can be used. That is, such a PDN connection enables transmission and/or reception of data through the 3GPP access, the WLAN access, or both thereof. The first PDN connection may be the multi-access PDN connection.

Furthermore, the second PDN connection may be a known PDN connection, rather than the multi-access PDN connection. Note that the second PDN connection may be a single-access PDN connection.

Here, the single-access PDN connection denotes one PDN connection constituting only a transfer path through either the 3GPP access or the WLAN access, unlike the multi-access PDN connection. In detail, the single-access PDN connection is a PDN connection established by the attach in the related art.

That is, the second PDN connection is a PDN connection including the EPS bearer through the access network A or a PDN connection including the GTP/PMIPv6 transfer path through the access network B. The second PDN connection accommodates a transfer path and/or a communication path through either one of the access networks.

As described above, the single-access PDN connection is a PDN connection different from the multi-access PDN connection. Moreover, the single-access PDN connection denotes a PDN connection that is also different from a PDN connection for a Local IP Access (LIPA). Here, the LIPA denotes communication control for offloading the connection to a home network. More specifically, the base station to which the terminal device connects achieves the offloading, by transmitting, to a home network to which the base station connects, user data that is conventionally delivered to the core network 90. The PDN connection for the LIPA is a PDN connection for performing such communication based on the LIPA.

Next, an example of a configuration of the core network 90 will be described. FIG. 2A illustrates an example of a configuration of the IP mobile communication network. As illustrated in FIG. 2A, the core network 90 includes a Home Subscriber Server (HSS) 50, an Authentication, Authorization, Accounting (AAA) 55, a Policy and Charging Rules Function (PCRF) 60, the PGW 30, an enhanced Packet Data Gateway (ePDG) 65, the SGW 35, the MME 40, and a Serving GPRS Support Node (SGSN) 45.

Furthermore, the core network 90 is capable of connecting to multiple radio access networks (an LTE AN 80, a WLAN ANb 75, a WLAN ANa 70, a UTRAN 20, and a GERAN 25).

A radio access network may be configured by connecting to multiple different access networks, or may be configured with either one of the access networks. Moreover, the UE 10 is capable of connecting wirelessly to the radio access network.

Moreover, a WLAN Access Network b (WLAN ANb 75) that connects to the core network 90 via the ePDG 65 and a WLAN Access Network a (WLAN ANa 75) that connects to the PGW 30, the PCRF 60, and the AAA 55 can be configured as access networks to be connectable in a WLAN access system.

Note that the devices have a similar configuration to those of the devices in the related art in a mobile communication system using EPS, and thus a detailed descriptions will be omitted. Each device will be described briefly hereinafter.

The PGW 30 is connected to the PDN 100, the SGW 35, the ePDG 65, the WLAN ANa 70, the PCRF 60, and the AAA 55, and serves as a relay device configured to transfer user data by functioning as a gateway device between the PDN 100 and the core network 90.

The SGW 35 is connected to the PGW 30, the MME 40, the LTE AN 80, the SGSN 45, and the UTRAN 20, and serves as a relay device configured to transfer user data by functioning as a gateway device between the core network 90 and the 3GPP access network (the UTRAN 20, the GERAN 25, and the LTE AN 80).

The MME 40 is connected to the SGW 35, the LTE AN 80, and the HSS 50, and serves as an access control device configured to perform location information management and access control for the UE 10 via the LTE AN 80. Furthermore, the core network 90 may include multiple location management devices. For example, a location management device different from the MME 40 may be included. Like the MME 40, the location management device different from the MME 40 may be connected to the SGW 35, the LTE AN 80, and the HSS 50.

Furthermore, in a case where multiple MMES 40 are included in the core network 90, the MMES 40 may be connected to each other. With this configuration, the context of the UE 10 may be transmitted and/or received among the MMES 40.

The HSS 50 is connected to the MME 40 and the AAA 55, and serves as a managing node configured to manage subscriber information. The subscriber information of the HSS 50 is referenced, for example, in the access control for the MME 40. Moreover, the HSS 50 may be connected to the location management device different from the MME 40.

The AAA 55 is connected to the PGW 30, the HSS 50, the PCRF 60, and the WLAN ANa 70 and is configured to perform access control for the UE 10 connected via the WLAN ANa 70.

The PCRF 60 is connected to the PGW 30, the WLAN ANa 75, the AAA 55, and the PDN 100, and is configured to perform QoS management on data delivery. For example, the PCRF 60 manages QoS of a communication path between the UE 10 and the PDN 100.

The ePDG 65 is connected to the PGW 30 and the WLAN ANb 75, and is configured to deliver user data by functioning as a gateway device between the core network 90 and the WLAN ANb 75.

The SGSN 45 is connected to the UTRAN 20, the GERAN 25, and the SGW 35, and serves as a control device for location management between a 3G/2G access network (UTRAN/GERAN) and the LTE access network (E-UTRAN). In addition, the SGSN 45 has functions of: selecting the PGW 30 and the SGW 35; managing a time zone of the UE 10; and selecting the MME 40 at the time of handover to the E-UTRAN.

Also, as illustrated in FIG. 2B, each radio access network includes devices to which the UE 10 is actually connected (for example, a base station device and an access point device), and the like. The devices used in these connections are assumed to adapt to the radio access networks.

In the present embodiment, an LTE AN 80 includes an eNB 45. The eNB 45 serves as a radio base station, to which the UE 10 connects in an LTE access system, and the LTE AN 80 may include one or multiple radio base stations.

The WLAN ANa 70 includes a WLAN APa 72 and the TWAG 74. The WLAN APa 72 is a radio base station to which the UE 10 connects in the WLAN access system trusted by the operator running the core network 90, and the WLAN ANa 70 may include one or multiple radio base stations. The TWAG 74 serves as a gateway device between the core network 90 and the WLAN ANa 70. The WLAN APa 72 and the TWAG 74 may be configured as a single device.

Even in a case where the operator running the core network 90 and the operator running the WLAN ANa 70 are different from each other, such a configuration can be implemented through contracts and agreements between the operators.

Furthermore, the WLAN ANb 75 includes a WLAN APb 76. The WLAN APb 76 is a radio base station to which the UE 10 connects in the WLAN access system in a case where no trusting relationship is established with the operator running the core network 90, and the WLAN ANb 75 may include one or multiple radio base stations.

In this manner, the WLAN ANb 75 is connected to the core network 90 via the ePDG 65, which is a device included in the core network 90, serving as a gateway. The ePDG 65 has a security function for ensuring security.

The UTRAN 20 includes a radio network controller (RNC) 24 and an eNB (UTRAN) 22. The eNB (UTRAN) 22 is a radio base station to which the UE 10 connects through a UMTS Terrestrial Radio Access (UTRA), and the UTRAN 20 may include one or multiple radio base stations. Furthermore, the RNC 24 is a control unit configured to connect the core network 90 and the eNB (UTRAN) 22, and the UTRAN 20 may include one or multiple RNCs. Moreover, the RNC 24 may be connected to one or multiple eNBs (UTRANs) 22. In addition, the RNC 24 may be connected to a radio base station (Base Station Subsystem (BSS) 26) included in the GERAN 25.

The GERAN 25 includes the BSS 26. The BSS 26 is a radio base station to which the UE 10 connects through GSM/EDGE Radio Access (GERA), and the GERAN 25 may be configured with one or multiple radio Base Station BSs. Furthermore, the multiple BSSs 26 may be connected to each other. Moreover, the BSS 26 may be connected to the RNC 24.

Note that in the present specification, a UE 10 to be connected to each radio access network denotes a UE 10 to be connected to a base station device, an access point, or the like included in each radio access network, and data, signals, and the like being transmitted and/or received also traverse those base station devices, access points, or the like.

2.2. Device Configuration

The configuration of each device will be described below.

2.2.1. TWAG Configuration

FIG. 3 illustrates a device configuration of the TWAG 74. As illustrated in FIG. 3, the TWAG 74 is constituted of an IP mobile communication network interface unit 320, a control unit 300, and a storage 340. The IP mobile communication network interface unit 320 and the storage 340 are connected to the control unit 300 via a bus.

The control unit 300 serves as a function unit for controlling the TWAG 74. The control unit 300 implements various processes by reading out and executing various programs stored in the storage 340.

The IP mobile communication network interface unit 320 serves as a data transmission and/or reception unit configured to transmit and/or receive user data and/or a control message, and serves as a function unit through which the TWAG 74 is connected to the PGW 30.

The storage 340 serves as a function unit for storing programs, data, and the like necessary for each operation of the TWAG 74. The storage 340 includes, for example, a semiconductor memory, a Hard Disk Drive (HDD), or the like.

As illustrated in FIG. 3, the storage 340 stores a TWAG capability 342, a Network capability 344, and an EPS bearer context 346. Hereinafter, information elements stored in the storage 340 will be described.

FIGS. 4A to 4E illustrate the information elements stored in the storage 340. FIG. 4A illustrates an example of the TWAG capability stored in the TWAG 74. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

As illustrated in FIG. 4A, an NBIFOM capability may be stored in association with a TWAG ID, which is the identification information of the TWAG 74. In a case of not being associated with the TWAG ID, the NBIFOM capability may mean a capability of the TWAG 74 to be stored.

In a case where the TWAG ID and the NBIFOM capability are stored in association with each other, the TWAG 74 may store the TWAG capability of multiple TWAGs 74.

In this case, when the UE 10 performs a handover to another TWAG 74, the TWAG 74 may select a TWAG 74 to which the handover is made, based on the TWAG Capability.

Next, the Network capability 344 will be described. FIG. 4B illustrates an example of the Network capability stored in the TWAG 74. In the Network capability, the NBIFOM capability is stored for each network, i.e., for each PGW 30.

Here, the NBIFOM capability denotes identification information indicating whether the capability of establishing the first PDN connection is supported for each network. In other words, the identification information indicates whether the PGW 30 supports the NBIFOM function. More specifically, for example, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. In other words, the NBIFOM capability may be identification information indicating that a gateway supports the NBIFOM function. That is, the existence of the NBIFOM capability in the storage may mean that the PGW 30 is a gateway having the function of establishing the first PDN connection. In other words, the existence of the NBIFOM capability in the storage may mean that the PGW 30 is a gateway supporting the NBIFOM function.

As illustrated in FIG. 4B, the TWAG 74 stores an NBIFOM capability in association with a PGW ID. Furthermore, as illustrated in FIG. 4B, the NBIFOM capabilities may be stored in association with the multiple PGWs 30, respectively.

The PGW ID may be any information for identifying the PGW 30, and may be, for example, an Access Point Name (APN).

Next, the EPS bearer context will be described. The EPS bearer context may be classified into the EPS bearer context for each UE 10 stored for each UE 10, the EPS bearer context for each PDN connection, and the EPS bearer context for each bearer and/or transfer path.

FIG. 4C illustrates information elements included in the EPS bearer context for each UE 10. As seen from FIG. 4C, the TWAG 74 stores, for each UE 10, a UE NBIFOM capability and an NBIFOM allowed.

A UE NBIFOM capability denotes an NBIFOM capability of the UE 10. The UE NBIFOM capability denotes identification information, for each UE 10, indicating whether the capability of establishing the first PDN connection is supported. In other words, the UE NBIFOM capability denotes identification information indicating whether the UE 10 supports the NBIFOM function. More specifically, for example, the UE NBIFOM capability may include "allowed" or "Not allowed".

Note that the NBIFOM function may be information indicating the provision of the function of establishing the multi-access PDN connection based on the NBIFOM.

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage may mean that the UE 10 supports the NBIFOM function.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection based on the NBIFOM. In other words, in the present embodiment, the UE 10 is allowed to establish the multi-access PDN connection based on the NBIFOM by using the APN 1. Note that the APN 1 is also allowed to establish the known PDN connection, rather than the multi-access PDN connection based on the NBIFOM.

In addition, in the present embodiment, the APN 2 is not associated with the NBIFOM allowed. That is, in the present embodiment, the APN 2 is not allowed to establish the multi-access PDN connection based on the NBIFOM. That is, in the present embodiment, the UE 10 cannot establish the multi-access PDN connection based on the NBIFOM by using the APN 2.

The NBIFOM allowed may be stored before the PDN connection is established.

The TWAG 74 may access the HSS 50 to acquire the NBIFOM allowed, before the PDN connection is established and/or while the establishment procedure is being performed.

Furthermore, the EPS bearer context for each UE 10 may include identification information of the UE 10. The identification information of the UE 10 may be an IMSI.

Furthermore, FIG. 4D illustrates the EPS bearer context for each PDN connection. The EPS bearer context for each PDN connection includes a PDN connection ID, a Network allowed mode, an Operation mode, a User plane connection ID, a TWAG MAC address, and an NBIFOM Permission.

The PDN connection ID is identification information for identifying a PDN connection. The UE 10, the TWAG 74, and the PGW 30 may store the same identification information.

The Operation mode is identification information of a mode that indicates which one of the UE 10 and a network takes an initiative in transmitting and/or receiving data or is allowed to initiate communication control in a case where the PDN connection is the first PDN connection.

More specifically, for example, an Operation mode that allows the UE 10 to initiate the communication control may be a UE-Initiated mode.

Furthermore, an Operation mode that allows the network and/or the PGW 30 and/or the PCRF 60 to initiate the communication control may be a Network Initiated mode.

The Network allowed mode indicates an Operation mode allowed by the network. The Network allowed mode may include the UE Initiated mode, the Network Initiated mode, or both thereof.

The User plane connection ID is identification information for identifying a connection used for transmission of user data when the UE 10 establishes a transfer path via the TWAG 74.

The TWAG MAC address is a physical address of the TWAG 74.

The NBIFOM permission is information indicating that the PDN connection has established the multi-access PDN connection based on the NBIFOM. In other words, the NBIFOM permission indicates that the first PDN connection has been established.

That is, the TWAG 74 having stored the NBIFOM permission means that this PDN connection is the first PDN connection.

The NBIFOM permission is identification information that is stored in the TWAG 74 upon the PDN connection being established.

The TWAG 74 may access the HSS 50 to acquire the NBIFOM permission while the PDN connection is being established. Alternatively, the TWAG 74 may store the NBIFOM Permission based on the establishment of the multi-access PDN connection based on the NBIFOM.

Next, the EPS bearer context for each bearer and/or transfer path will be described. As illustrated in FIG. 4E, the EPS bearer context for each bearer and/or transfer path may include the transfer path identification information and the Routing Rule.

The transfer path identification information is information for identifying a transfer path and/or bearer. The transfer path identification information may be an EPS bearer ID, for example.

The Routing Rule indicates an association of a Routing Filter, and a Routing address or Routing access type. Whether using a communication path through the 3GPP access network or using a communication path through the WLAN access network is determined, based on such an association.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60, or may be notified from the UE 10. Alternatively, the Routing Rule may be a value that the TWAG 74 stores beforehand as a default value.

A Routing Filter may include an IP header to switch an IP flow. Alternatively, the Routing Filter may include an application ID to switch the flow for each application. Alternatively, the Routing Filter may include the TFT.

The Routingu Rule may store multiple rules. Furthermore, the Routing rule may include a priority for each rule.

The TWAG capability and the Network capability may be included in the EPS bearer context.

2.2.2. HSS Configuration

Next, the configuration of the HSS 50 will be described. FIG. 5 illustrates a device configuration of the HSS 50. As illustrated in FIG. 5, the HSS 50 is constituted of an IP mobile communication network interface unit 520, a control unit 500, and a storage 540. The IP mobile communication network interface unit 520 and the storage 540 are connected to the control unit 500 via a bus.

The control unit 500 serves as a function unit for controlling the HSS 50. The control unit 500 implements various processes by reading out and executing various programs stored in the storage 540.

The IP mobile communication network interface unit 520 serves as a data transmission and/or reception unit configured to transmit and/or receive user data and/or a control message, and also serves as a function unit for connecting the HSS 50 to the MME 40 and/or another MME 40, and the AAA 55.

The storage 540 serves as a function unit for storing programs, data, and the like necessary for each operation of the HSS 50. The storage 540 includes, for example, a semiconductor memory, a Hard Disk Drive (HDD), or the like.

As illustrated in FIG. 5, the storage 540 stores HSS data 542. Hereinafter, information elements stored in the storage 540 will be described.

FIGS. 6A and 6B illustrate the information elements stored in the storage 540. FIG. 6A illustrates an example of HSS data for each UE 10 to be stored in the HSS 50.

As seen from FIG. 6A, the HSS data for each UE 10 includes an IMSI, an MSISDN, an IMEI/IMEISV, an Access Restriction, a UE NBIFOM capability, and an NBIFOM allowed.

The IMSI is identification information to be assigned to a user (subscriber) using the UE 10.

The MSISDN represents the phone number of the UE 10.

The IMEI/IMISV is identification information assigned to the UE 10.

The Access Restriction indicates registration information for access restriction.

A UE NBIFOM capability denotes an NBIFOM capability of the UE 10. The UE NBIFOM capability denotes identification information, for each UE 10, indicating whether the capability of establishing the first PDN connection is supported. In other words, the UE NBIFOM capability indicates whether the UE 10 supports the NBIFOM function. More specifically, for example, the NBIFOM capability may include "allowed" or "Not allowed".

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection based on the NBIFOM. In other words, in the present embodiment, the UE 10 is allowed to establish the multi-access PDN connection based on the NBIFOM by using the APN 1. Note that the APN 1 is also allowed to establish the known PDN connection, rather than the multi-access PDN connection based on the NBIFOM.

In addition, in the present embodiment, the APN 2 is not associated with the NBIFOM allowed. That is, in the present embodiment, the APN 2 is not allowed to establish the multi-access PDN connection based on the NBIFOM. That is, in the present embodiment, the UE 10 cannot establish the multi-access PDN connection based on the NBIFOM by using the APN 2.

The NBIFOM allowed may be stored before the PDN connection is established.

FIG. 6B illustrates an example of HSS data for each PDN connection stored in the HSS 50. As seen from FIG. 6B, the HSS data for each PDN connection includes at least a Context ID, a PDN address, a PDN Type, an Access Point Name (APN), a WLAN offlaod ability, a PDN GW ID, and an NBIFOM Permission.

The Context ID is identification information of the context storing the HSS data for each PDN connection. The PDN Address represents a registered IP address. The PDN Address is an IP address of the UE 10.

The PDN Type indicates the type of PDN Address. That is, the PDN Type is identification information for identifying IPv4, IPv6, or IPv4v6, for example. The APN is a label indicating an access destination in the network, in accordance with the DNS naming convention.

The WLAN offload ability is identification information indicating whether traffic connected through the APN can be offloaded to the WLAN by utilizing a cooperative function between the WLAN and the 3GPP, or the 3GPP connection is maintained. The WLAN offload ability may vary for each RAT type. Specifically, the LTE (E-UTRA) and the 3G (UTRA) may have different WLAN offload abilities.

The PDN GW identity is identification information for identifying the PGW 30 utilized in this APN. This identification information may be a Fully Qualified Domain Name (FQDN) or an IP address.

The NBIFOM permission is information indicating that the PDN connection has established the multi-access PDN connection based on the NBIFOM. In other words, the NBIFOM permission indicates that the first PDN connection has been established.

That is, the TWAG 74 having stored the NBIFOM permission means that this PDN connection is the first PDN connection.

The NBIFOM permission is identification information that is stored in the TWAG 74 upon the PDN connection being established.

Specifically, for example, the HSS data for each PDN connection including the APN 1 may include the NBIFOM permission, and the HSS data for each PDN connection including the APN 2 may not necessarily include the NBIFOM permission.

In other words, the PDN connection based on the APN 1 may be the first PDN connection, and the PDN connection based on the APN 2 cannot be the first PDN connection.

2.2.3. UE Configuration

Next, the configuration of the UE 10 will be described. FIG. 7 illustrates a device configuration of the UE 10. As illustrated in FIG. 7, the UE 10 is constituted of an LTE interface unit 720, a WLAN interface unit 740, a control unit 700, and a storage 750.

The LTE interface unit 720, the WLAN interface unit 740, and the storage 750 are connected to the control unit 700 via a bus.

The control unit 700 serves as a function unit for controlling the UE 10. The control unit 700 implements various processes by reading out and executing various programs stored in the storage 750.

The LTE interface unit 720 serves as a data transmission and/or reception unit configured to transmit and/or receive user data and/or a control message, and also serves as a function unit through which the UE 10 connects to an IP access network via an LTE base station. Furthermore, the external antenna 710 is connected to the LTE interface unit 720.

The WLAN interface unit 740 serves as a data transmission and/or reception unit configured to transmit and/or receive user data and/or a control message, and also serves as a function unit through which the UE 10 connects to a WLAN AP and connects to the IP access network. Furthermore, the external antenna 730 is connected to the WLAN interface unit 740.

The control unit 700 serves as a function unit for controlling the UE 10. The control unit 700 implements various processes by reading out and executing various programs stored in the storage 750.

The storage 750 serves as a function unit for storing programs, data, and the like necessary for each operation of the UE 10. The storage 750 is configured with, for example, a semiconductor memory, a Hard Disk Drive (HDD), or the like.

As illustrated in FIG. 7, the storage 750 stores a UE context 752. Hereinafter, information elements stored in the storage 750 will be described. Note that the UE context 752 is classified into a UE context for each UE 10, a UE context for each PDN connection, and a UE context for each transfer path and/or bearer.

FIG. 8A is an example of the UE context stored for each UE 10. As illustrated in FIG. 8A, the UE context for each UE 10 includes an IMSI, an EMM State, a GUTI, an ME Identity, and a UE NBIFOM capability.

The IMSI is identification information to be assigned to a user (subscriber) using the UE 10.

The EMM State indicates a mobility management state of the UE 10. For example, the EMM State may be EMM-REGISTERED in which the UE 10 is registered with the network (registered state) or EMM-DEREGISTERD in which the UE 10 is not registered with the network (deregistered state).

The GUTI is an abbreviation of "Globally Unique Temporary Identity," and is temporary identification information of the UE 10. The GUTI is configured with identification information of the MME 40 (Globally Unique MME Identifier (GUMMEI)) and identification information of the UE 10 in a specific MME 40 (M-TMSI).

The ME identity is an ID of an ME, and may be, for example, an IMEI/IMISV.

A UE NBIFOM capability denotes an NBIFOM capability of the UE 10. The UE NBIFOM capability denotes identification information, for each UE 10, indicating whether the capability of establishing the first PDN connection is supported. In other words, the UE NBIFOM capability denotes identification information, for each UE 10, indicating whether the NBIFOM function is supported. More specifically, for example, the NBIFOM capability may include "allowed" or "Not allowed".

Note that the NBIFOM function may be information indicating the provision of the function of establishing the multi-access PDN connection based on the NBIFOM.

Alternatively, the UE NBIFOM capability may be identification information indicating that the UE 10 has the capability of establishing the first PDN connection. That is, the existence of the UE NBIFOM capability in the storage of the UE 10 may mean that the UE 10 has the function of establishing the first PDN connection.

In other words, the UE NBIFOM capability may be identification information indicating that the UE 10 supports the NBIFOM function. That is, the existence of the UE NBIFOM capability in the storage of the UE 10 may mean that the UE 10 supports the NBIFOM function.

FIG. 8B illustrates an example of the UE context for each PDN connection. As illustrated in FIG. 8B, the UE context for each PDN connection includes at least a PDN connection ID, an APN in Use, an IP address, a Default Bearer, a WLAN offload ability, a UE allowed mode, and an Operation mode.

The PDN connection ID is identification information for identifying a PDN connection. The UE 10, the TWAG 74, and the PGW 30 may store the same identification information.

The APN in Use is an APN utilized by the UE 10 most recently. This APN may include identification information of the network and identification information of a default operator.

The IP Address is an IP address assigned to the UE 10 through the PDN connection, and may be an IPv4 address or an IPv6 prefix.

The Default Bearer is EPS bearer identification information for identifying a default bearer in this PDN connection.

Note that the UE 10 may establish multiple default bearers for a PDN connection, in a case where the PDN connection is a multi-access PDN connection. Therefore, the multi-access PDN connection may be managed in association with the multiple default bearers. Specifically, EPS bearer identification information corresponding to each default bearer may be managed in association with the multi-access PDN connection.

Furthermore, the UE 10 may manage a default bearer and an access network in association with each other.

Specifically, the UE 10 may store the EPS bearer identification information identifying each of the default bearer for the access network A and the default bearer for access network B. Here, the default bearer for an access network may be a default bearer for an access system of the access network. Therefore, the UE 10 may store a default bearer for a 3GPP access and a default bearer for a WLAN access in association with a multi-access PDN connection.

The default bearer for the multi-access PDN connection may be a default bearer established by the UE 10. In other words, the UE 10 stores one default bearer for the multi-access PDN connection in a state where only one default bearer is established for the multi-access PDN connection, and the UE 10 may store two default bearers for the multi-access PDN connection in a state where two default bearers are established for the multi-access PDN connection.

Furthermore, the UE 10 may store information indicating a default access (Default Assess) in the multi-access PDN connection, for the multi-access PDN connection. Note that the default access may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the default access may include more detailed information. For example, the default access may be one of E-UTRAN access, UTRAN access and GERAN access.

In a case where multiple default bearers are established, the UE 10 may select a default bearer based on the default access, and may transmit and/or receive user data by using the selected default bearer.

The WLAN offload ability is WLAN offload permission information indicating whether a communication associated with the PDN connection allows offloading the connection to the WLAN by using an interworking function between the WLAN and the 3GPP, or the 3GPP access is maintained.

The UE allowed mode is an operation mode allowed by the UE 10. This identification information may indicate the UE initiated mode, the Network Initiated mode, or both thereof.

The Operation mode is identification information of a mode that indicates which one of the UE 10 and a network takes an initiative in transmitting and/or receiving data or is allowed to initiate communication control in a case where the current PDN connection is the first PDN connection.

FIG. 8C illustrates the UE context for each bearer. The UE context for each bearer includes transfer path identification information and a Routing Rule.

The transfer path identification information is information for identifying a transfer path and/or bearer. The transfer path identification information may be an EPS bearer ID, for example.

Furthermore, the transfer path identification information may be associated with the TFT.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60. Alternatively, the Routing rule may be a value that the UE 10 stores beforehand as a default value.

A Routing Filter may include an IP header to switch an IP flow. Alternatively, by including an application ID in the Routing Filter, the UE 10 may switch the flow for each application. Alternatively, the Routing Filter may include a TFT.

The Routingu Rule may store multiple rules (regulations). Furthermore, the Routing rule may include a priority for each rule.

FIG. 8D illustrates the TWAG Capability. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

The UE 10 may store the NBIFOM capability in association with the TWAG ID. Furthermore, the NBIFOM capability of multiple TWAGs 74 may be stored.

FIG. 8E illustrates an example of the Network capability. The Network capability stores the NBIFOM capability for each network, i.e., for each PGW 30.

Here, the NBIFOM capability denotes identification information indicating whether the capability of establishing the first PDN connection is supported for each network. More specifically, for example, the NBIFOM capability may include "allowed" or "Not allowed".

Alternatively, the NBIFOM capability may be identification information indicating the capability of establishing the first PDN connection. That is, the existence of the NBIFOM capability may mean that the PGW 30 and/or the network is a gateway having the function of establishing the first PDN connection.

As illustrated in FIG. 8E, the TWAG 74 stores the NBIFOM capability in association with the PGW ID. Furthermore, as illustrated in FIG. 4B, the NBIFOM capabilities may be stored in association with the multiple PGWs 30, respectively.

The PGW ID is information for identifying the PGW 30. The PGW ID may be an APN, for example.

FIG. 8F illustrates the MME capability. In the MME capability, identification information (NBIFOM capability) is stored for each MME 40, the information indicating whether the capability of establishing the first PDN connection is supported. In other words, the identification information indicates whether the MME 40 supports the NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. That is, the existence of the NBIFOM capability in the storage may mean that the MME 40 is a gateway having the function of establishing the first PDN connection. In other words, the existence of the NBIFOM capability in the storage may mean that the MME 40 is a gateway supporting the NBIFOM function.

The UE 10 may store the NBIFOM capability in association with the MME ID.

FIG. 8G illustrates the SGW capability. In the SGW capability, identification information (NBIFOM capability) is stored for each SGW 35, the information indicating whether capability of establishing the first PDN connection is supported. In other words, the identification information indicates whether the SGW 35 supports the NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. That is, the existence of the NBIFOM capability in the storage may mean that the SGW 35 is a gateway having the function of establishing the first PDN connection. In other words, the existence of the NBIFOM capability in the storage may mean that the SGW 35 is a gateway supporting the NBIFOM function.

The UE 10 may store the NBIFOM capability in association with the SGW ID.

The TWAG capability, the Network capability, the MME capability, and the SGW capability may be included in the UE context, or may be information separated from the UE context.

That is, the UE 10 may store the TWAG Capability and the Network capability included in the UE context, or may store the TWAG Capability and the Network capability separately from the UE context.

2.2.4. PGW Components

Next, the components of the PGW 30 will be described. FIG. 9 illustrates a device configuration of the PGW 30. As illustrated in FIG. 9, the PGW 30 is constituted of an IP mobile communication network interface unit 920, a control unit 900, and a storage 940. The IP mobile communication network interface unit 920 and the storage 940 are connected to the control unit 900 via a bus.

The control unit 900 serves as a function unit for controlling the PGW 30. The control unit 900 implements various processes by reading out and executing various programs stored in the storage 940.

The IP mobile communication network interface unit 920 serves as a data transmission and/or reception unit configured to transmit and/or receive user data and/or a control message, and also serves as a function unit through which the PGW 30 is connected to the SGW 35 and/or the PCRF 60 and/or the ePDG 65 and/or the AAA 55 and/or the GW 74.

The storage 940 serves as a function unit for storing programs, data, and the like necessary for each operation of the PGW 30. The storage 940 is configured with, for example, a semiconductor memory, a Hard Disk Drive (HDD), or the like.

As illustrated in FIG. 9, the storage 940 stores an EPS bearer context 942. Note that the EPS bearer context includes an EPS bearer context stored for each UE 10, an EPS bearer context stored for each APN, an EPS bearer context stored for each PDN connection, and an EPS bearer context stored for each transfer path and/or bearer.

First, the EPS bearer context for each UE 10 will be described. FIG. 10A illustrates an example of the EPS bearer context for each UE 10. As illustrated in FIG. 10A, the EPS bearer context includes at least an IMSI, an ME identity, an MSISDN, and a UE NBIFOM capability.

The IMSI is information for identifying a user of the UE 10.

The ME identity is an ID of an ME, and may be, for example, an IMEI/IMISV.

The MSISDN represents the phone number of the UE 10.

A UE NBIFOM capability denotes an NBIFOM capability of the UE 10. The UE NBIFOM capability denotes identification information, for each UE 10, indicating whether the capability of establishing the first PDN connection is supported. More specifically, for example, the NBIFOM capability may include "allowed" or "Not allowed".

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

Next, the EPS bearer context for each PDN connection will be described. FIG. 10B illustrates an example of the EPS bearer context for each PDN connection.

As illustrated in FIG. 10B, the context includes at least a PDN connection ID, an IP address, a PDN type, an APN, a Network allowed mode, and an Operation mode.

The PDN connection ID is identification information for identifying a PDN connection. The UE 10, the TWAG 74, the MME 40, and the PGW 30 may store the same identification information.

The IP Address indicates an IP address assigned to the UE 10 for the PDN connection. The IP address may be an IPv4 and/or IPv6 prefix.

The PDN type indicates the type of IP address. The PDN type indicates IPv4, IPv6, or IPv4v6, for example.

The APN is a label indicating an access destination in the network, in accordance with the DNS naming convention.

The Network allowed mode indicates an Operation mode allowed by the network. The Network allowed mode may include the UE Initiated mode, the Network Initiated mode, or both thereof.

The Operation mode is identification information of a mode that indicates which one of the UE 10 and a network takes an initiative in transmitting and/or receiving data or is allowed to initiate communication control in a case where the current PDN connection is the first PDN connection.

More specifically, for example, the UE Initiated mode in which the UE 10 is allowed to initiate the communication control or the Network Initiated mode in which the network is allowed to initiate the communication control may be identified.

Next, an example of the EPS bearer context for each transfer path and/or bearer will be described with reference to FIG. 10C. As illustrated in FIG. 10C, the context includes at least transfer path identification information and a Routing Rule.

The transfer path identification information is information for identifying a transfer path and/or bearer. The transfer path identification information may be an EPS bearer ID, for example.

Furthermore, the transfer path identification information may be associated with the TFT.

The Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60. Alternatively, the Routing rule may be a value that the UE 10 stores beforehand as a default value.

The Routing Filter may include an IP header and the PGW 30 switches the IP flow. Alternatively, by including an application ID in the Routing Filter, the PGW 30 may switch the flow for each application. Alternatively, the Routing Filter may include a TFT.

The Routingu Rule may store multiple rules. Furthermore, the Routing rule may include a priority for each rule.

Furthermore, the PGW 30 may establish the default bearer for each PDN connection established with the UE 10, and store the EPS bearer identification information identifying the default bearer.

Note that the PGW 30 may establish multiple default bearers for a PDN connection, in a case where the PDN connection is a multi-access PDN connection. Therefore, the multi-access PDN connection may be managed in association with the multiple default bearers. Specifically, EPS bearer identification information corresponding to each default bearer may be managed in association with the multi-access PDN connection.

Furthermore, the PGW 30 may manage the default bearers and the access network in association with each other.

Specifically, the PGW 30 may store the EPS bearer identification information identifying each of the default bearer for the access network A and the default bearer for access network B. Here, the default bearer for an access network may be a default bearer for an access system of the access network. Therefore, the PGW 30 may store the default bearer for 3GPP access and the default bearer for a WLAN access in association with the multi-access PDN connection.

The default bearer for the multi-access PDN may be a default bearer that is being established between the PGW 30 and the UE 10. In other words, the PGW 30 stores one default bearer for the multi-access PDN connection in a state where only one default bearer is established for the multi-access PDN connection, and the PGW 30 may store two default bearers for the multi-access PDN connection in a state where two default bearers are established for the multi-access PDN connection.

Furthermore, the PGE 30 may store information indicating a default access (Default Assess) in the multi-access PDN connection, for the multi-access PDN connection. Note that the default access may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the default access may include more detailed information. For example, the default access may be one of E-UTRAN access, UTRAN access and GERAN access.

When multiple default bearers are established, the PGW 30 may select a default bearer based on the default access, and transmit and/or receive user data by using the selected default bearer.

FIG. 10D illustrates the TWAG Capability. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

The PGW 30 may store the NBIFOM capability in association with the TWAG ID.

FIG. 10E illustrates an example of the Network capability. In the Network capability, the NBIFOM capability is stored for each network, i.e., for each PGW 30.

Here, the NBIFOM capability denotes identification information indicating whether the capability of establishing the first PDN connection is supported for each network. More specifically, for example, the NBIFOM capability may include "allowed" or "Not allowed".

Alternatively, the NBIFOM capability may be identification information indicating the capability of establishing the first PDN connection. That is, the existence of the NBIFOM capability may mean that the PGW 30 and/or the network is a gateway having the function of establishing the first PDN connection.

As illustrated in FIG. 10E, the PGW 30 stores the NBIFOM capability in association with the PGW ID. Furthermore, as illustrated in FIG. 4B, the NBIFOM capabilities may be stored in association with the multiple PGWs 30, respectively.

The PGW ID may be any information for identifying the PGW 30, and may be, for example, an APN.

FIG. 10F illustrates the MME capability. In the MME capability, identification information (NBIFOM capability) is stored for each MME 40, the information indicating whether the capability of establishing the first PDN connection is supported. In other words, the identification information indicates whether the MME 40 supports the NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. That is, the existence of the NBIFOM capability in the storage may mean that the MME 40 is a gateway having the function of establishing the first PDN connection. In other words, the existence of the NBIFOM capability in the storage may mean that the MME 40 is a gateway supporting the NBIFOM function.

The PGW 30 may store the NBIFOM capability in association with the MME ID.

FIG. 10G illustrates the SGW capability. In the SGW capability, identification information (NBIFOM capability) is stored for each SGW 35, the information indicating whether capability of establishing the first PDN connection is supported. In other words, the identification information indicates whether the SGW 35 supports the NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. That is, the existence of the NBIFOM capability in the storage may mean that the SGW 35 is a gateway having the function of establishing the first PDN connection. In other words, the existence of the NBIFOM capability in the storage may mean that the SGW 35 is a gateway supporting the NBIFOM function.

The PGW 30 may store the NBIFOM capability in association with the SGW ID.

The TWAG capability, the Network capability, the MME capability, and the SGW capability may be included in the EPS bearer context, or may be information separated from the UE context.

2.2.5. PCRF Components

Next, components of the PCRF 60 will be described. FIG. 11 illustrates a device configuration of the PCRF 60. As illustrated in FIG. 11, the PCRF 60 is constituted of an IP mobile communication network interface unit 1120, a control unit 1100, and a storage 1140. The IP mobile communication network interface unit 1120 and the storage 1140 are connected to the control unit 1100 via a bus.

The control unit 1100 serves as a function unit for controlling the PCRF 60. The control unit 1100 implements various processes by reading out and executing various programs stored in the storage 1140.

The IP mobile communication network interface unit 1120 serves as a data transmission and reception unit configured to transmit and/or receive user data and/or a control message, and also serves as a function unit through which the PCRF 60 is connected to the PGW 30 and/or the TWAG 74 and/or the AAA 55.

The storage 1140 serves as a function unit for storing programs, data, and the like necessary for each operation of the PCRF 60. The storage 940 is configured with, for example, a semiconductor memory, a Hard Disk Drive (HDD), or the like.

As illustrated in FIG. 11, the storage 1140 stores UE context 1142. Note that the UE context may be classified into a UE context stored for each UE 10 and a UE context stored for each PDN connection.

FIG. 12A illustrates the UE context for each UE 10. As illustrated in FIG. 12A, the context includes at least a Subscriber ID and UE NBIFOM capability.

The Subscriber ID is identification information of a user. For example, the subscriber ID may be an IMSI.

A UE NBIFOM capability denotes an NBIFOM capability of the UE 10. The UE NBIFOM capability denotes identification information, for each UE 10, indicating whether the capability of establishing the first PDN connection is supported. In other words, the UE NBIFOM capability denotes identification information indicating whether the UE 10 supports the NBIFOM function. More specifically, for example, the NBIFOM capability may include "allowed" or "Not allowed".

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage may mean that the UE 10 supports the NBIFOM function.

Next, the UE context for each PDN connection will be described. FIG. 12B illustrates an example of the UE context for each PDN connection. As illustrated in FIG. 12B, the context may include at least an APN, an Operation mode, a Network Policy, a Charging Rule, a PCC Rule, and a QoS Rule.

The APN is a label indicating an access destination in the network, in accordance with the DNS naming convention.

The Operation mode is identification information of a mode that indicates which one of the UE 10 and a network takes an initiative in transmitting and/or receiving data or is allowed to initiate communication control in a case where the PDN connection is the first PDN connection.

More specifically, for example, an Operation mode that allows the UE 10 to initiate the communication control may be the UE Initiated mode.

Furthermore, an Operation mode that allows the network and/or the PGW 30 and/or the PCRF 60 to initiate the communication control may be a Network Initiated mode.

The Network Policy is a communication control policy on the network side, and may include the Network allowed mode. Alternatively, the PCRF 60 may store the Network allowed mode separately from the Network Policy.

The Charging Rule is a regulation on charging. In accordance with the Charging Rule determined by the PCRF 60, the PCEF 60 performs charging.

The PCC Rule is a regulation relating to control of the Network Policy and Charging Rule. In accordance with the PCC Rule, the PCEF performs communication control and charging.

The QoS Rule is a regulation relating to QoS of the flow. The QoS Rule may be associated with the PCC Rule.

FIG. 12C illustrates the UE context for each transfer path and/or bearer. As illustrated in FIG. 12C, the UE context for each transfer path and/or bearer includes at least a Routing Rule.

The Routing Rule indicates an association of a Routing Filter, and a Routing address or Routing access type. According to such an association, whether using a communication path through the 3GPP access network or using a transfer path through the WLAN access network is determined.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the UE 10 and/or the TWAG 74 and/or the PGW 30. Alternatively, the Routing Rule may be a value that the PCRF 60 stores beforehand as a default value. In this case, the PCRF 60 may determine the default value of the Routing Rule in accordance with the PCC Rule.

A Routing Filter may include an IP header to switch an IP flow. Alternatively, the Routing Filter may include an application ID to switch the flow for each application. Alternatively, the Routing Filter may include the TFT.

The Routingu Rule may store multiple rules. Furthermore, the Routing rule may include a priority for each rule.

FIG. 12D illustrates an example of the TWAG capability stored in the TWAG 74. In the TWAG capability, identification information (NBIFOM capability) is stored for each TWAG 74, the information indicating whether the capability of establishing the first PDN connection is supported. In other words, the identification information indicates whether the TWAG 74 supports an NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. That is, the existence of the NBIFOM capability in the storage may mean that the TWAG 74 is a gateway capable of establishing the first PDN connection. In other words, the existence of the NBIFOM capability in the storage may mean that the TWAG 74 is a gateway supporting the NBIFOM function.

As illustrated in FIG. 4A, an NBIFOM capability may be stored in association with a TWAG ID, which is the identification information of the TWAG 74. In a case of not being associated with the TWAG ID, the NBIFOM capability may mean a capability of the TWAG 74 to be stored.

In a case where the TWAG ID and the NBIFOM capability are stored in association with each other, the PCRF 60 may store the TWAG capability of multiple TWAGs 74.

FIG. 12E illustrates an example of the Network capability stored in the PCRF 60. In the Network capability, the NBIFOM capability is stored for each network, i.e., for each PGW 30.

Here, the NBIFOM capability denotes identification information indicating whether the capability of establishing the first PDN connection is supported for each network. In other words, the identification information indicates whether the PGW 30 supports the NBIFOM function. More specifically, for example, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. In other words, the NBIFOM capability may be identification information indicating that a gateway supports the NBIFOM function. That is, the existence of the NBIFOM capability in the storage may mean that the PGW 30 is a gateway having the function of establishing the first PDN connection. In other words, the existence of the NBIFOM capability in the storage may mean that the PGW 30 is a gateway supporting the NBIFOM function.

FIG. 12F illustrates the MME capability. In the MME capability, identification information (NBIFOM capability) is stored for each MME 40, the information indicating whether the capability of establishing the first PDN connection is supported. In other words, the identification information indicates whether the MME 40 supports the NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. That is, the existence of the NBIFOM capability in the storage may mean that the MME 40 is a gateway having the function of establishing the first PDN connection. In other words, the existence of the NBIFOM capability in the storage may mean that the MME 40 is a gateway supporting the NBIFOM function.

The PCRF 60 may store the NBIFOM capability in association with the MME ID.

FIG. 12G illustrates the SGW capability. In the SGW capability, identification information (NBIFOM capability) is stored for each SGW 35, the information indicating whether capability of establishing the first PDN connection is supported. In other words, the identification information indicates whether the SGW 35 supports the NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. That is, the existence of the NBIFOM capability in the storage may mean that the SGW 35 is a gateway having the function of establishing the first PDN connection. In other words, the existence of the NBIFOM capability in the storage may mean that the SGW 35 is a gateway supporting the NBIFOM function.

The PCRF 60 may store the NBIFOM capability in association with the SGW ID.

2.2.6. MME Configuration

The device configuration of the MME 40 will be described. The MME 40 is constituted of an IP mobile communication network interface unit 320, a control unit 300, and a storage 340. The IP mobile communication network interface unit 320 and the storage 340 are connected to the control unit 300 via a bus.

The control unit 300 is a function part for controlling the MME 40. The control unit 300 implements various processes by reading out and executing various programs stored in the storage 340.

The IP mobile communication network interface unit 320 serves as a function unit through which the MME 40 is connected to the PGW 30.

The storage 340 serves as a function unit for storing programs, data, and the like necessary for each operation of the MME 40. The storage 340 includes, for example, a semiconductor memory, a Hard Disk Drive (HDD), or the like.

The storage 340 stores an MME capability 342, a Network capability 344, and an EPS bearer context 346. Hereinafter, information elements stored in the storage 340 will be described.

Information elements stored in the storage 340 will be described. An example of the MME capability stored in the MME 40 will be described. In the MME capability, identification information (NBIFOM capability) is stored for each MME 40, the information indicating whether the capability of establishing the first PDN connection is supported. In other words, the identification information indicates whether the MME 40 supports the NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. That is, the existence of the NBIFOM capability in the storage may mean that the MME 40 is a location management device having the function of establishing the first PDN connection. In other words, the existence of the NBIFOM capability in the storage may mean that the MME 40 is a location management device supporting the NBIFOM function.

The NBIFOM capability may be stored in association with the MME ID, which is identification information of the MME 40. In a case of not being associated with the MME ID, the NBIFOM capability may mean capability of the MME 40 to be stored.

In the case where the MME ID and the NBIFOM capability are stored in association with each other, the MME 40 may store the MME capability of multiple MMEs 40.

In this case, when the UE 10 performs a handover to another MME 40, the MME 40 may select an MME 40 to which the handover is made, based on the MME Capability.

Next, the Network capability 344 will be described. An example of the Network capability stored in the MME 40 will be described. In the Network capability, the NBIFOM capability is stored for each network, i.e., for each PGW 30.

Here, the NBIFOM capability denotes identification information indicating whether the capability of establishing the first PDN connection is supported for each network. In other words, the identification information indicates whether the PGW 30 supports the NBIFOM function. More specifically, for example, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. In other words, the NBIFOM capability may be identification information indicating a location management device supporting the NBIFOM function. That is, the existence of the NBIFOM capability in the storage may mean that the PGW 30 is a gateway having the function of establishing the first PDN connection. In other words, the existence of the NBIFOM capability in the storage may mean that the PGW 30 is a location management device supporting the NBIFOM function.

The MME 40 stores the NBIFOM capability in association with the PGW ID. Furthermore, the NBIFOM capability may be stored in association with each of multiple PGWs 30.

The PGW ID may be any information for identifying the PGW 30, and may be, for example, an Access Point Name (APN).

Next, the EPS bearer context will be described. The EPS bearer context may be classified into the EPS bearer context for each UE 10 stored for each UE 10, the EPS bearer context for each PDN connection, and the EPS bearer context for each bearer and/or transfer path.

Information elements included in the EPS bearer context for each UE 10 will be described. The MME 40 stores, for each UE 10, a UE NBIFOM capability and an NBIFOM allowed.

A UE NBIFOM capability denotes an NBIFOM capability of the UE 10. The UE NBIFOM capability denotes identification information, for each UE 10, indicating whether the capability of establishing the first PDN connection is supported. In other words, the UE NBIFOM capability denotes identification information indicating whether the UE 10 supports the NBIFOM function. More specifically, for example, the UE NBIFOM capability may include "allowed" or "Not allowed".

Note that the NBIFOM function may be information indicating the provision of the function of establishing the multi-access PDN connection based on the NBIFOM.

Alternatively, the UE NBIFOM capability may be identification information indicating that the UE 10 has the capability of establishing the first PDN connection. That is, the existence of the UE NBIFOM capability may mean that the UE 10 has a function of establishing the first PDN connection.

In other words, the UE NBIFOM capability may be identification information indicating that the UE 10 supports the NBIFOM function. That is, the existence of the UE NBIFOM capability in the storage may mean that the UE 10 supports the NBIFOM function.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection. In other words, in the present embodiment, the UE 10 is allowed to establish the multi-access PDN connection based on the NBIFOM by using the APN 1. Note that the APN 1 is also allowed to establish the known PDN connection, rather than the multi-access PDN connection.

In addition, in the present embodiment, the APN 2 is not associated with the NBIFOM allowed. That is, in the present embodiment, the APN 2 is not allowed to establish the multi-access PDN connection based on the NBIFOM. That is, in the present embodiment, the UE 10 cannot establish the multi-access PDN connection based on the NBIFOM by using the APN 2.

The NBIFOM allowed may be stored before the PDN connection is established.

The MME 40 may access the HSS 50 to acquire the NBIFOM allowed before the PDN connection is established and/or while the establishment procedure is being performed.

Furthermore, the EPS bearer context for each UE 10 may include identification information of the UE 10. The identification information of the UE 10 may be an IMSI.

The EPS bearer context for each PDN connection will be described. The EPS bearer context for each PDN connection includes a PDN connection ID, a Network allowed mode, an Operation mode, a User plane connection ID, an MME MAC address, and an NBIFOM Permission.

The PDN connection ID is identification information for identifying a PDN connection. The UE 10, the MME 40, and the PGW 30 may store the same identification information.

The Operation mode is identification information of a mode that indicates which one of the UE 10 and a network takes an initiative in transmitting and/or receiving data or is allowed to initiate communication control in a case where the PDN connection is the first PDN connection.

More specifically, for example, an Operation mode that allows the UE 10 to initiate the communication control may be a UE-Initiated mode.

Furthermore, an Operation mode that allows the network and/or the PGW 30 and/or the PCRF 60 to initiate the communication control may be a Network Initiated mode.

The Network allowed mode indicates an Operation mode allowed by the network. The Network allowed mode may include the UE-initiated mode, the Network initiated mode, or both thereof.

The User plane connection ID is identification information for identifying a connection used for transmission of user data when the UE 10 establishes a transfer path via the MME 40.

The NBIFOM permission is information indicating that this PDN connection has established the multi-access PDN connection. In other words, the NBIFOM permission indicates that the first PDN connection has been established.

That is, the MME 40 having stored the NBIFOM permission means that the PDN connection is the first PDN connection.

The NBIFOM permission is identification information that is stored in the MME 40 upon establishment of the PDN connection.

The MME 40 may access the HSS 50 to acquire the NBIFOM permission while the PDN connection is being established. Alternatively, the MME 40 may store the NBIFOM Permission, based on the multi-access PDN connection having been established.

Next, the EPS bearer context for each bearer and/or transfer path will be described. The EPS bearer context for each bearer and/or transfer path may include the transfer path identification information and the Routing Rule.

The transfer path identification information is information for identifying a transfer path and/or bearer. The transfer path identification information may be an EPS bearer ID, for example.

The Routing Rule indicates an association of a Routing Filter, and a Routing address or Routing access type. Whether using a communication path through the 3GPP access network or using a communication path through the WLAN access network is determined, based on such an association.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the MME 40. Alternatively, the Routing address may be an IP address of a Mobile Access Gateway (MAG).

The Routing Rule may be notified from the PGW 30 or the PCRF 60, or may be notified from the UE 10. Alternatively, the Routing Rule may be a value that the MME 40 stores beforehand as a default value.

A Routing Filter may include an IP header to switch an IP flow. Alternatively, the Routing Filter may include an application ID to switch the flow for each application. Alternatively, the Routing Filter may include the TFT.

The Routingu Rule may store multiple rules. Furthermore, the Routing rule may include a priority for each rule.

In the SGW capability, identification information (NBIFOM capability) is stored for each SGW 35, the information indicating whether capability of establishing the first PDN connection is supported. In other words, the identification information indicates whether the SGW 35 supports the NBIFOM function. Specifically, the NBIFOM capability may include "allowed" or "Not allowed".

Note that the NBIFOM function may be information indicating the provision of the function of establishing the multi-access PDN connection based on the NBIFOM.

Alternatively, the NBIFOM capability may be identification information indicating the capability of establishing the first PDN connection. That is, the existence of the NBIFOM capability in the storage may mean that the SGW 35 is a gateway having the function of establishing the first PDN connection. In other words, the existence of the NBIFOM capability in the storage may mean that the SGW 35 is a gateway supporting the NBIFOM function.

The MME 40 may store the NBIFOM capability in association with the SGW ID.

The MME Capability and the Network capability may be included in the EPS bearer context.

2.3. Description of Initial State

An initial state in the present embodiment will be described. The initial state in the present embodiment may be a first initial state which will be described later.

Note that the initial state in the present embodiment may not necessarily be limited to the first initial state.

2.3.1. Description of First Initial State

The first initial state will be described. In the first state, the UE 10 has not established the first PDN connection with the core network 90. However, the UE 10 has already established the second PDN connection. In greater detail, the UE 10 has not established the first PDN connection with the PGW_A 1310. However, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of a gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the second PDN connection may be configured with a transfer path between the UE 10 and the PGW 30 through the access network A. Thus, the second PDN connection may be configured with a transfer path that is a combination of a transfer path between the UE 10 and the eNB 45, a transfer path between the eNB 45 and the SGW 35, and a transfer path between the SGW 35 and the PGW_B 1320. Here, the transfer path may be a bearer.

As described above, in the first initial state, the UE 10 may be in a state of being connected to the core network 90 via the access network A.

Note that the UE 10 may not necessarily be connected to the core network 90 via the access network B. In other words, the UE 10 may not necessarily perform an attach through the WALN access network.

Alternatively, the UE 10 may be in a state of being connected to the core network 90 via the access network B. In this case, the UE 10 may perform an attach procedure initiated by the UE 10 to establish the third PDN connection.

Note that the third PDN connection may be established with a gateway selected by using the APN 2. Alternatively, the third PDN connection may be established with a gateway selected by using another APN different from either the APN 1 or the APN 2.

The first initial state has been described above; however, the first initial state is not limited the above-described state, and may be any state in which the multi-access PDN connection based on the NBIFOM has not been established through the access network B, for example.

2.3.2. Description of Procedure for Leading to First Initial State

A procedure for leading to the first initial state will be described with reference to FIG. 15. In the procedure for leading to the first initial state, at least a PDN connectivity procedure to the core network 90 through the access network A, illustrated in (A) of FIG. 15, is performed. The first initial state is a state after at least the attach procedure to the core network 90 through the access network A, illustrated in (A) of FIG. 15, is performed.

Next, details of the attach procedure to the core network 90 through the access network A will be described.

The UE 10 performs an attach procedure for establishing the second PDN connection with the core network 90 through the access network A. In greater detail, the UE 10 establishes, via the eNB 45 arranged in the access network A and the SGW 35 arranged in the core network 90, the PDN connection with the PGW_B 1320 arranged in the core network 90. Note that the MME 40 arranged in the core network 90 handles establishment and management of the PDN connection. The MME 40 also selects the SGW 35, and selects the PGW 30 using an APN.

Specifically, in the establishment of the second PDN connection, the UE 10 transmits an Attach request to the MME 40 via the eNB 45. The MME 40 receives the Attach request transmitted from the UE 10. On the basis of the reception of the Attach request, the MME 40 performs a procedure for establishing a security association with the UE 10.

Here, the UE 10 may transmit the Attach request including the APN 2. Alternatively, the UE 10 may transmit the APN 2 to the MME 40 after the security association procedure between the UE 10 and the MME 40 described below is completed.

The MME 40 transmits an Attach accept to the UE 10 via the eNB 45 upon completion of the security association procedure. The MME 40 may transmit an Activate default EPS bearer context request including the APN 2.

The UE 10 receives the Attach accept transmitted from the MME 40. The UE 10 transmits an Attach complete to the MME 40 via the eNB 45 in response to the Attach accept.

The MME 40 receives the Attach request transmitted from the UE 10.

2.3.3. Description of Multi-Access PDN Connectivity Establishment Procedure

Next, an establishment procedure of the first PDN connection will be described. Here, the initial state may be the first initial state. In the present embodiment, after the establishment of the initial state, the UE 10 performs a PDN connectivity procedure for establishing the first PDN connection with the core network 90 through the access network A. In greater detail, the UE 10 establishes, via the eNB 45 arranged in the access network A and the SGW 35 arranged in the core network 90, the first PDN connection with the PGW_A 1310 arranged in the core network 90.

Note that the first PDN connection may be configured with a transfer path that is a combination of a transfer path between the UE 10 and the eNB 45, a transfer path between the eNB 45 and the SGW 35, and a transfer path between the eNB 45 and the PGW_A 1310. Here, the transfer path may be a bearer.

As illustrated in FIG. 15, the procedure for establishing the first PDN connection may be a PDN connectivity procedure using the APN 1.

A specific example of the PDN connectivity procedure will be described below.

2.4. Examples of PDN Connectivity Procedure

Examples of the first PDN connectivity procedure for establishing the first PDN connection will be described with reference to FIG. 16.

2.4.1. Example of First PDN Connectivity Procedure

An example of the first PDN connectivity procedure will be described with reference to FIG. 16.

The UE 10 first transmits a PDN connectivity request to the MME 40 via the eNB 45 (S2102). The UE 10 may transmit the PDN connectivity request including at least the PDN connectivity request message identity (PDN connectivity request message ID), the Procedure transaction identity (procedure transaction ID), the Request type, the PDN type, the Protocol discriminator, and EPS bearer identity (EPS bearer ID). Furthermore, the UE 10 may include at least first identification information and/or fifth identification information and/or eighth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit a PCO including the first identification information and/or the fifth identification information and/or the eighth identification information and/or the TFT.

Here, the first identification information may be the UE NBIFOM capability representing that the UE 10 supports the NBIFOM. Note that the NBIFOM capability may be information indicating the provision of the function of establishing the multi-access PDN connection based on the NBIFOM.

Furthermore, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

As described above, the UE 10 may transmit the fifth identification information to request a mode of the multi-access PDN connection. In other words, the UE 10 may transmit the fifth identification information to request the establishment of the multi-access PDN connection corresponding to the mode indicated by the fifth identification information. Note that the mode indicated by the fifth identification information may be selected by the UE 10.

Note that, the UE 10 may be configured to transmit the fifth identification information in a case of requesting the establishment of the multi-access PDN connection in the UE-Initiated mode, and may be configured not to transmit the fifth identification information in a case of requesting the establishment of the multi-access PDN connection in the Network-Initiated mode.

Furthermore, the eighth identification information may be information indicating a default access (Default Assess) in the multi-access PDN connection. The eighth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the eighth identification information may include more detailed information. For example, the eighth identification information may be one of the E-UTRAN access, the UTRAN access and the GERAN access.

As described above, the UE 10 may transmit the eighth identification information to request a default access for the multi-access PDN connection. In other words, the UE 10 may transmit the eighth identification information to request the establishment of the multi-access PDN connection in which the access network indicated by the eighth identification information is used as the default access.

Note that the access network indicated by the eighth identification information may be selected by the UE 10. Furthermore, the UE 10 may select the access network indicated by the eighth identification information based on operator policy such as Inter System Routing Policy (ISRP) received from an Access Network Discovery and Selection Function (ANDSF) server. More specifically, the UE 10 may select the access network indicated by the eighth identification information based on priority information of the access network of the ISRP received from the ANDSF server. For example, since the ISRP indicates that a higher priority is given to a WLAN, the UE 10 may set information indicating the WLAN as the eighth identification information.

Note that the UE 10 may select the access network indicated by the eighth identification information based on the ISRP, only in a case where the ISRP is valid or active.

Note that, the UE 10 may be configured to transmit the eighth identification information when requesting the establishment of the multi-access PDN connection in the UE-Initiated mode, and may be configured not to transmit the eighth identification information when requesting the establishment of the multi-access PDN connection in the Network-Initiated mode.

Furthermore, the UE 10 may be configured to transmit the eighth identification information in a case where a default bearer has not been established for the multi-access PDN connection, the establishment of which is to be requested, and may be configured not to transmit the eighth identification information in a case where the default bearer has already been established for the multi-access PDN connection.

More specifically, the UE 10 may be configured to transmit the eighth identification information in a case of establishing a new multi-access PDN connection, and may be configured not to transmit the eighth identification information in a case of adding a transfer path in a state in which the default bearer is established for the multi-access PDN connection through the WLAN access network.

As described above, the UE 10 may make a request for establishing the multi-access PDN connection by transmitting the first identification information and/or the fifth identification information and/or the eighth identification information. In other words, the first identification information and/or the fifth identification information and/or the eighth identification information may be information indicating the request for establishing a multi-access PDN connection.

The PDN connectivity request message ID may be a message type representing the PDN connectivity request message.

The procedure transaction ID may be information for identifying the PDN connectivity procedure.

The APN may be an APN, to which the UE 10 requests a connection. More specifically, the APN may be the APN 1. The UE 10 may include the APN 1 to establish the multi-access PDN connection based on the NBIFOM. Here, the APN 1 may be an APN that is allowed to establish the multi-access PDN connection based on the NBIFOM and/or an APN that is allowed to perform communication based on the NBIFOM.

The request type may be information for identifying the type of PDN connectivity procedure to be requested. For example, since the UE 10 performs an initial connection by using the APN 1, the request type may be the type indicating an attach, rather than the type indicating a handover.

The PDN type may indicate an available IP version. For example, the PDN type may be IPv4, IPv6, or IPv4v6.

The protocol discriminator may be an identifier representing a protocol type currently used for transmission and/or reception of the PDN connectivity request.

The EPS bearer ID may be information identifying the EPS bearer. The EPS bearer ID may be assigned by the MME 40.

The PCO may be protocol information associated with the PDN connection. Furthermore, the PCO may include identification information of the request. Note that the UE 10 may transmit the PCO including the first identification information and/or the fifth identification information and/or the eighth identification information.

The TFT may be information for identifying an IP flow for performing communication by using the PDN connection established in the current PDN connectivity procedure. Note that the IP flow to be identified may vary for each application. Thus, the TFT identifies user data of a certain application.

More specifically, the TFT may include a 5-tuple, or may include identification information such as the application ID. Note that the 5-tuple may include a combination of information of one or more of a transmission-source IP address, a transmission-destination IP address, a transmission-source port number, a transmission-destination port number, and a protocol number.

Note that in the present example, when transmitting the PDN connectivity request, the UE 10 does not request a certain NBIFOM operation mode, and thus, the UE 10 may transmit the PDN connectivity request without including the TFT. In other words, when the UE 10 requests the establishment of the multi-access PDN connection based on the NBIFOM without requesting a certain NBIFOM operation mode, the UE 10 may transmit the PDN connectivity request without including the TFT. More specifically, in a case where the UE 10 includes the first identification information and/or the fifth identification information and/or the eighth identification information, the UE 10 may transmit the PDN connectivity request without including the TFT.

Note that conventionally, the UE 10 is capable of transmit the PCO including information indicating an IFOM support. Here, the IFOM support is identification information representing that the IP Flow Mobility (IFOM) is supported. Furthermore, the IFOM is a technique for switching a communication path of a certain IP flow by using between the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, in a case where the UE 10 includes the first identification information and/or the fifth identification information and/or the eighth identification information in the PCO, the UE 10 does not include the IFOM support. In contrast, in a case where the UE 10 includes the IFOM support in the PCO, the UE 10 does not include the first identification information and/or the fifth identification information and/or the eighth identification information. As described above, it may be possible to not configure both the first identification information and/or the fifth identification information and/or the eighth identification information and the IFOM support to be effective to ensure a clear distinction between the use of the switching of the communication path based on the NBIFOM and the use of the switching of the communication path based on the IFOM.

Thus, the UE 10 is capable of establishing either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

The MME 40 receives the PDN connectivity request transmitted from the UE 10. On the basis of the reception of the PDN connectivity request and/or in accordance with the first identification information and/or the fifth identification information and/or the eighth identification information included in the PDN connectivity request, the MME 40 transmits a Create Session Request to the SGW 35 (S2104).

On the basis of the reception of the PDN connectivity request and/or in accordance with the first identification information and/or the fifth identification information and/or the eighth identification information included in the PDN connectivity request, the MME 40 may transmit the Create Session Request including at least the first identification information and/or the fifth identification information and/or the eighth identification information.

Furthermore, the MME 40 may include the TFT in the Create Session Request, based on the reception of the TFT transmitted from the UE 10.

Furthermore, the TFT may be information for identifying an IP flow that performs communication by using the PDN connection established in the current PDN connectivity procedure. Note that the IP flow to be identified may vary for each application. Thus, the TFT identifies user data of a certain application.

More specifically, the TFT may include a 5-tuple, or may include identification information such as the application ID. Note that the 5-tuple may include a combination of information of one or more of a transmission-source IP address, a transmission-destination IP address, a transmission-source port number, a transmission-destination port number, and a protocol number.

Note that in a case where none of the first identification information and fifth identification information and/or the eighth identification information is included in the PDN connectivity request, the MME 40 may transmit the Create Session Request without including the first identification information and/or the fifth identification information and/or the eighth identification information. Moreover, in a case where the first identification information and/or the fifth identification information and/or the eighth identification information is not included in the PDN connectivity request, the MME 40 may perform a procedure for establishing the single-access PDN connection.

Note that, the MME 40 may be configured to transmit the eighth identification information when requesting the establishment of the multi-access PDN connection in the UE-Initiated mode, and may be configured not to transmit the eighth identification information when requesting the establishment of the multi-access PDN connection in the Network-Initiated mode.

The SGW 35 receives the Create Session Request transmitted from the MME 40. On the basis of the reception of the PDN connectivity request and/or in accordance with the first identification information and/or the fifth identification information and/or the eighth identification information included in the PDN connectivity request, the SGW 35 transmits the Create Session Request to the PGW 30 (S2106).

On the basis of the reception of the session connectivity request and/or in accordance with the first identification information and/or the fifth identification information and/or the eighth identification information included in the session connectivity request, the SGW 35 may transmit the Create Session Request including at least the first identification information and/or the fifth identification information and/or the eighth identification information.

Furthermore, the SGW 35 may include the TFT in the Create Session Request.

Furthermore, the TFT may be information for identifying an IP flow that performs communication by using the PDN connection established in the current PDN connectivity procedure. Note that the IP flow to be identified may vary for each application. Thus, the TFT identifies user data of a certain application.

More specifically, the TFT may include a 5-tuple, or may include identification information such as the application ID. Note that the 5-tuple may include a combination of information of one or more of a transmission-source IP address, a transmission-destination IP address, a transmission-source port number, a transmission-destination port number, and a protocol number.

Note that in a case where none of the first identification information and the fifth identification information and/or the eighth identification information is included in the PDN connectivity request, the SGW 35 may transmit the Create Session Request without including the first identification information and/or the fifth identification information and/or the eighth identification information. Moreover, in a case where the first identification information and/or the fifth identification information and/or the eighth identification information is not included in the PDN connectivity request, the MME 40 may perform a procedure for establishing the single-access PDN connection.

The PGW 30 receives the Create Session Request transmitted from the SGW 35. On the basis of the reception of the Create Session Request, and/or in accordance with the first identification information and/or the fifth identification information and/or the eighth identification information included in the Create Session Request, the PGW 30 may perform an IP-CAN session update procedure with the PCRF 60 (S2108).

On the basis of the reception of the Create Session Request and/or in accordance with the first identification information and/or the fifth identification information and/or the eighth identification information included in the Create Session Request, the PGW 30 may perform the IP-CAN session update procedure including at least the first identification information and/or the fifth identification information and/or the eighth identification information.

Note that the PGW 30 may perform the IP-CAN session update procedure to notify the PCRF 60 of information of the UE 10 and/or the eNB 45 and/or the MME 40 and/or the SGW 35.

The PGW 30 may transmit, to the PCRF 60, a control message in the IP-CAN session procedure, including information indicating whether the PDN connection to be established is the multi-access PDN connection or the single-access PDN connection, and/or the first identification information and/or the fifth identification information and/or the eighth identification information.

More specifically, when the multi-access PDN connection based on the NBIFOM is to be established, the PGW 30 transmits, to the PCRF 60, the information indicating the access network A, the PDN connection ID, the information indicating that the PDN connection is the multi-access PDN connection, and the first identification information and/or the fifth identification information and/or the eighth identification information. Alternatively, when the single-access PDN connection is to be established, the PGW 30 transmits, to the PCRF 60, the information indicating the access network A, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Furthermore, on the basis of the reception of the first identification information and/or the fifth identification information and/or the eighth identification information, the PCRF 60 may transmit, to the PGW 30, a control message in the IP-CAN session update procedure with the PGW 30, the control message including at least the second identification information and/or the seventh identification information and/or the ninth identification information. The detailed description of the second identification information and/or the seventh identification information and/or the ninth identification information will be described later.

Note that the PCRF 60 may perform the IP-CAN session update procedure to notify the PGW 30 of the charging information and/or the QoS control information and/or the routing information.

On the basis of the reception of the Create Session Request or completion of the IP-CAN session update procedure, and/or in accordance with the first identification information and/or the fifth identification information and/or the eighth identification information included in the Create Session Request, and/or in accordance with the second identification information and/or the seventh identification information and/or the ninth identification information included in the IP-CAN session update procedure, the PGW 30 transmits a Create Session Response to the SGW 35 (S2110).

On the basis of the reception of the Create Session Request or completion of the IP-CAN session update procedure, and/or in accordance with the first identification information and/or the fifth identification information and/or the eighth identification information included in the Create Session Request, and/or in accordance with the second identification information and/or the seventh identification information and/or the ninth identification information included in the IP-CAN session update procedure, the PGW 30 transmits the Create Session Response including at least the second identification information and/or the seventh identification information and/or the ninth identification information.

Furthermore, the PGW 30 may include the PDN Address and/or the PDN connection ID and/or the TFT and/or the bearer identification information identifying the default bearer in the Create Session Response.

The bearer identification information identifying the default bearer may be a bearer for the multi-access PDN connection, and may be identification information of a bearer established through E-UTRAN.

Note that a method by which the PGW 30 acquires the second identification information and/or the seventh identification information and/or the ninth identification information is not limited to the above-described method for acquiring the seventh identification information from the PCRF 60 in the IP-CAN session update procedure, and another example may be employed. For example, the PGW 30 may create the second identification information and/or the seventh identification information and/or the ninth identification information and transmit the Create Session Response including the second identification information and/or the seventh identification information and/or the ninth identification information, without acquiring from the PCRF 60 in the IP-CAN session update procedure.

Here, the second identification information may be the NBIFOM capability representing that the network supports the NBIFOM. Note that the NBIFOM capability may be information indicating the provision of the function of establishing the multi-access PDN connection.

Here, the seventh identification information may be the Allowed Mode representing the NBIFOM operation mode that is allowed for the multi-access PDN connection based on the NBIFOM to be established. In other words, the seventh identification information may be the operation mode allowed by the operator.

As described above, the UE 10 may transmit the seventh identification information to make a notification of the mode of the multi-access PDN connection. In other words, the UE 10 may transmit the seventh identification information to permit the establishment of the multi-access PDN connection corresponding to the mode indicated by the seventh identification information. Note that the mode indicated by the seventh identification information may be selected by the PCRF 60 or the PGE 30. Note that the PCRF 60 or the PGE 30 may transmit the mode indicated by the fifth identification information as the seventh identification information, in a case where the PCRF 60 or the PGE 30 allows the establishment of the multi-access PDN connection in the mode indicated by the fifth identification information requested by the UE 10.

Note that the PCRF 60 or the PGW 30 may determine the Allowed Mode and the seventh identification information based on the operator policy. For example, a policy that allows the establishment of only the PDN connection of the UE-Initiated mode, a policy that allows the establishment of only the PDN connection of the Network-Initiated mode, a policy that allows the establishment of both modes, a policy that prohibits the establishment of both modes, and the like may be managed.

Note that the PCRF 60 or the PGW 30 may acquire the operator policy from the HSS 50 or the like. Alternatively, an operator policy created by an administrator may be stored.

In addition, for the operator policy, a policy different for each subscriber may be managed. Alternatively, a policy different for each APN may be managed. For example, for each APN, a different Allowed Mode for the PDN connection to be established may be managed.

The PCRF 60 or the PGW 30 may include the allowed operation mode in the seventh identification information, based on the Allowed Mode.

In other words, in a case where only the Network-Initiated mode is allowed, the PCRF 60 or the PGW 30 may include the Network-Initiated mode in the seventh identification information. Alternatively, in a case where only the UE-Initiated mode is allowed, the PCRF 60 or the PGW 30 may include the UE-Initiated mode in the seventh identification information.

Note that in a case where the UE-Initiated mode and the Network-Initiated mode are allowed, the seventh identification information may include both the operation modes. Alternatively, in a case where both the UE-Initiated mode and the Network-Initiated mode are allowed and a default operation mode is configured, the seventh identification information may include only the default operation mode. Note that which one of the UE-Initiated mode and the Network-Initiated mode is defined as the default operation mode may be configured based on the operator policy.

Note that, in a case where none of the operation modes is allowed for establishment of the PDN connection, the PCRF 60 may transmit, to the PGW 30, the cause information indicating that the Requested Operation Mode is not allowed.

In a case where none of the operation modes is allowed for establishment of the PDN connection, the PGW 30 may not necessarily notify the MME 40 of the seventh identification information via the SGW 35.

In a case where none of the operation modes is allowed for establishment of the PDN connection, the PGW 30 may transmit, to the MME 40 via the SGW 35, the Create Session Response including the cause information indicating that the Requested Operation Mode is not allowed.

In a case where none of the operation modes is allowed for establishment of the PDN connection, the PGW 30 may notify the MME 40 that there is no allowed operation via the SGW 35.

As described above, based on the Allowed Mode, the PCRF 60 or the PGW 30 may regard an operation mode that is allowed for establishment of the PDN connection as the seventh identification information.

Note that in a case where the Network-Initiated mode is not included in the seventh identification information, the PCRF 60 may not necessarily transmit the TFT to the PGW 30.

In other words, only in the case where the Network-Initiated mode is included in the seventh identification information, the PCRF 60 may transmit the TFT to the PGW 30.

Note that in the case where the Network-Initiated mode is not included in the seventh identification information, the PGW 30 may not necessarily transmit the TFT to the MIME 40 via the SGW 35. Thus, in this case, the PGW 30 may not necessarily include the TFT in the Create Session Response.

In other words, only in the case where the Network-Initiated mode is included in the seventh identification information, the PGW 30 may transmit the TFT to the MME 40 via the SGW 35. Thus, in this case, the PGW 30 may include the TFT in the Create Session Response.

The PDN address may be an IP address assigned to the UE 10. For example, the PDN address may be an IPv4 address, or an IPv6 prefix and an interface ID for constituting an IPv6 address. Here, the PGW 30 may assign the IP address of the UE 10. Moreover, the PGW 30 may include the IP address that has been assigned to the UE 10, in the PDN address.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

Furthermore, the ninth identification information may be information indicating a default access (Default Assess) in the multi-access PDN connection. Note that the ninth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the ninth identification information may include more detailed information. For example, the ninth identification information may be one of E-UTRAN access, UTRAN access and GERAN access.

As described above, the PCRF 60 or the PGE 30 may transmit the ninth identification information to notify the UE 10 of the default access for the multi-access PDN connection. In other words, the PCRF 60 or the PGE 30 may transmit the ninth identification information to request the establishment of the multi-access PDN connection in which the access network indicated by the ninth identification information is used as the default access. Note that the access network indicated by the ninth identification information may be selected by the PCRF 60 or the PGE 30. Note that the PCRF 60 or the PGE 30 may transmit the access network indicated by the eighth identification information as the ninth identification information, in a case where the PCRF 60 or the PGE 30 allows the establishment of the multi-access PDN connection for the default access indicated by the eighth identification information requested by the UE 10.

As described above, the establishment of the multi-access PDN connection is permitted by transmitting the second identification information and/or the seventh identification information and/or the ninth identification information. In other words, the second identification information and/or the seventh identification information and/or the ninth identification information may be information indicating that the multi-access PDN connection is to be established or establishment of the multi-access PDN connection is permitted.

Note that, the PCRF 60 and the PGW 30 may be configured to transmit the ninth identification information in a case where a default bearer has not been established for the multi-access PDN connection, the establishment of which is to be requested, and may be configured not to transmit the ninth identification information in a case where the default bearer has already been established for the multi-access PDN connection.

More specifically, the PCRF 60 and the PGW 30 may be configured to transmit the ninth identification information when establishing a new multi-access PDN connection, and may be configured not to transmit the ninth identification information when adding a transfer path in a state in which the default bearer is established for the multi-access PDN connection through the WLAN access network.

The SGW 35 receives the Create Session Response transmitted from the PGW 30. On the basis of the reception of the Create Session Response and/or in accordance with the second identification information and/or the seventh identification information and/or the ninth identification information included in the Create Session Response, the SGW 35 transmits the Create Session Response to the MME 40 (S2112).

On the basis of the reception of the Create Session Response and/or in accordance with the second identification information and/or the seventh identification information and/or the ninth identification information included in the Create Session Response, the SGW 35 may transmit the Create Session Response including at least the second identification information and/or the seventh identification information and/or the ninth identification information.

Furthermore, the SGW 35 may include the PDN Address and/or the PDN connection ID and/or the TFT in the Request Session Response.

The MME 40 receives the Create Session Response transmitted from the SGW 35. On the basis of the reception of the Create Session Response and/or in accordance with the second identification information and/or the seventh identification information and/or the ninth identification information included in the Create Session Response, the MME 40 transmit the Activate default EPS bearer context request to the eNB 45 (S2114).

On the basis of the reception of the Create Session Response and/or in accordance with the second identification information and/or the seventh identification information and/or the ninth identification information included in the Create Session Response, the MME 40 may transmit at least an Activate default EPS bearer context request message identity (Activate default EPS bearer context request message ID), a Procedure transaction ID, an APN, a PDN address, a protocol discriminator, an EPS bearer ID, and EPS QoS included in the Activate default EPS bearer context request. On the basis of the reception of the Create Session Response and/or in accordance with the second identification information and/or the seventh identification information and/or the ninth identification information included in the Create Session Response, the MME 40 may further include at least the second identification information and/or the seventh identification information and/or the ninth identification information in the Activate default EPS bearer context request. Moreover, the MME 40 may include the PCO and/or the ESM Cause and/or the TFT and/or the bearer identification information identifying the default bearer, and/or the PDN connection ID and/or the PDN connection attribute information, in the Activate default EPS bearer context request. Note that the MME 40 may transmit the PCO including the second identification information and/or the seventh identification information and/or the ninth identification information and/or the TFT and/or the bearer identification information identifying the default bearer and/or the PDN connection ID. Note that the Activate default EPS bearer context request message may be a Packet Data Network (PDN) connectivity accept message.

Here, the Activate default EPS bearer context request message ID may be a message type representing the Activate default EPS bearer context request message.

The APN may be an APN, to which the UE 10 is allowed to connect. More specifically, the APN may be the APN 1. The APN 1 may be an APN that is allowed to establish the multi-access PDN connection based on the NBIFOM. The MME 40 may include the APN 1 in the Activate default EPS bearer context request.

The PDN address may be an IP address assigned to the UE 10. For example, the PDN address may be an IPv4 address, or an interface ID for constituting an IPv6 address.

The EPS QoS may indicate a state representing QoS of an EPS bearer.

The bearer identification information identifying the default bearer and/or the PDN connection ID may be a bearer for the multi-access PDN connection, and may be identification information of a bearer established through the E-UTRAN.

The PDN connection attribute information may be information indicating that the PDN connection established in the current PDN connectivity procedure is the multi-access PDN connection, and/or information indicating that user data transmitted and/or received by using the PDN connection established in the current PDN connectivity procedure is allowed to be transmitted and/or received through the access network A and the access network B, and/or information indicating that the PDN connection established in the current PDN connectivity procedure is the multi-access PDN connection of the operation mode indicated by the seventh identification information.

Note that the UE 10 may transmit the Activate default EPS bearer context request message that further includes the connectivity type indicating the type of PDN connection and/or the WLAN offload permission information (WLAN offload acceptability) indicating whether the WLAN offload is allowed or denied. Furthermore, the MME 40 may transmit the connectivity type or the WLAN offload permission information including the PDN connection attribute information.

ESM Cause may be information representing that the PDN type of the PDN address assigned to the UE 10 is different from the PDN type requested by the UE 10 in the PDN connectivity request.

Note that the MME 40 and/or the PGW 30 may include the second identification information and/or the seventh identification information and/or the ninth identification information in the PCO. However, in a case where the MME 40 and/or the PGW 30 includes the second identification information and/or the seventh identification information and/or the ninth identification information in the PCO, the MME 40 and/or the PGW 30 does not include the IFOM support. In contrast, in a case where the MME 40 and/or the PGW 30 includes the IFOM support in the PCO, the MME 40 and/or the PGW 30 does not include the second identification information and/or the seventh identification information and/or the ninth identification information. As described above, it may be possible to not configure both the second identification information and/or the seventh identification information and/or the ninth identification information and the IFOM support to be effective to ensure a clear distinction between the use of the switching of the communication path based on the NBIFOM and the use of the switching of the communication path based on the IFOM.

The eNB 45 receives the Activate default EPS bearer context request transmitted from the MME 40. On the basis of the reception of the Activate default EPS bearer context request, the eNB 45 transfers the Activate default EPS bearer context request to the UE 10.

The eNB 45 may transmit at least an RRC connection configuration request (RRC Connection Reconfiguration) to the UE 10 with an Activate default EPS bearer context request (S2116).

Note that the Activate default EPS bearer context request may be a response message to a PDN connectivity request.

The UE 10 receives the RRC connection configuration request transmitted from the eNB 45. Furthermore, the UE 10 receives the Activate default EPS bearer context request transmitted from the MME 40 and transferred by the eNB 45.

On the basis of the reception of the RRC connection configuration request, the UE 10 transmits an RRC connection configuration complete (RRC Connection Reconfiguration Complete) to the eNB 45 (S2118).

The eNB 45 receives the RRC connection configuration complete transmitted from the UE 10. The eNB 45 transmits bearer configuration to the MME 40 in response to the RRC connection configuration complete.

The MME 40 receives the bearer configuration transmitted from the eNB 45 (S2120).

On the basis of the reception of the Activate default EPS bearer context request and/or in accordance with the second identification information and/or the seventh identification information and/or the ninth identification information included in the Activate default EPS bearer context request, the UE 10 transmits an Activate default EPS bearer context accept to the MME 40 (S2122) (S2124).

The UE 10 may transmit at least an Activate default EPS bearer context accept message identity (Activate default EPS bearer context accept message ID), a procedure transaction ID, a protocol discriminator, and an EPS bearer ID included in the Activate default EPS bearer context accept.

Furthermore, the UE 10 may include the PCO in the Activate default EPS bearer context accept.

Furthermore, in a case where multiple INFOM operation modes are included in the seventh identification information, the UE 10 may include at least the fifth identification information in the Activate default EPS bearer context accept. In other words, in a case where multiple INFOM operation modes are allowed, the UE 10 may select one of the allowed modes and transmit the fifth identification information including the selected mode.

Specifically, in a case where the UE-Initiated mode and the Network-Initiated mode are included in the seventh identification information included in the Activate default EPS bearer context request, the UE 10 may include the UE-Initiated mode or the Network-Initiated mode in the fifth identification information.

Which one of the UE-Initiated mode and the Network-Initiated mode is to be included in the fifth identification information may be determined based on the UE policy.

Note that the UE policy may be any information configured for the UE 10. For example, the UE policy may be information configured by a user.

Here, the Activate default EPS bearer context accept message ID may be a message type representing the Activate default EPS bearer context accept message.

After the first PDN connectivity procedure is completed, the UE 10 and the PGW 30 establish the first PDN connection of the operation mode determined based on the operator policy. Alternatively, the UE 10 establishes the first PDN connection of an operation mode selected from the operation modes allowed based on the operator policy. Note that on the basis of the reception of the Activate default EPS bearer context request and/or in accordance with the PDN connection attribute information and/or the seventh identification information and/or the operation mode selected based on the seventh identification information, the UE 10 may identify the NBIFOM operation mode for the established PDN connection. On the basis of the establishment of the first PDN connection, the UE 10 and the PGW 30 determine a PDN connection and/or a transfer path, such as an EPS bearer, for transmitting and/or receiving the IP flow by using the TFT, and transmit and/or receive user data corresponding to the IP flow identified by the TFT. More specifically, the UE 10 and the PGW 30 transmit and/or receive a flow identified by the TFT by using the first PDN connection.

Furthermore, in the establishment of the first PDN connection, the UE 10 and the PGW 30 establish a default bearer. The UE 10 and the PGW 30 store the identification information of the default bearer established in the PDN connectivity procedure and the information identifying the LTE access network in association with each other, in response to completion of the PDN connectivity procedure through the LTE access network.

Note that the UE 10 performs data transmission and/or reception using the default bearer when the UE 10 does not receive the TFT or transmits and/or receives the user data not matching the held TFT. In addition, the PGW 30 performs data transmission and/or reception using the default bearer when the PGW 30 does not receive the TFT or transmits and/or receives the user data not matching the held TFT.

In this way, the UE 10 and the PGW 30 establish a multi-access PDN connection in the PDN connectivity procedure, and establish a default bearer for the multi-access PDN connection. Furthermore, the UE 10 and the PGW 30 are capable of storing a default access for selecting a default bearer in association with the multi-access PDN connection, in a case where multiple default bearers are established.

Note that in the example of the first PDN connectivity procedure, a case in which the transmission and/or reception of the TFT is included in the PDN connectivity procedure has been described. However, the first PDN connectivity procedure is not limited to this case. The TFT may be transmitted and/or received after the multi-access PDN connection based on the NBIFOM is established.

Therefore, the UE 10 and the MME 40 may transmit and/or receive the TFT without including the TFT in the PDN connectivity request and/or the Activate default EPS bearer context request, and establish the multi-access PDN connection based on the NBIFOM. In other words, at a point in time when the PDN connection is established, there may be no IP flow transmitting and/or receiving user data by using the PDN connection. In this case, the UE 10 and the MME 40 transmit the TFT after the multi-access PDN connection is established.

More specifically, in a case where the PDN connection of the UE-Initiated mode is established, the UE 10 may transmit the TFT to the MME 40 via the eNB 45. In addition, the MME 40 receives the TFT from the UE 10 and transmits the TFT to the PGW 30 via the SGW 35. Thus, the UE 10 and the PGW 30 are capable of determining a PDN connection and/or a transfer path such as an EPS bearer for transmitting and/or receiving the IP flow by using the TFT, and are capable of transmitting and/or receiving user data corresponding to the IP flow identified by the TFT.

Note that the UE 10 and the PGW 30 perform data transmission and/or reception using the default bearer when the UE 10 and the PGW 30 transmit and/or receive the user data not matching the held TFT.

In contrast, in a case where the PDN connection of the Network-Initiated mode is established, the PGW 30 may transmit the TFT to the MME 40 via the SGW 35. Here, the PGW 30 may receive, from the PCRF 60, the TFT determined based on the operator policy. In addition, the MME 40 receives the TFT from the PGW 30 via the SGW 35, and transmits the TFT to the UE 10 via the eNB 45. Thus, the UE 10 and the PGW 30 are capable of determining a PDN connection and/or a transfer path such as an EPS bearer for transmitting and/or receiving the IP flow by using the TFT, and are capable of transmitting and/or receiving user data corresponding to the IP flow identified by the TFT.

Note that the UE 10 and the PGW 30 perform data transmission and/or reception using the default bearer when the UE 10 and the PGW 30 transmit and/or receive the user data not matching the held TFT.

Furthermore, in the example of the first PDN connectivity procedure, a case has been described in which the UE 10 and the PGW 30 establish the first PDN connection, of an operation mode selected by the UE 10, from the operation modes determined based on the operator policy or the operation modes allowed based on the operator policy. However, the first PDN connectivity procedure is not limited to this case. The UE 10 may reject the establishment of the first PDN connection.

For example, in a case where the UE 10 does not support the operation mode allowed based on the operator policy and/or in a case where the operation mode allowed based on the operator policy does not comply with the policy of the UE 10, the UE 10 may reject the establishment of the first PDN connection.

More specifically, on the basis of the reception of the Activate default EPS bearer context request and/or in accordance with the seventh identification information included in the Activate default EPS bearer context request and/or PDN connection attribute information and/or policy of the UE 10, the UE 10 may transmit an Activate default EPS bearer context reject to the MME 40 via the eNB 45.

The UE 10 may transmit at least an Activate default EPS bearer context reject message identity (Activate default EPS bearer context reject message ID), a Procedure transaction ID, a protocol discriminator, an EPS bearer ID, and an ESM Cause included in the Activate default EPS bearer context reject. Furthermore, the UE 10 may further include fourth identification information in the Activate default EPS bearer context reject. Furthermore, the UE 10 may further include the PCO in the Activate default EPS bearer context reject. Note that the UE 10 may transmit the PCO including the fourth identification information.

The fourth identification information may be information representing that the UE 10 does not support the operation mode allowed based on the operator policy and/or information representing that the operation mode allowed based on the operator policy does not comply with the policy of the UE 10.

The Activate default EPS bearer context reject message ID may be a message type representing the Activate default EPS bearer context reject message.

The ESM Cause may be information representing a reason why the Activate default EPS bearer context request is rejected. Here, the UE 10 may notify the UE 10 of the fourth identification information included in the ESM Cause.

The MME 40 may receive the Activate default EPS bearer context reject transmitted from the UE 10. On the basis of the reception of the Activate default EPS bearer context reject and/or in accordance with the fourth identification information included in the Activate default EPS bearer context reject, the MME 40 may delete the EPS bearer context, held by the MME 40, relating to the established PDN connection. Furthermore, the MME 40 may transmit the fourth identification information included in the Activate default EPS bearer context reject to the SGW 35.

The SGW 35 may receive the fourth identification information transmitted from the MME 40. On the basis of the reception of the fourth identification information and/or in accordance with the operator policy, the SGW 35 may delete the EPS bearer context, held by the SGW 35, relating to the established PDN connection. Furthermore, the SGW 35 may transmit, to the PGW 30, the fourth identification information received from the MME 40.

The PGW 30 may receive the fourth identification information transmitted from the SGW 35. On the basis of the reception of the fourth identification information and/or in accordance with the operator policy, the PGW 30 may delete the EPS bearer context, held by the PGW 30, relating to the established PDN connection.

Furthermore, the PGW 30 may perform the IP-CAN session update procedure with the PCRF 60, on the basis of the reception of the fourth identification information. The PGW 30 may include the fourth identification information in the IP-CAN session update procedure.

The PCRF 60 may change the operator policy based on the IP-CAN session update procedure. Note that based on the change of the operator policy, the PGW 30 may delete the EPS bearer context, held by the PGW 30, relating to the established PDN connection.

Note that in a case where the multi-PDN connection is established, a procedure for adding a new transfer path can be performed. In contrast, when a single access PDN connection is established, it is possible to change a transfer path, but the procedure for adding a transfer path cannot be performed.

2.4.2. Description of State After PDN Connectivity Establishment Procedure

Performing the above-described first PDN connectivity procedure leads to a first state and a second state, both of which will be described later.

Note that an initial state in the additional attach procedure may be the second state. The initial state in the additional attach procedure may not be limited to the second state.

2.4.3. Description of First State

The first state will be described with reference to FIG. 13. In the first state, the UE 10 has established the first PDN connection with the core network 90. However, the UE 10 has not yet established the second PDN connection. In greater detail, the UE 10 has established the first PDN connection with the PGW_A 1310. However, the UE 10 has not established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of a gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be configured with a transfer path between the UE 10 and the PGW 30 through the access network A. Thus, the first PDN connection may be configured with a transfer path that is a combination of a transfer path between the UE 10 and the eNB 45, a transfer path between the eNB 45 and the SGW 35, and a transfer path between the SGW 35 and the PGW_A 1310. Here, the transfer path may be a bearer.

As described above, in the first state, the UE 10 may be in a state in which the multi-access PDN connection based on the NBIFOM is established via the access network A. In addition, in the first state, the UE 10 may be in a state of not being connected to the core network 90 via the access network B.

Note that the UE 10 may not necessarily establish the single-access PDN connection via the access network A.

Alternatively, the UE 10 may be in a state in which the single-access PDN connection is established via the access network A. In this case, the UE 10 performs, in the LTE access network, the attach procedure or the PDN connectivity procedure in the single-access PDN connection initiated by the UE 10 to establish the third PDN connection.

Note that the third PDN connection may be established with a gateway selected by using the APN 2. Alternatively, the third PDN connection may be established with a gateway selected by using another APN different from either the APN 1 or the APN 2.

The first state has been described above; however, the first state is not limited to the above-described state, and may be any state in which, for example, the multi-access PDN connection based on the NBIFOM has been established through the access network A and the PDN connection has not been established through the access network B.

2.4.4. Description of Second State

The second state will be described with reference to FIG. 14. In the second state, the UE 10 has established the first PDN connection with the core network 90. Furthermore, the UE 10 has established the second PDN connection with the core network 90. In greater detail, the UE 10 has established the first PDN connection with the PGW_A 1310. Furthermore, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of a gateway using the APN 1 and/or the APN 2 may be performed by the TWAG 74 included and arranged in the access network B and/or the MME 40 included and arranged in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be configured with a transfer path between the UE 10 and the PGW 30 through the access network A. Thus, the first PDN connection may be configured with a transfer path that is a combination of a transfer path between the UE 10 and the eNB 45, a transfer path between the eNB 45 and the SGW 35, and a transfer path between the SGW 35 and the PGW_A 1310. Here, the transfer path may be a bearer.

In addition, the second PDN connection may be configured with a transfer path between the UE 10 and the PGW 30 through the access network B. Thus, the second PDN connection may be configured with a transfer path between the UE 10 and the TWAG 74 and a transfer path between the TWAG 74 and the PGW_B 1320. Here, the transfer path may be a bearer.

As described above, in the first state, the UE 10 may be in a state in which the multi-access PDN connection based on the NBIFOM is established via the access network A. Furthermore, the UE 10 may be in a state in which the single-access PDN connection is established via the access network B.

Note that the UE 10 may not necessarily establish the single-access PDN connection via the access network A.

Alternatively, the UE 10 may be in a state in which the single-access PDN connection is established via the access network A. In this case, the UE 10 performs, in the LTE access network, the attach procedure or the PDN connectivity procedure in the single-access PDN connection initiated by the UE 10 to establish the third PDN connection.

Note that the third PDN connection may be established with a gateway selected by using the APN 2. Alternatively, the third PDN connection may be established with a gateway selected by using another APN different from either the APN 1 or the APN 2.

The second state has been described above; however, the second state is not limited to the above-described state, and may be any state in which, for example, the multi-access PDN connection based on the NBIFOM has been established through the access network B and the single-access PDN connection has been established through the access network A.

2.5. Additional Attach Procedure

An additional attach procedure will be described below.

The additional attach procedure is a procedure for adding a transfer path configured in the multi-PDN connection, based on the function of the multi-PDN connection capable of constituting multiple transfer paths.

Specifically, the procedure aims to add a transfer path through the access network B to the multi-access PDN connection only including a transfer path or transfer paths through the access network A.

For example, the Operation mode of the first PDN connection being the Network-Initiated mode denotes, in other words, flow switching and/or update of the Routing Rule of the PDN connection initiated by the UE 10 being not possible. In contrast, the PDN connectivity procedure and/or the attach procedure is initiated by the UE 10.

Note that the Routing Rule may be information for selecting a transfer path or bearer through which user data is transmitted and/or received based on the TFT held by the UE 10. More specifically, the Routing Rule may be information in which the TFT and the transfer path or bearer are associated with each other.

As described above, the second state is a state in which the UE 10 establishes the first PDN connection only through the access network A. That is, the transfer path through the access network B is not included in the first PDN connection. Note that the transfer path may be a bearer and/or a communication path.

Therefore, when the first PDN connection in the second state is in the Network-Initiated mode, the network and/or the PCRF 60 cannot include the transfer path through the access network B in the first PDN connection.

Therefore, in accordance with the state transition to the second state and the Operation mode being the Network-Initiated mode, the UE 10 may perform a procedure for establishing the transfer path through the access network B.

Moreover, also in a case where the Operation mode of the first PDN connection in the second state is the UE-Initiated mode, the UE 10 may perform a procedure for establishing the transfer path through the access network B. based on the Routing Rule stored in the UE 10.

Specifically, the UE 10 may perform the procedure for adding a transfer path through the access network B to the first PDN connection in a case where the Routing Rule of the first PDN connection indicates a priority to a WLAN access.

More specifically, the UE 10 may perform the procedure for adding a transfer path through the access network B in a case where the UE 10 stores the Routing Rule in which a specific flow and a WLAN access are associated with each other for the first PDN connection.

In other words, the UE 10 does not perform the procedure for adding a transfer path through the access network B to the first PDN connection in a case where the Routing Rule of the first PDN connection does not indicate a priority to a WLAN access.

More specifically, the UE 10 does not perform the procedure for adding a transfer path through the access network B in a case where the UE 10 does not store the Routing Rule in which a specific flow and a WLAN access are associated with each other for the first PDN connection.

Hereinafter, details of the procedure will be described.

2.5.1. Example of Second Additional Attach Procedure

Next, an example of a second additional attach procedure will be described with reference to FIG. 17. As illustrated in FIG. 17, the initial state of the present example of procedure is first state (S2302). Note that the procedure for changing the state to the first state may be similar to the procedure described above, and a detailed description will be omitted.

In the first state, the UE 10 may be in any state where the first PDN connection is established with the PGW 30 and/or the network through the access network A. Specifically, the first initial state is a state in which the UE 10 establishes the first PDN connection through the eNB 45 and the SGW 35 with the PGW_A selected using the APN 1. Note that the first PDN connection may be the multi-access PDN connection.

The UE 10 performs the attach procedure through the access network B upon transition to the first state and establishment of the first PDN connection in the Network-Initiated mode (S2304).

The UE 10 may perform the attach procedure through the access network B upon transition to the first initial state in which the first PDN connection in the UE-Initiated mode is established and based on the Routing Rule.

Specifically, the UE 10 may perform the attach procedure through the access network B, based on the Routing Rule giving priority to a WLAN access.

Specifically, the UE 10 may perform the attach procedure through the access network B in a case where the state is changed to the first initial state in which the first PDN connection in the UE-Initiated mode is established and the Routing Rule of the first PDN connection indicates a priority to a WLAN access.

More specifically, the UE 10 may perform the attach procedure through the access network B in a case where the state is changed to the first initial state in which the first PDN connection in the UE-Initiated mode is established and the UE 10 stores the Routing Rule in which a specific flow and a WLAN access are associated with each other for the first PDN connection.

In other words, the UE 10 does not perform the attach procedure through the access network B in a case where the Routing Rule of the first PDN connection does not indicate a priority to a WLAN access, even when the state is changed to the first initial state in which the first PDN connection in the UE-Initiated mode is established.

More specifically, the UE 10 does not perform the attach procedure through the access network B in a case where the UE 10 does not store the Routing Rule, in which a specific flow and a WLAN access are associated with each other for the first PDN connection, even when the state is changed to the first initial state in which the first PDN connection in the UE-Initiated mode is established.

Note that the UE 10 may transmit the Attach request including at least the APN and/or the PDN connection ID.

The APN may be an APN, to which the UE 10 requests a connection. More specifically, the APN may be the APN 2. The UE 10 may include the APN 2 to establish the single-access PDN connection. Here, the APN 2 may be an APN that is not allowed to establish the multi-access PDN connection based on the NBIFOM and/or an APN that is not allowed to perform communication based on the NBIFOM.

That is, the UE 10 may request establishment of a single access PDN connection, using different APN 2 from the APN 1 acquired from the network when establishing the first PDN connection.

Furthermore, the PDN connection ID may be an ID assigned when the PGW 30 establishes the PDN connection in the PDN connectivity procedure, or may be information for uniquely identifying the PDN connection that the UE 10 establishes with the PGW 30.

Note that in the attach procedure, the UE 10 performs authentication and security association procedure with the MME 40 and the PGW_A and the PGW_B.

In addition, the UE 10 may acquire an APN from the network in response to the attach procedure complete.

The APN may be an APN, to which the UE 10 requests a connection. More specifically, the APN may be the APN 2. The UE 10 may include the APN 2 to establish the single-access PDN connection. Here, the APN 2 may be an APN that is not allowed to establish the multi-access PDN connection based on the NBIFOM and/or an APN that is not allowed to perform communication based on the NBIFOM.

That is, the UE 10 may establish a single access PDN connection, using different APN 2 from the APN 1 acquired from the network in response to establishment of the first PDN connection.

Through above procedures, the UE 10 and the core network 90 changes their states from the first state to the second state (S2306).

Next, the UE 10 performs the PDN connectivity procedure through the access network B upon transition to the second state and establishment of the first PDN connection in the Network-initiated mode (S2308).

Alternatively, the UE 10 performs the PDN connectivity procedure through the access network B, upon transition to the second state and based on the Routing Rule of the first PDN connection established in the UE-Initiated mode.

Specifically, the UE 10 may perform the attach procedure through the access network B, based on the Routing Rule giving priority to a WLAN access.

Specifically, the UE 10 may perform the procedure for adding a transfer path through the access network B to the first PDN connection in a case where the state is changed to the second state in which the first PDN connection in the UE-initiated mode is established and the Routing Rule of the first PDN connection indicates a priority to a WLAN access.

More specifically, the UE 10 may perform the procedure for adding a transfer path through the access network B when the state is changed to the second state in which the first PDN connection in the UE-initiated mode is established and the UE 10 stores the Routing Rule in which a specific flow and a WLAN access are associated with each other for the first PDN connection.

In other words, the UE 10 may not perform the procedure for adding a transfer path through the access network B to the first PDN connection in a case where the Routing Rule of the first PDN connection does not indicate a priority to a WLAN access, even when the state is changed to the second state in which the first PDN connection in the UE-initiated mode is established.

More specifically, the UE 10 does not perform the procedure for adding a transfer path through the access network B in a case where the UE 10 does not store the Routing Rule in which a specific flow and a WLAN access are associated with each other for the first PDN connection, even when the state is changed to the second state in which the first PDN connection in the UE-initiated mode is established.

A PDN connectivity procedure through an access network B will be described with reference to FIG. 18.

The UE 10 first transmits a PDN connectivity request to the TWAG 74 (S2402). The UE 10 may transmit the PDN connectivity request including at least the PDN connectivity request message identity (PDN connectivity request message ID), the Procedure transaction identity (procedure transaction ID), the Request type (request type), and the PDN type. Furthermore, the UE 10 may include at least first identification information and/or the fifth identification information and/or the eighth identification information and/or PDN connection ID in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or the fifth identification information and/or the eighth identification information and/or the PDN connection ID and/or the TFT.

Here, the first identification information may be the UE NBIFOM capability representing that the UE 10 supports the NBIFOM. Note that the NBIFOM capability may be information indicating the provision of the function of establishing the multi-access PDN connection based on the NBIFOM.

Furthermore, the fifth identification information may be the Mode Indication representing an NBIFOM operation mode for the multi-access PDN connection whose establishment is requested by the UE 10. Note that the UE 10 may include the UE-Initiated mode or the Network-Initiated mode in the fifth identification information.

As described above, the UE 10 may transmit the fifth identification information to request a mode of the multi-access PDN connection. In other words, the UE 10 may transmit the fifth identification information to request the establishment of the multi-access PDN connection corresponding to the mode indicated by the fifth identification information. Note that the mode indicated by the fifth identification information may be selected by the UE 10.

Note that, the UE 10 may be configured to transmit the fifth identification information in a case of requesting the establishment of the multi-access PDN connection in the UE-Initiated mode, and may be configured not to transmit the fifth identification information in a case of requesting the establishment of the multi-access PDN connection in the Network-Initiated mode.

Furthermore, the eighth identification information may be information indicating a default access (Default Assess) in the multi-access PDN connection. The eighth identification information may be information indicating the 3GPP access or the WLAN access. The 3GPP access may be an access system that is not the WLAN access. More specifically, the 3GPP access may be information indicating an access network including the E-UTRAN access, the UTRAN access, and the GERAN access.

Alternatively, the eighth identification information may include more detailed information. For example, the eighth identification information may be one of the E-UTRAN access, the UTRAN access and the GERAN access.

As described above, the UE 10 may transmit the eighth identification information to request a default access for the multi-access PDN connection. In other words, the UE 10 may transmit the eighth identification information to request the establishment of the multi-access PDN connection in which the access network indicated by the eighth identification information is used as the default access.

Note that the access network indicated by the eighth identification information may be selected by the UE 10. Furthermore, the UE 10 may select the access network indicated by the eighth identification information based on operator policy such as Inter System Routing Policy (ISRP) received from an Access Network Discovery and Selection Function (ANDSF) server. More specifically, the UE 10 may select the access network indicated by the eighth identification information based on priority information of the access network of the ISRP received from the ANDSF server. For example, since the ISRP indicates that a higher priority is given to a WLAN, the UE 10 may set information indicating the WLAN as the eighth identification information. Note that the UE 10 may select the access network indicated by the eighth identification information based on the ISRP, only in a case where the ISRP is valid or active.

Note that, the UE 10 may be configured to transmit the eighth identification information when requesting the establishment of the multi-access PDN connection in the UE-Initiated mode, and may be configured not to transmit the eighth identification information when requesting the establishment of the multi-access PDN connection in the Network-Initiated mode.

Furthermore, the UE 10 may be configured to transmit the eighth identification information in a case where a default bearer has not been established for the multi-access PDN connection, the establishment of which is to be requested, and may be configured not to transmit the eighth identification information in a case where the default bearer has already been established for the multi-access PDN connection.

More specifically, the UE 10 may be configured to transmit the eighth identification information when establishing a new multi-access PDN connection, and may be configured not to transmit the eighth identification information when adding a transfer path in a state in which the default bearer is established for the multi-access PDN connection through the LTE access network.

As described above, the UE 10 may make a request for establishing the multi-access PDN connection by transmitting the first identification information and/or the fifth identification information and/or the eighth identification information. In other words, the first identification information and/or the fifth identification information and/or the eighth identification information may be information indicating the request for establishing a multi-access PDN connection.

The PDN connectivity request message ID may be a message type representing the PDN connectivity request message.

The procedure transaction ID may be information for identifying the PDN connectivity procedure.

The APN may be an APN, to which the UE 10 requests a connection. More specifically, the APN may be the APN 1. The UE 10 may include the APN 1 to establish the multi-access PDN connection based on the NBIFOM. Here, the APN 1 may be an APN that is allowed to establish the multi-access PDN connection based on the NBIFOM and/or an APN that is allowed to perform communication based on the NBIFOM. Furthermore, the APN may be identification information identifying the first PDN connection.

The PDN connection ID may be an ID assigned when the PGW 30 establishes the PDN connection in the PDN connectivity procedure, or may be information for uniquely identifying the PDN connection that the UE 10 establishes with the PGW 30. Furthermore, the PDN connection ID may be identification information identifying the first PDN connection. The PDN connection ID may be associated with the APN.

Note that the UE 10 may identify the first PDN connection by using the APN and/or the PDN connection ID.

The request type may be information for identifying the type of PDN connectivity procedure to be requested. For example, since the UE 10 performs an initial connection by using the APN 1, the request type may be the type indicating an attach, rather than the type indicating a handover.

The PDN type may indicate an available IP version. For example, the PDN type may be IPv4, IPv6, or IPv4v6. The PCO may be protocol information associated with the PDN connection. Furthermore, the PCO may include identification information of the request. Note that the UE 10 may transmit the PCO including the first identification information and/or the fifth identification information and/or the eighth identification information.

The TFT may be information for identifying an IP flow for performing communication by using the PDN connection established in the current PDN connectivity procedure. Note that the IP flow to be identified may vary for each application. Thus, the TFT identifies user data of a certain application.

More specifically, the TFT may include a 5-tuple, or may include identification information such as the application ID. Note that the 5-tuple may include a combination of information of one or more of a transmission-source IP address, a transmission-destination IP address, a transmission-source port number, a transmission-destination port number, and a protocol number.

Note that in the present example, when transmitting the PDN connectivity request, the UE 10 does not request a certain NBIFOM operation mode, and thus, the UE 10 may transmit the PDN connectivity request without including the TFT. In other words, when the UE 10 requests the establishment of the multi-access PDN connection based on the NBIFOM without requesting a certain NBIFOM operation mode, the UE 10 may transmit the PDN connectivity request without including the TFT. More specifically, in a case where the UE 10 includes the first identification information and/or the fifth identification information and/or the eighth identification information, the UE 10 may transmit the PDN connectivity request without including the TFT. Note that conventionally, the UE 10 is capable of transmit the PCO including information indicating an IFOM support. Here, the IFOM support is identification information representing that the IP Flow Mobility (IFOM) is supported. Furthermore, the IFOM is a technique for switching a communication path of a certain IP flow by using the Dual Stack Mobile IPv6 (DSMIPv6) protocol. Thus, including the information indicating the IFOM support in the PCO allows the UE 10 to switch the access network through which the communication of a certain IP flow is performed.

In the present embodiment, in a case where the UE 10 includes the first identification information and/or the fifth identification information and/or the eighth identification information in the PCO, the UE 10 does not include the IFOM support. In contrast, in a case where the UE 10 includes the IFOM support in the PCO, the UE 10 does not include the first identification information and/or the fifth identification information and/or the eighth identification information. As described above, it may be possible to not configure both the first identification information and/or the fifth identification information and/or the eighth identification information and the IFOM support to be effective to ensure a clear distinction between the use of the switching of the communication path based on the NBIFOM and the use of the switching of the communication path based on the IFOM.

Thus, the UE 10 is capable of establishing either the PDN connection supporting the IFOM or the PDN connection supporting the NBIFOM, in the establishment procedure of a single PDN connection. In other words, the single PDN connection is any one of the PDN connection supporting the NBIFOM, the PDN connection supporting the IFOM, or the single-access PDN connection.

The TWAG 74 receives the PDN connectivity request transmitted from the UE 10. On the basis of the reception of the PDN connectivity request and/or in accordance with the first identification information and/or the fifth identification information and/or the eighth identification information included in the PDN connectivity request, the TWAG 74 transmits a Create Session Request to the PGW 30 (S2404).

On the basis of the reception of the PDN connectivity request and/or in accordance with the first identification information and/or the fifth identification information and/or the eighth identification information included in the PDN connectivity request, the TWAG 74 may transmit the Create Session Request including at least the first identification information and/or the fifth identification information and/or the eighth identification information. Furthermore, the TWAG 74 may include the TFT in the Create Session Request, based on the reception of the TFT transmitted from the UE 10.

Furthermore, the TWAG 74 may include the APN and/or PDN connection ID in the Create Session Request, based on the reception of the APN and/or PDN connection ID transmitted from the UE 10. Note that the TWAG 74 may identify the first PDN connection by using the received APN and/or PDN connection ID.

Furthermore, the TFT may be information for identifying an IP flow that performs communication by using the PDN connection established in the current PDN connectivity procedure. Note that the IP flow to be identified may vary for each application. Thus, the TFT identifies user data of a certain application.

More specifically, the TFT may include a 5-tuple, or may include identification information such as the application ID. Note that the 5-tuple may include a combination of information of one or more of a transmission-source IP address, a transmission-destination IP address, a transmission-source port number, a transmission-destination port number, and a protocol number.

Note that in a case where none of the first identification information and/or the fifth identification information and/or the eighth identification information is included in the PDN connectivity request, the TWAG 74 may transmit the Create Session Request without including the first identification information and/or the fifth identification information and/or the eighth identification information. Moreover, in a case where the first identification information and/or the fifth identification information and/or the eighth identification information is not included in the PDN connectivity request, the TWAG 74 may perform a procedure for establishing the single-access PDN connection.

The PGW 30 receives the Create Session Request transmitted from the TWAG 74. On the basis of the reception of the Create Session Request, and/or in accordance with the first identification information and/or the fifth identification information and/or the eighth identification information included in the Create Session Request, the PGW 30 may perform an IP-CAN session update procedure with the PCRF 60.

On the basis of the reception of the Create Session Request and/or in accordance with the first identification information and/or the fifth identification information and/or the eighth identification information included in the Create Session Request, the PGW 30 may perform the IP-CAN session update procedure including at least the first identification information and/or the fifth identification information and/or the eighth identification information.

Furthermore, the PGW 30 may identify the first PDN connection by using the received APN and/or PDN connection ID, based on the reception of the APN and/or PDN connection ID transmitted from the TWAG 74.

Note that the PGW 30 may perform the IP-CAN session update procedure to notify the PCRF 60 of information of the UE 10 and/or TWAG 74.

More specifically, when the multi-access PDN connection based on the NBIFOM is to be established, the PGW 30 transmits, to the PCRF 60, the information indicating the access network B, the PDN connection ID, the information indicating that the PDN connection is the multi-access PDN connection based on the NBIFOM, and the first identification information and/or the fifth identification information and/or the eighth identification information.

More specifically, when the multi-access PDN connection based on the NBIFOM is to be established, the PGW 30 transmits, to the PCRF 60, the information indicating the access network B, the PDN connection ID, the information indicating that the PDN connection is the multi-access PDN connection based on the NBIFOM, and the first identification information and/or the fifth identification information and/or the eighth identification information. Alternatively, when the single-access PDN connection is to be established, the PGW 30 transmits, to the PCRF 60, the information indicating the access network B, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Furthermore, on the basis of the reception of the first identification information and/or the fifth identification information and/or the eighth identification information, the PCRF 60 may transmit, to the PGW 30, a control message in the IP-CAN session update procedure with the PGW 30, the control message including at least the second identification information and/or the seventh identification information and/or the ninth identification information. The detailed description of the second identification information and/or the seventh identification information and/or the ninth identification information will be described later.

Note that the PCRF 60 may perform the IP-CAN session update procedure to notify the PGW 30 of the charging information and/or the QoS control information and/or the routing information.

On the basis of the reception of the Create Session Request or completion of the IP-CAN session update procedure, and/or in accordance with the first identification information and/or the fifth identification information and/or the eighth identification information included in the Create Session Request, and/or in accordance with the second identification information and/or the seventh identification information and/or the ninth identification information included in the IP-CAN session update procedure, the PGW 30 transmits a Create Session Response to the TWAG 74 (S2406).

On the basis of the reception of the Create Session Request or completion of the IP-CAN session update procedure, and/or in accordance with the first identification information and/or the fifth identification information and/or the eighth identification information included in the Create Session Request, and/or in accordance with the second identification information and/or the seventh identification information and/or the ninth identification information included in the IP-CAN session update procedure, the PGW 30 transmits the Create Session Response including at least the second identification information and/or the seventh identification information and/or the ninth identification information.

Furthermore, the PGW 30 may include the PDN Address and/or the PDN connection ID and/or the TFT and/or the bearer identification information identifying the default bearer in the Create Session Response.

Note that a method by which the PGW 30 acquires the second identification information and/or the seventh identification information and/or the ninth identification information is not limited to the above-described method for acquiring the seventh identification information from the PCRF 60 in the IP-CAN session update procedure, and another example may be employed. For example, the PGW 30 may create the second identification information and/or the seventh identification information and/or the ninth identification information and transmit the Create Session Response including the second identification information and/or the seventh identification information and/or the ninth identification information, without acquiring from the PCRF 60 in the IP-CAN session update procedure.

Here, the second identification information may be the NBIFOM capability representing that the network supports the NBIFOM. Note that the NBIFOM capability may be information indicating the provision of the function of establishing the multi-access PDN connection.

Here, the seventh identification information may be the Allowed Mode representing the NBIFOM operation mode that is allowed for the multi-access PDN connection based on the NBIFOM to be established. In other words, the seventh identification information may be the operation mode allowed by the operator.

As described above, the UE 10 may transmit the seventh identification information to make a notification of the mode of the multi-access PDN connection. In other words, the UE 10 may transmit the seventh identification information to permit the establishment of the multi-access PDN connection corresponding to the mode indicated by the seventh identification information. Note that the mode indicated by the seventh identification information may be selected by the PCRF 60 or the PGE 30. Note that the PCRF 60 or the PGE 30 may transmit the mode indicated by the fifth identification information as the seventh identification information, in a case where the PCRF 60 or the PGE 30 allows the establishment of the multi-access PDN connection in the mode indicated by the fifth identification information requested by the UE 10.

Note that the PCRF 60 or the PGW 30 may determine the Allowed Mode and the seventh identification information based on the operator policy. For example, a policy that allows the establishment of only the PDN connection of the UE-Initiated mode, a policy that allows the establishment of only the PDN connection of the Network-Initiated mode, a policy that allows the establishment of both modes, a policy that prohibits the establishment of both modes, and the like may be managed.

Note that the PCRF 60 or the PGW 30 may acquire the operator policy from the HSS 50 or the like. Alternatively, an operator policy created by an administrator may be stored.

In addition, for the operator policy, a policy different for each subscriber may be managed. Alternatively, a policy different for each APN may be managed. For example, for each APN, a different Allowed Mode for the PDN connection to be established may be managed.

The PCRF 60 or the PGW 30 may include the allowed operation mode in the seventh identification information, based on the Allowed Mode.

In other words, in a case where only the Network-Initiated mode is allowed, the PCRF 60 or the PGW 30 may include the Network-Initiated mode in the seventh identification information. Alternatively, in a case where only the UE-Initiated mode is allowed, the PCRF 60 or the PGW 30 may include the UE-Initiated mode in the seventh identification information.

Note that in a case where the UE-Initiated mode and the Network-Initiated mode are allowed, the seventh identification information may include both the operation modes.

Alternatively, in a case where both the UE-Initiated mode and the Network-Initiated mode are allowed and a default operation mode is configured, the seventh identification information may include only the default operation mode. Note that which one of the UE-Initiated mode and the Network-Initiated mode is defined as the default operation mode may be configured based on the operator policy.

Note that, in a case where none of the operation modes is allowed for establishment of the PDN connection, the PCRF 60 may transmit, to the PGW 30, the cause information indicating that the Requested Operation Mode is not allowed.

In a case where none of the operation modes is allowed for establishment of the PDN connection, the PGW 30 may not necessarily notify the TWAG 74 of the seventh identification information.

In a case where none of the operation modes is allowed for establishment of the PDN connection, the PGW 30 may transmit, to the TWAG 74, the Create Session Response including the cause information indicating that the requested operation mode is not allowed.

In a case where none of the operation modes is allowed for establishment of the PDN connection, the PGW 30 may notify the TWAG 74 that there is no allowed operation.

As described above, based on the Allowed Mode, the PCRF 60 or the PGW 30 may regard an operation mode that is allowed for establishment of the PDN connection as the seventh identification information.

Note that in a case where the Network-Initiated mode is not included in the seventh identification information, the PCRF 60 may not necessarily transmit the TFT to the PGW 30.

In other words, only in the case where the Network-Initiated mode is included in the seventh identification information, the PCRF 60 may transmit the TFT to the PGW 30.

Note that in a case where the Network-Initiated mode is not included in the seventh identification information, the PGW 30 may not necessarily transmit the TFT to the TWAG 74. Thus, in this case, the PGW 30 may not necessarily include the TFT in the Create Session Response.

In other words, only in a case where the Network-Initiated mode is included in the seventh identification information, the PGW 30 may transmit the TFT to the TWAG 74. Thus, in this case, the PGW 30 may include the TFT in the Create Session Response.

The PDN address may be an IP address assigned to the UE 10. For example, the PDN address may be an IPv4 address, or an IPv6 prefix and an interface ID for constituting an IPv6 address. Here, the PGW 30 may assign the IP address of the UE 10. Moreover, the PGW 30 may include the IP address that has been already assigned to the UE 10, in the PDN address. Specifically, the PDN address may be the same as the PDN address acquired at the time of the multi-access PDN connection establishment, the multi-access PDN connection being established in the initial state.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

Furthermore, the ninth identification information may be information indicating a default access (Default Assess) in the multi-access PDN connection. Note that the ninth identification information may be information indicating the 3GPP access or the WLAN access. The 3GPP access may be an access system that is not the WLAN access. More specifically, the 3GPP access may be information indicating an access network including an E-UTRAN access, a UTRAN access, and a GERAN access.

Alternatively, the ninth identification information may include more detailed information. For example, the ninth identification information may be one of E-UTRAN access, UTRAN access and GERAN access.

As described above, the PCRF 60 or the PGE 30 may transmit the ninth identification information to notify the UE 10 of the default access for the multi-access PDN connection. In other words, the PCRF 60 or the PGE 30 may transmit the ninth identification information to request the establishment of the multi-access PDN connection in which the access network indicated by the ninth identification information is used as the default access. Note that the access network indicated by the ninth identification information may be selected by the PCRF 60 or the PGE 30. Note that the PCRF 60 or the PGE 30 may transmit the access network indicated by the eighth identification information as the ninth identification information, in a case where the PCRF 60 or the PGE 30 allows the establishment of the multi-access PDN connection for the default access indicated by the eighth identification information requested by the UE 10.

As described above, the establishment of the multi-access PDN connection is permitted by transmitting the second identification information and/or the seventh identification information and/or the ninth identification information. In other words, the second identification information and/or the seventh identification information and/or the ninth identification information may be information indicating that the multi-access PDN connection is to be established or establishment of the multi-access PDN connection is permitted.

Note that, the PCRF 60 and the PGW 30 may be configured to transmit the ninth identification information in a case where a default bearer has not been established for the multi-access PDN connection, the establishment of which is to be requested, and may be configured not to transmit the ninth identification information in a case where the default bearer has already been established for the multi-access PDN connection.

More specifically, the PCRF 60 and the PGW 30 may be configured to transmit the ninth identification information when establishing a new multi-access PDN connection, and may be configured not to transmit the ninth identification information when adding a transfer path in a state in which the default bearer is established for the multi-access PDN connection through the WLAN access network.

The TWAG 74 receives the Create Session Response transmitted from the PGW 30. On the basis of the reception of the Create Session Response and/or in accordance with the second identification information and/or the seventh identification information and/or the ninth identification information included in the Create Session Response, the TWAG 74 transmits a PDN connectivity accept to the UE 10 (S2408). Note that the PDN connectivity accept message may be any control message indicating that establishment of a PDN connection is allowed, and may be any Activate default EPS bearer context request.

On the basis of the reception of the Create Session Response and/or in accordance with the second identification information and/or the seventh identification information and/or the ninth identification information included in the Create Session Response, the TWAG 74 may transmit the PDN connectivity accept including at least a PDN connectivity accept message identity (PDN connectivity accept message ID), the Procedure transaction ID, the APN, the PDN address (PDN Address), the PDN connection ID, and the user plane connection ID (User Plane Connection ID). Furthermore, the TWAG 74 may include at least the second identification information and/or the seventh identification information and/or the ninth identification information in the PDN connectivity accept. Moreover, the TWAG 74 may include the PCO and/or the Cause and/or the TFT and/or the bearer identification information identifying the default bearer, and/or the PDN connection attribute information, in the PDN connectivity accept. Note that the TWAG 74 may transmit the PCO including the second identification information and/or the seventh identification information and/or the ninth identification information and/or the TFT.

Here, the PDN connectivity accept message ID may be a message type representing the PDN connectivity accept message.

The APN may be an APN, to which the UE 10 is allowed to connect. More specifically, the APN may be the APN 1. The APN 1 may be an APN that is allowed to establish the multi-access PDN connection based on the NBIFOM. The TWAG 74 may include the APN 1 in the PDN connectivity accept.

The PDN address may be an IP address assigned to the UE 10. For example, the PDN address may be an IPv4 address, or an interface ID for constituting an IPv6 address.

The PDN connection ID may be information for uniquely identifying the PDN connection established between the UE 10 and the PGW 30. The PDN connection ID may be an ID assigned by the PGW 30, or an ID assigned by the TWAG 74. In other words, the TWAG 74 may assign the PDN connection ID.

The user plane connection ID is information for identifying a user plane. The user plane is a transfer path used for transferring user data in the PDN connection. The TWAG 74 may assign the user plane connection ID.

The Cause may be information representing that the PDN type of the PDN address assigned to the UE 10 is different from the PDN type requested by the UE 10 in the PDN connectivity request.

Note that the TWAG 74 and/or the PGW 30 may include the second identification information and/or the seventh identification information and/or the ninth identification information in the PCO. However, in a case where the TWAG 74 and/or the PGW 30 includes the second identification information and/or the seventh identification information and/or the ninth identification information in the PCO, the TWAG 74 and/or the PGW 30 does not include the IFOM support. In contrast, in a case where the TWAG 74 and/or the PGW 30 includes the IFOM support in the PCO, the TWAG 74 and/or the PGW 30 does not include the second identification information and/or the seventh identification information and/or the ninth identification information. As described above, it may be possible to not configure both the second identification information and/or the seventh identification information and/or the ninth identification information and the IFOM support to be effective to ensure a clear distinction between the use of the switching of the communication path based on the NBIFOM and the use of the switching of the communication path based on the IFOM.

The PDN connection attribute information may be information indicating that the PDN connection established in the current PDN connectivity procedure is the multi-access PDN connection, and/or information indicating that user data transmitted or received by using the PDN connection established in the current PDN connectivity procedure is allowed to be transmitted or received through the access network A and the access network B, and/or in a case where there is only one operation mode indicated by the seventh identification information, information indicating that the PDN connection established in the current PDN connectivity procedure is the multi-access PDN connection of the operation mode indicated by the seventh identification information.

Note that the UE 10 may transmit the PDN connectivity accept message that further includes the connectivity type indicating the type of PDN connection and/or the WLAN offload permission information (WLAN offload acceptability) indicating whether the WLAN offload is allowed or denied. Furthermore, the TWAG 74 may transmit the connectivity type or the WLAN offload permission information including the PDN connection attribute information.

The UE 10 receives the PDN connectivity accept transmitted from the TWAG 74. On the basis of the reception of the PDN connectivity accept and/or in accordance with the second identification information and/or the seventh identification information and/or the ninth identification information included in the PDN connectivity accept, the UE 10 transmits a PDN connectivity complete to the TWAG 74 (S2410). The UE 10 may transmit the PDN connectivity complete including at least a PDN connectivity complete message ID (PDN connectivity complete), the Procedure transaction ID, and the PDN connection ID.

Furthermore, in a case where multiple INFOM operation modes are included in the seventh identification information, the UE 10 may include at least the fifth identification information in the PDN connectivity complete. In other words, in a case where multiple INFOM operation modes are allowed, the UE 10 may select one of the allowed modes and transmit the fifth identification information including the selected mode.

Specifically, in a case where the UE-Initiated mode and the Network-Initiated mode are included in the seventh identification information included in the PDN connectivity accept, the UE 10 may include the UE-Initiated mode or the Network-Initiated mode in the fifth identification information.

Which one of the UE-Initiated mode and the Network-Initiated mode is to be included in the fifth identification information may be determined based on the UE policy. Note that the UE policy may be any information configured for the UE 10. For example, the UE policy may be information configured by a user.

The PDN connectivity complete message ID may be a message type representing the PDN connectivity complete message.

Thus, the UE 10 completes the additional attach procedure.

The UE 10 is capable of acquiring the same PDN address with the PDN address assigned in the multi-access PDN connection established in the initial state.

The UE 10 is capable of establishing an additional transfer path through the access network B, upon the transition to the first initial state and based on the Operation mode of the first PDN connection.

Specifically, the UE 10 is capable of performing the attach procedure and the PDN connectivity procedure on the access network B to establish the additional transfer path via the TWAG 74, based on the transition to the first initial state and the first PDN connection being in the Network-Initiated mode. Note that the transfer path may be a bearer and/or a communication path.

More specifically, the UE 10 performs the attach procedure, establishes the second PDN connection between the PGW_B selected using the APN 2 and the UE 10, and then performs the PDN connectivity procedure. This enables a transfer path through the access network B to be added to the first PDN connection between the PGW_A selected using the APN 1 and the UE 10. Note that the transfer path may be a bearer and/or a communication path. That is, in a state where a bearer that is for multi-access PDN connection and is through the E-UTRAN is established, a default bearer through the Wireless LAN (WLAN) for the first PDN connection can be further established.

Alternatively, the UE 10 is capable of performing the attach procedure and the PDN connectivity procedure on the access network B to establish the additional transfer path via the TWAG 74, upon transition to the first initial state and based on the Routing Rule of the first PDN connection in the UE-Initiated mode. Note that the transfer path may be a bearer and/or a communication path.

Specifically, the UE 10 performs the attach procedure, establishes the second PDN connection between the PGW_B selected using the APN 2 and the UE 10, and then performs the PDN connectivity procedure. This enables a transfer path through the access network B to be added to the first PDN connectivity between the PGW_A selected using the APN 1 and the UE 10. Note that the transfer path may be a bearer and/or a communication path.

Furthermore, the UE 10 is capable of establishing an additional transfer path through the access network B, upon the transition to the second initial state and based on the Operation mode of the first PDN connection.

Specifically, the UE 10 is capable of performing the PDN connectivity procedure on the access network B to establish the additional transfer path via the TWAG 74, upon the transition to the second initial state and based on the first PDN connection being in the Network-Initiated mode. Note that the transfer path may be a bearer and/or a communication path.

More specifically, the UE 10 performs the PDN connectivity procedure. This enables a transfer path through the access network B to be added to the first PDN connectivity between the PGW_A selected using the APN 1 and the UE 10. Note that the transfer path may be a bearer and/or a communication path.

Alternatively, the UE 10 is capable of performing the PDN connectivity procedure on the access network B to establish the additional transfer path via the eNB 45, upon transition to the second initial state and based on the Routing Rule of the first PDN connection in the UE-Initiated mode. Note that the transfer path may be a bearer and/or a communication path.

Specifically, the UE 10 performs the PDN connectivity procedure. This enables a transfer path through the access network B to be added to the first PDN connectivity between the PGW_A selected using the APN 1 and the UE 10. Note that the transfer path may be a bearer and/or a communication path.

In this way, with respect to the first PDN connection, the UE 10 and the PGW 30 establish a new default bearer. The UE 10 and the PGW 30 store the identification information of the default bearer established in the PDN connectivity procedure and the information identifying the access network B in association with each other, in response to completion of the PDN connectivity procedure through the access network B. Note that the access network B may be a WLAN access network. Furthermore, the information identifying the access network B may be information indicating a WLAN access network.

Note that the UE 10 performs data transmission and/or reception using the default bearer when the UE 10 does not receive the TFT or transmits and/or receives the user data not matching the held TFT. When multiple default bearers are established, the UE 10 is capable of selecting a default bearer for transmitting and/or receiving data based on the default access, and is capable of transmitting and/or receiving data by using the selected default bearer.

Here, the default access may be default access indicated by the ninth identification information. In a case where the UE 10 does not receive the ninth identification information at the time of establishing the second default bearer for the first PDN connection, the UE 10 may select the default access based on the ninth identification information received at the time of establishing the first default bearer for the first PDN connection, and transmit and/or receive data using the selected default bearer.

Furthermore, the PGW 30 performs data transmission and/or reception using the default bearer when the PGW 30 does not receive the TFT or transmits and/or receives the user data not matching the held TFT. When the PGW 30 establishes multiple default bearers with the UE 10, the PGW 30 is capable of selecting a default bearer for transmitting and/or receiving data based on the default access, and is capable of transmitting and/or receiving data by using the selected default bearer. Here, the default access may be default access indicated by the ninth identification information.

Here, the default access may be default access indicated by the ninth identification information. In a case where the PGW 30 does not transmit the ninth identification information at the time of establishing the second default bearer for the first PDN connection, the PGW 30 may select the default access based on the ninth identification information transmitted at the time of establishing the first default bearer for the first PDN connection, and transmit and/or receive data using the selected default bearer.

In this way, in a case where the UE 10 and the PGE 30 are capable of acquiring the default access in the state where the second default bearer is not established, the PDN connectivity establishment procedure for establishing the second unnecessary default bearer is eliminated. For example, in a case where the communication path through the WLAN access network is established by the additional PDN connection procedure, there may be a case in which no user data that selects the communication path through the WLAN access network exists, and the communication path is not used, depending on the Routing Rule based on the TFT or the like. Learning a default access beforehand eliminates the establishment of such an unnecessary communication path between the UE 10 and the PGW 30, and therefore reduces transmission and/or reception of control messages for unnecessary communication path establishment, consumption of the resources for the communication path, and the like.

In this way, the UE 10 and the PGE 30 acquire the default access in the state where the second default bearer is not established. This enables the UE 10 to determine whether to perform the PDN connection establishment procedure for establishing a new default bearer for the multi-access PDN connection, based on the information of the default access, when the UE 10 is newly located in a serving area of a WLAN access network.

For example, in a case where the default access indicates a LTE network, the multi-access access PDN connection is in the UE-Initiated mode, and the Routing Rule does not include user data to which priority is given to communicate by the communication path through the WLAN, it is not necessary to immediately perform the additional transfer path establishment procedure for establishing the default bearer through the WLAN.

3. Modification

Additionally, the programs run on the devices in the embodiments are each configured to control a CPU (program causing a computer to function) so as to realize the functions of the above-described embodiments. The information handled by these devices is temporarily held in a transitory storage device (RAM, for example) at the time of processing, and is then stored in various storage devices such as a ROM and an HDD, read out by the CPU as necessary, and edited and written.

Here, a semiconductor medium (a ROM, a non-volatile memory card, or the like, for example), an optical recording medium/magneto-optical recording medium (a Digital Versatile Disc (DVD), a Magneto Optical Disc (MO), a Mini Disc (MD), a Compact Disc (CD), a BD, or the like, for example), a magnetic recording medium (magnetic tape, a flexible disk, or the like, for example), and the like can be given as examples of recording media for storing the programs. In addition to realizing the functions of the above-described embodiments by executing loaded programs, the functions of the present invention are realized by the programs running cooperatively with an operating system, other application programs, or the like in accordance with instructions included in those programs.

For delivering these programs to the market, the programs can be stored in a portable recording medium, or can be transferred to a server computer connected via a network such as the Internet. In this case, a storage device in a server computer is also included in the present invention.

Additionally, each device in the above-described embodiment may be partially or completely realized as Large Scale Integration (LSI) circuit, which is a typical integrated circuit. The functional blocks of each device may be individually realized as chips, or may be partially or completely integrated into a chip. Furthermore, a circuit integration technique is not limited to the LSI, and may be realized with a dedicated circuit or a general-purpose processor. Furthermore, in a case where advances in semiconductor technology produce circuit integration technology capable of replacing the LSI, it is needless to say that such integrated circuits based on the technology are applicable.

Additionally, although, for the above-described embodiments, the LTE and the WLAN (IEEE 802.11a/b/n, for example) have been descried as examples of the radio access network, the connections may be made with WiMAX instead of the WLAN.

REFERENCE SIGNS LIST

7 Core network
9 Communication system
10 UE
30 PGW
35 SGW
40 MME
45 eNB
50 HSS 55 AAA
60 PCRF
65 ePDG
70 WLAN ANa
74 TWAG
75 WLAN ANb
80 LTE AN
100 PDN

The invention claimed is:

1. A User Equipment (UE) comprising:
a controller;
LTE interface circuitry; and
WLAN interface circuitry,
wherein
the LTE interface circuitry is configured to:
transmit a second Packet Data Network (PDN) connectivity request message to a Mobility Management Entity (MME) in order to establish a PDN connection over a 3GPP access, and
receive an Activate default Evolved Packet System (EPS) bearer context request message from the MME,
while the UE has established the PDN connection over the 3GPP access, the WLAN interface circuitry is configured to:
transmit a PDN connectivity request message to a Trusted WLAN Access Gateway (TWAG) in a case of adding a WLAN access to the PDN connection; and
receive a PDN connectivity accept message as a response to the PDN connectivity request message from the TWAG,
in a case where a Network-based IP flow mobility (NBIFOM) mode of the PDN connection is a UE-initiated NBIFOM mode, the PDN connectivity request message includes first information indicating a default access selected by the UE,
the PDN connectivity accept message includes second information indicating a default access determined by a Policy and Charging Rule Function (PCRF), based on the first information, and
the controller is configured to:
consider the default access indicated by the second information, based on reception of the PDN connectivity accept message; and
route a packet not matching any routing filter to the default access indicated by the second information.

2. The UE according to claim 1,
wherein the first information and the second information indicate the 3GPP access or a non-3GPP access, respectively.

3. The UE according to claim 2,
wherein the second information is information determined by the PCRF verifying the first information.

4. The UE according to claim 1,
wherein the second information is information determined by the PCRF verifying the first information.

5. The UE according to claim 1,
wherein
the second PDN connectivity request message includes third information indicating a requested NBIFOM mode,
the Activate default EPS bearer context request message includes fourth information indicating NBIFOM mode selected by the PCRF or a PDN Gateway (PGW), and
the UE considers the NBIFOM mode indicated by the fourth information as a NBIFOM mode of the PDN connection, based on the reception of the Activate default EPS bearer context request message.

6. A communication method performed by a User Equipment (UE), the communication method comprising:
transmitting a second PDN connectivity request message to a Mobility Management Entity (MME) in order to establish a Packet Data Network (PDN) connection over a 3GPP access;
receiving an Activate default Evolved Packet System (EPS) bearer context request message from the MME;
while the UE has established the PDN connection over the 3GPP access,
transmitting a PDN connectivity request message to a Trusted WLAN Access Gateway (TWAG) in a case of adding a WLAN access to the PDN connection; and
receiving a PDN connectivity accept message as a response to the PDN connectivity request message from the TWAG,
wherein
in a case where a Network-based IP flow mobility (NBIFOM) mode of the PDN connection is a UE-initiated NBIFOM mode, the PDN connectivity request message includes first information indicating a default access selected by the UE, and
the PDN connectivity accept message includes second information indicating a default access determined by a Policy and Charging Rule Function (PCRF), based on the first information, and
the communication method further comprising:
considering the default access indicated by the second information, based on reception of the PDN connectivity accept message; and
routing a packet not matching any routing filter to the default access indicated by the second information.

7. The communication method according to claim 6,
wherein the first information and the second information indicate the 3GPP access or a non-3GPP access, respectively.

8. The communication method according to claim 6,
wherein the second information is information determined by the PCRF verifying the first information.

9. The communication method according to claim 6,
wherein
the second PDN connectivity request message includes third information indicating a requested NBIFOM mode,
the Activate default EPS bearer context request message includes fourth information indicating NBIFOM mode selected by the PCRF or a PDN Gateway (PGW), and
the UE considers the NBIFOM mode indicated by the fourth information as a NBIFOM mode of the PDN connection, based on the reception of the Activate default EPS bearer context request message.

* * * * *

UNITED STATES PATENT AND TRADEMARK OFFICE
CERTIFICATE OF CORRECTION

PATENT NO. : 10,455,626 B2
APPLICATION NO. : 15/576769
DATED : October 22, 2019
INVENTOR(S) : Yudai Kawasaki et al.

It is certified that error appears in the above-identified patent and that said Letters Patent is hereby corrected as shown below:

In the Specification

Column 19, Line 24, change "PGE" to --PGW--.

Column 35, Line 59, change both "PGE" to --PGW--.

Column 35, Line 62, change "PGE" to --PGW--.

Column 37, Line 37, change "PGE" to --PGW--.

Column 37, Line 40, change "PGE" to --PGW--.

Column 37, Line 46, change "PGE" to --PGW--.

Column 37, Line 47, change "PGE" to --PGW--.

Column 37, Line 50, change "PGE" to --PGW--.

Column 54, Line 1, change both "PGE" to --PGW--.

Column 54, Line 4, change "PGE" to --PGW--.

Column 55, Line 48, change "PGE" to --PGW--.

Column 55, Line 51, change "PGE" to --PGW--.

Column 55, Line 57, change "PGE" to --PGW--.

Column 55, Line 58, change "PGE" to --PGW--.

Signed and Sealed this
Twenty-fourth Day of March, 2020

Andrei Iancu
*Director of the United States Patent and Trademark Office*

CERTIFICATE OF CORRECTION (continued)
U.S. Pat. No. 10,455,626 B2

Column 55, Line 61, change "PGE" to --PGW--.

Column 60, Line 18, change "PGE" to --PGW--.

Column 60, Line 36, change "PGE" to --PGW--.

Column 76, Line 46, change "PGE" to --PGW--.

Column 93, Line 23, change both "PGE" to --PGW--.

Column 93, Line 26, change "PGE" to --PGW--.

Column 94, Line 66, change "PGE" to --PGW--.

Column 95, Line 2, change "PGE" to --PGW--.

Column 95, Line 8, change "PGE" to --PGW--.

Column 95, Line 9, change "PGE" to --PGW--.

Column 95, Line 12, change "PGE" to --PGW--.

Column 111, Line 30, change both "PGE" to --PGW--.

Column 111, Line 33, change "PGE" to --PGW--.

Column 113, Line 9, change "PGE" to --PGW--.

Column 113, Line 12, change "PGE" to --PGW--.

Column 113, Line 18, change "PGE" to --PGW--.

Column 113, Line 19, change "PGE" to --PGW--.

Column 113, Line 22, change "PGE" to --PGW--.

Column 117, Line 42, change "PGE" to --PGW--.

Column 117, Line 60, change "PGE" to --PGW--.